(12) United States Patent
Mori et al.

(10) Patent No.: US 7,167,638 B2
(45) Date of Patent: *Jan. 23, 2007

(54) DATA STORAGE MEDIUM AND APPARATUS AND METHOD FOR REPRODUCING THE DATA FROM THE SAME

(75) Inventors: Yoshihiro Mori, Hirakata (JP); Masayuki Kozuka, Neyagawa (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/428,472

(22) Filed: Jul. 3, 2006

(65) Prior Publication Data

US 2006/0239150 A1 Oct. 26, 2006

Related U.S. Application Data

(63) Continuation of application No. 10/386,735, filed on Mar. 12, 2003, now Pat. No. 7,099,565, which is a continuation of application No. 09/266,313, filed on Mar. 11, 1999, now Pat. No. 6,564,006.

(30) Foreign Application Priority Data

Mar. 13, 1998 (JP) ................. 10-063351

(51) Int. Cl.
  H04N 5/91 (2006.01)
  H04N 5/781 (2006.01)
(52) U.S. Cl. .............. 386/96; 386/125; 386/126
(58) Field of Classification Search .......... 386/95, 386/96, 125–126, 39, 45; 369/53.2, 275.3
See application file for complete search history.

(56) References Cited

U.S. PATENT DOCUMENTS

| 5,491,498 A | 2/1996 | Koyama et al. |
| 5,687,160 A | 11/1997 | Aotake et al. |
| 5,937,136 A | 8/1999 | Sato |
| 6,091,674 A | 7/2000 | Tozaki et al. |

(Continued)

FOREIGN PATENT DOCUMENTS

EP  0 847 198  9/1996

(Continued)

OTHER PUBLICATIONS

Co-pending U.S. Application filed on Jul. 3, 2006, U.S. Appl. No. 11/428,455.

(Continued)

*Primary Examiner*—Vincent F. Boccio
(74) *Attorney, Agent, or Firm*—Renner, Otto, Boisselle & Sklar, LLP

(57) ABSTRACT

A data storage medium having stored thereon includes an audio sequence including at least one audio stream; at least one video stream; and reproduction control information for controlling reproduction of the at least one audio stream and the at least one video stream. The reproduction control information includes reproduction order information defining the order of at least one video stream, among the at least one video stream stored on the data storage medium, which is to be reproduced in synchronization with the audio sequence.

5 Claims, 66 Drawing Sheets

U.S. PATENT DOCUMENTS

| | | | |
|---|---|---|---|
| 6,122,436 A | 9/2000 | Okada et al. |
| 6,157,769 A | 12/2000 | Yoshimura et al. |
| 6,308,006 B1 | 10/2001 | Yamamoto et al. |
| 6,370,322 B1 | 4/2002 | Horiguchi et al. |
| 6,381,403 B1 | 4/2002 | Tanaka et al. |
| 6,438,315 B1 | 8/2002 | Suzuki et al. |
| 6,526,223 B1 | 2/2003 | Mori et al. |
| 6,529,683 B1 | 3/2003 | Mori et al. |
| 6,564,006 B1 | 5/2003 | Mori et al. |
| 6,567,608 B1 | 5/2003 | Mori et al. |

FOREIGN PATENT DOCUMENTS

| | | | |
|---|---|---|---|
| EP | 0 798 722 | 3/1997 |
| EP | 0 847 195 | 6/1998 |

OTHER PUBLICATIONS

Co-pending U.S. Application filed on Jul. 3, 2006, U.S. Appl. No. 11/428,462.

Co-pending U.S. Application filed on Jul. 3, 2006, U.S. Appl. No. 11/428,466.

Co-pending U.S. Application filed on Jul. 3, 2006, U.S. Appl. No. 11/428,468.

Direction of disk rotation (Counterclockwise)

FIG.10

| | Physical allocation information | Time attribute information | Start cell number | Still picture flag | Reproduction start audio time | Program reproduction time period | Audio pause time period |
|---|---|---|---|---|---|---|---|
| Program #1 | No-Continue | No-Continue | 1 | Exist | 90,000 | 5,490,000 | 90,000 |
| Program #2 | Continue | Continue | 4 | Exist | 5,580,000 | 10,890,000 | 90,000 |
| Program #3 | No-Continue | No-Continue | 8 | none | 90,000 | 5,490,000 | 90,000 |
| Program #4 | Continue | Continue | 10 | none | 5,580,000 | 5,490,000 | 90,000 |
| Program #5 | Continue | Continue | 12 | none | 11,160,000 | 5,400,000 | 0 |

FIG.11

|  | Cell index | Cell type | Start address | Termination address |
|---|---|---|---|---|
| Cell #1 | 0 | Still | 26,592 | 26,703 |
| Cell #2 | 0 | Silent | 26,704 | 26,799 |
| Cell #3 | 1 | Audio | 26,800 | 32,559 |
| Cell #4 | 0 | Still | 32,560 | 32,671 |
| Cell #5 | 0 | Silent | 32,672 | 32,767 |
| Cell #6 | 1 | Audio | 32,768 | 38,527 |
| Cell #7 | 2 | Audio | 38,528 | 44,287 |
| Cell #8 | 0 | Silent | 0 | 95 |
| Cell #9 | 1 | Audio | 96 | 14,975 |
| Cell #10 | 0 | Silent | 14,976 | 15,071 |
| Cell #11 | 1 | Audio | 15,072 | 20,831 |
| Cell #12 | 2 | Audio | 20,832 | 26,591 |

FIG. 32

| | Physical allocation information | Time attribute information | Start cell number | Reproduction start audio time | Program reproduction time period | Audio pause time period |
|---|---|---|---|---|---|---|
| Program #1 | No-Continue | No-Continue | 1 | 90,000 | 5,490,000 | 90,000 |
| Program #2 | Continue | Continue | 3 | 5,580,000 | 10,890,000 | 90,000 |
| Program #3 | No-Continue | No-Continue | 6 | 90,000 | 5,490,000 | 90,000 |
| Program #4 | Continue | Continue | 8 | 5,580,000 | 5,490,000 | 90,000 |
| Program #5 | Continue | Continue | 10 | 11,160,000 | 5,400,000 | 0 |

FIG.33

| | Used SR number | Initial button number | Picture transition mode | Still picture identification code | Picture cell start PTS | Picture program reproduction time period | Start section transition time period | Termination section transition time period |
|---|---|---|---|---|---|---|---|---|
| Picture program #1 | 0 | 1 | | 1 | 45,000 | 5,490,000 | | 352 |
| Picture program #2 | 0 | 2 | | 1 | 45,000 | 10,890,000 | 352 | 352 |
| Picture program #3 | 0 | 3 | | 1 | 45,000 | 5,490,000 | 352 | 352 |
| Picture program #4 | 0 | 4 | | 2 | 45,000 | 5,490,000 | 352 | 352 |
| Picture program #5 | 0 | 5 | | 2 | 45,000 | 5,400,000 | 352 | 352 |

FIG.34

| | Cell index | Cell type | Start address | Termination address |
|---|---|---|---|---|
| Cell #1 | 0 | Silent | 0 | 95 |
| Cell #2 | 1 | Audio | 96 | 14,975 |
| Cell #3 | 0 | Silent | 14,976 | 15,071 |
| Cell #4 | 1 | Audio | 15,072 | 20,831 |
| Cell #5 | 2 | Audio | 20,832 | 26,591 |
| Cell #6 | 0 | Silent | 26,592 | 26,687 |
| Cell #7 | 1 | Audio | 26,688 | 41,567 |
| Cell #8 | 0 | Silent | 41,568 | 41,663 |
| Cell #9 | 1 | Audio | 41,664 | 56,539 |
| Cell #10 | 2 | Audio | 56,540 | 51,419 |

FIG.35

| | Start address | Termination address |
|---|---|---|
| Picture cell #1 | 51,420 | 51,469 |
| Picture cell #2 | 51,470 | 51,519 |
| Picture cell #3 | 51,520 | 51,569 |
| Picture cell #4 | 51,570 | 51,619 |
| Picture cell #5 | 51,620 | 51,669 |

FIG.50

| b7 | b6 | b5 | b4 | b3 | b2 | b1 | b0 |
|----|----|----|----|----|----|----|----|
| reserved | | | | Display timing mode | | Display order mode | |

Display timing mode    00b: SlideShow
                                  01b: Browsable
                                  Others: reserved Display order mode    00b: Sequential
                                  01b: Random
                                  11b: Shuffle
                                  Others: reserved

FIG.54

| | Physical allocation information | Time attribute information | Start cell number | Reproduction start audio time | Program reproduction time period | Audio pause time period | ASVU number | Still video display mode | ATS_ASV_PBI start address | ATS_ASV_PBI termination address |
|---|---|---|---|---|---|---|---|---|---|---|
| Program #1 | No-Continue | No-Continue | 1 | | 5,490,000 | 90,000 | 1 | SlideShow | (Leading end of #1) | (Trailing end of #1) |
| Program #2 | Continue | No-Continue | 3 | 90,000 | 10,890,000 | 90,000 | 1 | SlideShow | (Leading end of #1) | (Trailing end of #1) |
| Program #3 | No-Continue | No-Continue | 6 | 90,000 | 5,490,000 | 90,000 | 2 | Browsable | (Leading end of #2) | (Trailing end of #2) |
| Program #4 | Continue | Continue | 8 | 5,490,000 | 5,400,000 | 0 | 2 | Browsable | (Leading end of #2) | (Trailing end of #2) |

FIG.55

Example of still video reproduction information #1

| | ASV number | Initial button number | Audio program number | Display timing | Start section display effect | Start section transition time period | Termination section display effect | Termination section transition time period |
|---|---|---|---|---|---|---|---|---|
| Display list #1 | 1 | 1 | 1 | 90,000 | | 1 | 1 | 352 |
| Display list #2 | 2 | 2 | 2 | 90,000 | | 1 | 1 | 352 |
| Display list #3 | 3 | 3 | 2 | 5,580,000 | | 1 | 2 | 352 |

Example of still video reproduction information #2

| | ASV number | Initial button number | Audio program number | Display timing | Start section display effect | Start section transition time period | Termination section display effect | Termination section transition time period |
|---|---|---|---|---|---|---|---|---|
| Display list #1 | 4 | 4 | 3 | 5,490,000 | | 2 | 2 | 352 |
| Display list #2 | 5 | 5 | 4 | 5,400,000 | | 2 | 2 | 352 |

FIG.56

|  | Cell index | Cell type | Start address | Termination address |
|---|---|---|---|---|
| Cell #1 | 0 | Silent | 0 | 95 |
| Cell #2 | 1 | Audio | 96 | 14,975 |
| Cell #3 | 0 | Silent | 14,976 | 15,071 |
| Cell #4 | 1 | Audio | 15,072 | 20,831 |
| Cell #5 | 2 | Audio | 20,832 | 26,591 |
| Cell #6 | 0 | Silent | 26,592 | 26,687 |
| Cell #7 | 1 | Audio | 26,688 | 41,567 |
| Cell #8 | 2 | Audio | 41,568 | 56,443 |

FIG.57

|  | ASV start address |
|---|---|
| ASV search pointer #1 | 0 |
| ASV search pointer #2 | 50 |
| ASV search pointer #3 | 100 |
| ASV search pointer #4 | 150 |
| ASV search pointer #5 | 200 |

FIG.58

|  | Number of P_VOBs | Start P_VOB number |
|---|---|---|
| ASVU general information #1 | 3 | 1 |
| ASVU general information #2 | 2 | 4 |

DATA STORAGE MEDIUM AND APPARATUS AND METHOD FOR REPRODUCING THE DATA FROM THE SAME

This application is a Continuation of U.S. application Ser. No. 10/386,735 filed on Mar. 12, 2003 now U.S. Pat No. 7,099,565, which is a continuation of U.S. application Ser. No. 09/266,313 filed on Mar. 11, 1999, now U.S. Pat. No. 6,564,006.

BACKGROUND OF THE INVENTION

1. Field of the Invention

The present invention relates to a data storage medium having still picture data and audio data stored thereon, and an apparatus and method for reproducing the still picture data along with high quality audio data.

2. Description of the Related Art

Conventionally known optical disks which music information including audio data or moving picture information is recorded to and reproduced from include compact disks (CDs) and laser disks (LDs). Compact disk recording and reproduction apparatuses and laser disk recording and reproduction apparatuses are conventionally known apparatuses for recording and reproducing the above-mentioned information.

A CD is an optical disk having a diameter of 12 cm for storing music information digitally recorded using an encoding technology referred to as linear PCM. CDs have been utilized as a medium for storing data for music applications. An LD is an optical disk having a diameter of 30 cm for storing moving picture information with audio data recorded as an analog signal. LDs have been utilized as a medium for storing data for video applications such as movies.

Recently, optical disks having a diameter of about 12 cm for storing music information and moving picture information including audio data digitally recorded. On such optical disks, either one or both of the music information and moving picture information are efficiently recorded in the state of being digitally compressed in order to acquire longer recording times and higher quality. Some of such optical disks have a file structure which facilitates data exchange with computers and communication apparatuses.

In order to meet demands for mediums having higher quality recording and reproduction of audio information than CDs, the DVD-Video technology has been developed and put into practice for realizing high quality audio data reproduction of linear PCM, 96 kHz and 24-bit sampling. However, the DVD-Video standards cannot provide high quality linear PCM multi-surround audio data reproduction or higher quality audio data reproduction. Accordingly, a higher quality technology has been in demand. However, the amount of high quality audio data is quite large and thus the reproduction speed of data required is quite high. Thus, it is difficult to record and reproduce image data along with the high quality audio data.

In the case of reproducing an audio title, there is a demand that the image data be used as supplemental data to the audio data as, for example, a so-called jacket picture such as lyrics and figure of the player. In order to realize this, recording and reproduction apparatuses having more flexible and a wider variety of functions are required. The functions include reproduction of video data synchronously with high quality audio data, reproduction of video data asynchronously from audio data, manipulation of video data by key operation, and special effects at the time of video data switching.

There is another demand that data be reproduced as the title creator intended. For example, the initial operation when the disk is inserted should not be determined by the system used, and direct selection of the audio data should be permitted or prohibited in accordance with the intention of the title creator regardless of the type of the player.

Conventional optical disks, and recording and reproduction apparatuses generally have the above-described structure and thus have a problem in that it is difficult to record and reproduce high quality digital audio data along with video data. When the transfer speed of the high quality audio data is approximately equal to the reading speed of the optical disk, the video data cannot be reproduced along with the audio data by the method of multiplexing the audio data and the video data used in conventional apparatuses. The reason for this is that when the audio data and the video data are multiplexed, the transfer speed of the resultant data exceeds the reading speed of the optical disk and thus the continuous reproduction of such data cannot be guaranteed. The method, often used in computer applications, of appropriately buffering audio data and video data so as to simultaneously reproduce the audio data and the video data which are recorded on different areas of the optical disk cannot be used. The reason for this is that the sum of the transfer speeds of the audio data and the video data needs to be equal to or lower than the reproduction speed of the optical disk in order to continuously reproduce the data recorded on disks such as CDs for an hour or more.

A Browsable reproduction method of switching the video data based on an instruction by the user while continuously reproducing the audio data, or a SlideShow reproduction method of automatically switching the video data in synchronization with a specified position in the audio data are not usable.

SUMMARY OF THE INVENTION

According to one aspect of the invention, a data storage medium having stored thereon includes an audio sequence including at least one audio stream; at least one video stream; and reproduction control information for controlling reproduction of the at least one audio stream and the at least one video stream. The reproduction control information includes reproduction order information defining the order of at least one video stream, among the at least one video stream stored on the data storage medium, which is to be reproduced in synchronization with the audio sequence.

In one embodiment of the invention, the reproduction control information further includes video reproduction mode information indicating whether it is possible or not to change the order of the at least one video stream to be reproduced in synchronization with the audio sequence based on interaction from a user.

In one embodiment of the invention, the reproduction control information further includes video reproduction mode information indicating whether reproduction timing of the at least one video stream to be reproduced in synchronization with the audio sequence is defined or a reproduction time period thereof is defined.

In one embodiment of the invention, the reproduction control information further includes reproduction order mode information defining whether the at least one video stream, the order of which is defined by the reproduction order information, is reproduced randomly or sequentially.

In one embodiment of the invention, the reproduction order mode information indicates whether the at least one video stream is reproduced randomly while permitting overlap or randomly while prohibiting overlap.

In one embodiment of the invention, the audio sequence corresponds to at least one program, and the at least one video stream stored on the data storage medium is grouped on a program-by-program basis.

According to another aspect of the invention, an apparatus for reproducing information from a data storage medium having stored thereon an audio sequence including at least one audio stream; at least one video stream; and reproduction control information for controlling reproduction of the at least one audio stream and the at least one video stream, wherein the reproduction control information includes reproduction order information defining the order of at least one video stream, among the at least one video stream stored on the data storage medium, which is to be reproduced in synchronization with the audio sequence, the apparatus includes a reading section for reading the audio sequence and the at least one video stream stored on the data storage medium; and a reproduction section for reproducing the at least one video stream in synchronization with the audio sequence in the order defined by reproduction order information.

In one embodiment of the invention, the reproduction control information further includes video reproduction mode information indicating whether it is possible or not to change the order of the at least one video stream to be reproduced in synchronization with the audio sequence based on interaction from a user.

In one embodiment of the invention, the reproduction control information further includes video reproduction mode information indicating whether reproduction timing of the at least one video stream to be reproduced in synchronization with the audio sequence is defined or a reproduction time period thereof is defined.

In one embodiment of the invention, the reproduction control information further includes reproduction order mode information defining whether the at least one video stream, the order of which is defined by the reproduction order information, is reproduced randomly or sequentially.

In one embodiment of the invention, the reproduction order mode information indicates whether the at least one video stream is reproduced randomly while permitting overlap or randomly while prohibiting overlap.

In one embodiment of the invention, the at least one video stream to be reproduced in synchronization with the audio sequence is buffered into a buffer located in the reproduction apparatus before reproduction of the audio sequence.

According to still another aspect of the invention, a method for reproducing information from a data storage medium having stored thereon an audio sequence including at least one audio stream; at least one video stream; and reproduction control information for controlling reproduction of the at least one audio stream and the at least one video stream, wherein the reproduction control information includes reproduction order information defining the order of at least one video stream, among the at least one video stream stored on the data storage medium, which is to be reproduced in synchronization with the audio sequence, the method includes the steps of reading the audio sequence and the at least one video stream stored on the data storage medium; and reproducing the at least one video stream in synchronization with the audio sequence in the order defined by reproduction order information.

In one embodiment of the invention, the reproduction control information further includes video reproduction mode information indicating whether it is possible or not to change the order of the at least one video stream to be reproduced in synchronization with the audio sequence based on interaction from a user.

In one embodiment of the invention, the reproduction control information further includes video reproduction mode information indicating whether reproduction timing of the at least one video stream to be reproduced in synchronization with the audio sequence is defined or a reproduction time period thereof is defined.

In one embodiment of the invention, In one embodiment of the invention, the reproduction control information further includes reproduction order mode information defining whether the at least one video stream, the order of which is defined by the reproduction order information, is reproduced randomly or sequentially.

In one embodiment of the invention, the reproduction order mode information indicates whether the at least one video stream is reproduced randomly while permitting overlap or randomly while prohibiting overlap.

In one embodiment of the invention, the at least one video stream to be reproduced in synchronization with the audio sequence is buffered into a buffer located in the reproduction apparatus before reproduction of the audio sequence.

According to still another aspect of the invention, in a data storage medium stored with a first system stream and a second system stream to be reproduced in synchronization with each other, the first system stream includes reproduction control information indicating timing at which the first system stream is reproduced, and the second system stream is reproduced at timing determined by information other than information included in the second system stream.

According to still another aspect of the invention, an apparatus for reproducing a data storage medium stored with a first system stream and a second system stream to be reproduced in synchronization with each other, the first system stream includes reproduction control information indicating timing at which the first system stream is reproduced includes a reading section for reading the first system stream and the second system stream stored on the data storage medium; and a decoder section for decoding the first system stream in accordance with the reproduction control information. The second system stream is decoded in accordance with a control signal supplied from outside of the decoder section.

According to still another aspect of the invention, a method for reproducing a data storage medium stored with a first system stream and a second system stream to be reproduced in synchronization with each other, wherein the first system stream includes reproduction control information indicating timing at which the first system stream is reproduced includes the steps of reading the first system stream and the second system stream stored on the data storage medium; and controlling the timing at which the first system stream is reproduced in accordance with the reproduction control information; controlling the timing at which the second system stream is reproduced in accordance with information other than information included in the second system stream.

Thus, the invention described herein makes possible the advantages of providing (1) an optical disk for realizing reproduction of high quality digital audio data along with video data in a restricted range of bit rates; (2) an optical disk, and an apparatus and method for reproducing data from such an optical disk for realizing switching between a mode in which high quality digital audio data and video data are reproduced synchronously with each other and a mode in which high quality digital audio data and video data are reproduced asynchronously from each other and the video data is switched based on time or by an instruction from the user; and (3) a reproduction apparatus for allowing a decoder used for a general MPEG2 stream to be used for reproducing audio data and video data as independent streams and thus for realizing reproduction of high quality digital audio data along with video data in a restricted range of bit rates at a relatively low cost.

These and other advantages of the present invention will become apparent to those skilled in the art upon reading and understanding the following detailed description with reference to the accompanying figures.

BRIEF DESCRIPTION OF THE DRAWINGS

FIG. 10 shows an example of program information;

FIG. 11 shows an example of cell information;

FIG. 32 shows an exemplary audio program;

FIG. 33 shows another exemplary audio program;

FIG. 34 shows the number of silent cell packs and audio cell packs of audio data of 48 kHz, 16-bit sampling and 2 channels;

FIG. 35 shows picture cell information when the number of still picture packs is 50;

FIG. 50 illustrates an audio still video display mode;

FIG. 54 shows an example of audio program information (ATS_PGI);

FIG. 55 shows an example of ATS audio still video reproduction information (ATS_ASV_PBI);

FIG. 56 shows an example of cell information;

FIG. 57 shows an example of ASV search pointer;

FIG. 58 shows an example of ASVU general information;

DESCRIPTION OF THE EMBODIMENTS

Hereinafter, the present invention will be described by way of illustrative examples with reference to the accompanying drawings.

EXAMPLE 1

An optical disk in a first example according to the present invention will be described.

(1) Physical Structure of the Optical Disk

Figure 1A:
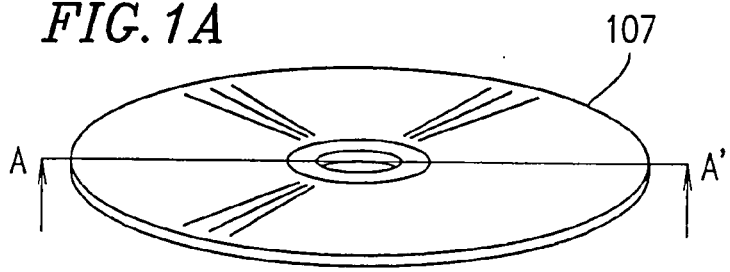
FIG. 1A is an external view of an optical disk in a first example according to the present invention.
Figure 1B:
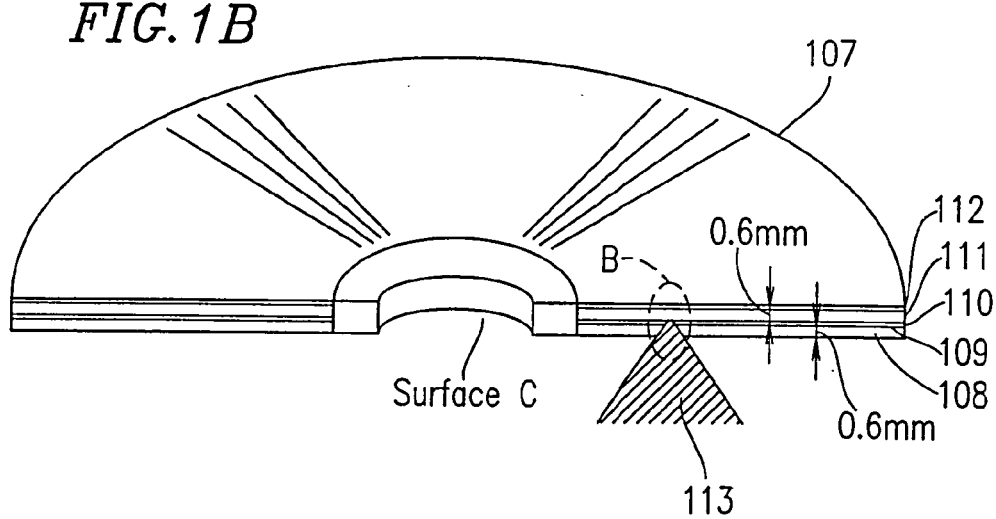
FIG. 1B is a cross-sectional view of the optical disk shown in FIG. 1A.
Figure 1C:
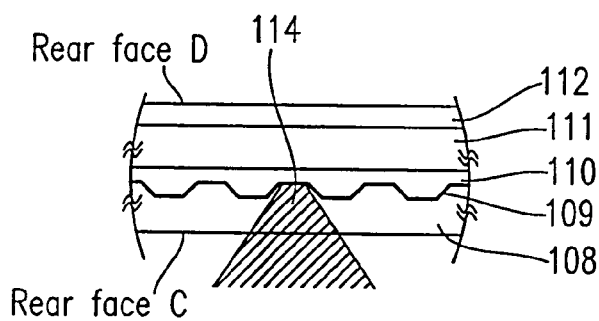
FIG. 1C is an enlarged cross-sectional view of the optical disk shown in FIG. 1A.

FIG. 1A shows an external appearance of a DVD 107, which is a multimedia optical disk. FIG. 1B shows a cross-section of the DVD 107 taken along line A–A' in FIG. 1A. FIG. 1C is an enlarged cross-sectional view of portion B shown in FIG. 1B.

As shown in FIG. 1B, the DVD 107 is formed by sequentially laminating a first transparent substrate 108, an information layer 109, an adhesive layer 110, a second transparent substrate 111, and a print layer 112 on which a label is to be printed in this order.

The first transparent substrate 108 and the second transparent substrate 111 are reinforcement substrates formed of the same material. In the example shown in FIG. 1B, these substrates each have a thickness of about 0.6 mm. These substrates can each have a thickness in the range between about 0.5 mm and about 0.7 mm.

The adhesive layer 110 is provided between the information layer 109 and the second transparent substrate 111 in order to adhere the information layer 109 to the second transparent substrate 111.

On the face of the information layer 109 in contact with the first transparent substrate 108 is formed a reflective film (not shown) formed of a thin metal film or the like. By using a molding technique, a high density of convex and concave pits are formed in the reflective film.

Figure 1D:
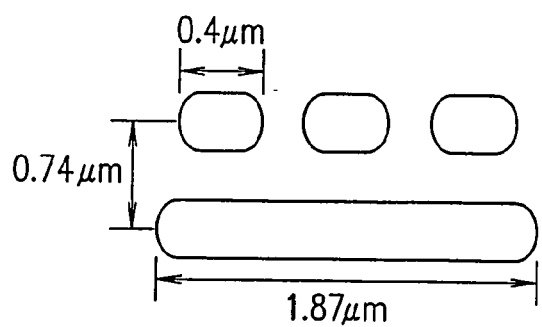
FIG. 1D shows pits formed in the optical disk in the first example according to the present invention.

FIG. 1D shows the shapes of pits formed in the reflective film. In the example shown in FIG. 1D, each pit has a length of 0.4 μm to 2.13 μm. A spiral track is formed in the DVD 107. The pits are formed alongside the spiral track so as to be at a distance of 0.74 μm from the spiral track in a radial direction of the DVD 107. Thus, an array of pits are formed along the spiral track.

When a light beam 113 is directed toward the DVD 107, a light spot 114 is formed on the information layer 109 as shown in FIG. 1C. The information stored on the DVD 107 is detected as a variation in the reflectance of the portion of the information layer 119 which is irradiated by the light spot 114.

The diameter of the light spot 114 of the DVD 107 is about 1/1.6 times the diameter of a light spot on a CD because the numerical aperture (NA) of an object lens for DVDs is larger than the numerical aperture of an object lens for CDs and because the wavelength λ of a light beam for DVDs is shorter than the wavelength λ of a light beam for CDs.

A DVD having the above-described physical structure can store about 4.7 Gbytes of information on one side. A storage capacity of about 4.7 Gbytes is nearly 8 times the storage capacity of a conventional CD. Such a large storing capacity of DVDs can greatly improve the quality of moving pictures and also greatly extend the reproducible time period of moving pictures. Whereas the reproducible time period of a conventional video CD is 74 minutes, a DVD boasts a reproducible time period of 2 hours or more.

The fundamental technology which realizes such a large storing capacity lies in reduction of the spot diameter d of a light beam. The spot diameter d is calculated from the formula: spot diameter d=laser wavelength λ/numerical aperture NA of the object lens. Accordingly, the spot diameter d can be minimized by decreasing the laser wavelength λ and increasing the numerical aperture NA of the object lens. It should be noted, however, that increasing the numerical aperture NA of the object lens can result in coma aberration due to the relative slant of the optical axis of the light beam with respect to the face of the disk (i.e., "tilt"). In the case of DVDs, the coma aberration is minimized by reducing the thickness of a transparent substrate. However, reducing the thickness of a transparent substrate can result in another problem of lower mechanical strength of the disk. In the case of DVDs, the strength of the transparent substrate is reinforced by attaching another substrate to the transparent substrate, thereby overcoming the problems associated with the mechanical strength of the disk.

A red semiconductor laser having a short wavelength of 650 nm and an object lens having a large numerical aperture (NA) of about 0.6 mm are used to read the information stored on a DVD. By employing a thin transparent substrate having a thickness of about 0.6 mm in addition to the above-mentioned laser and object lens, it is possible to store about 4.7 Gbytes of information on one side of an optical disk having a diameter of 120 mm.

Figure 2A:
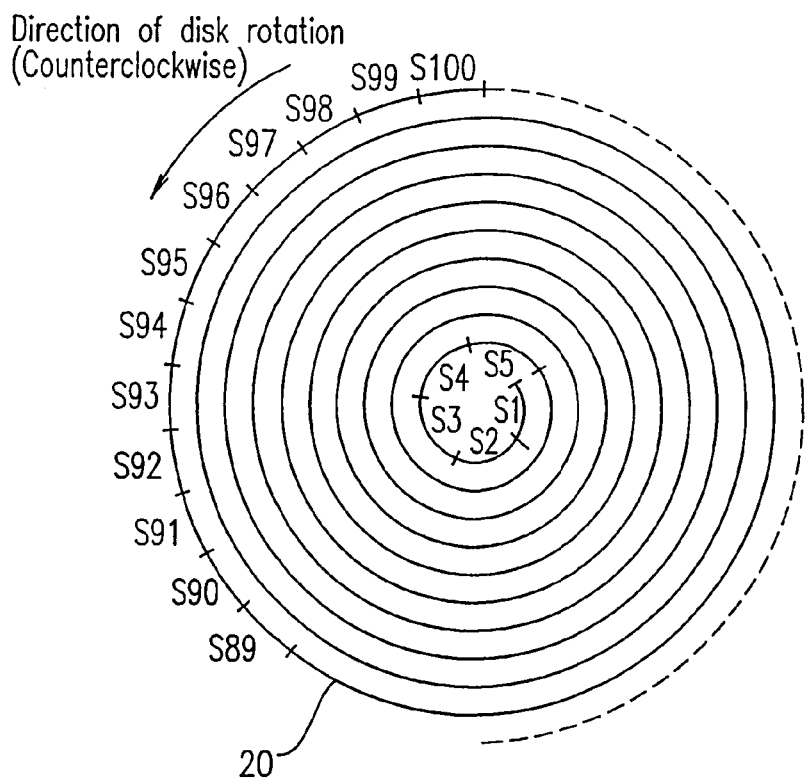
FIG. 2A shows a track structure of the optical disk shown in FIG. 1A.

FIG. 2A schematically illustrates a spiral track 20 formed from the inner periphery toward the outer periphery of the information layer 109 of the DVD 107 (FIG. 1A). The spiral track 20 is divided into prescribed units referred to as sectors. In FIG. 2A, the respective sectors are denoted by S1, S2, ..., S99, and S100. The information stored on the DVD 107 is read on a sector-by-sector basis.

Figure 2B:
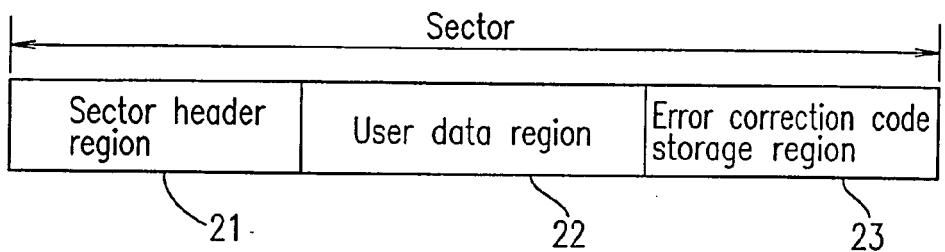
FIG. 2B shows a sector structure of the optical disk shown in FIG. 1A.

FIG. 2B shows an internal structure of a sector, where the sector includes a sector header region 21, a user data region 22, and an error correction code storage region 23.

The sector header region 21 stores a sector address for identifying the sector and an error detection code therefor. Based on these sector addresses, a disk reproduction apparatus determines one of a plurality of sectors from which information should be read.

The user data region 22 stores a 2 Kbyte long data string.

The error correction code storage region 23 stores error correction codes for the sector header region 21 and the user data region 22 included in the same sector. A disk reproduction apparatus performs error detection by using the error correction codes when reading data from the user data region 22 and performs error correction based on the error detection results, thereby insuring the reliability of data reading.

(2) Logical Structure of the Optical Disk

Figure 3:
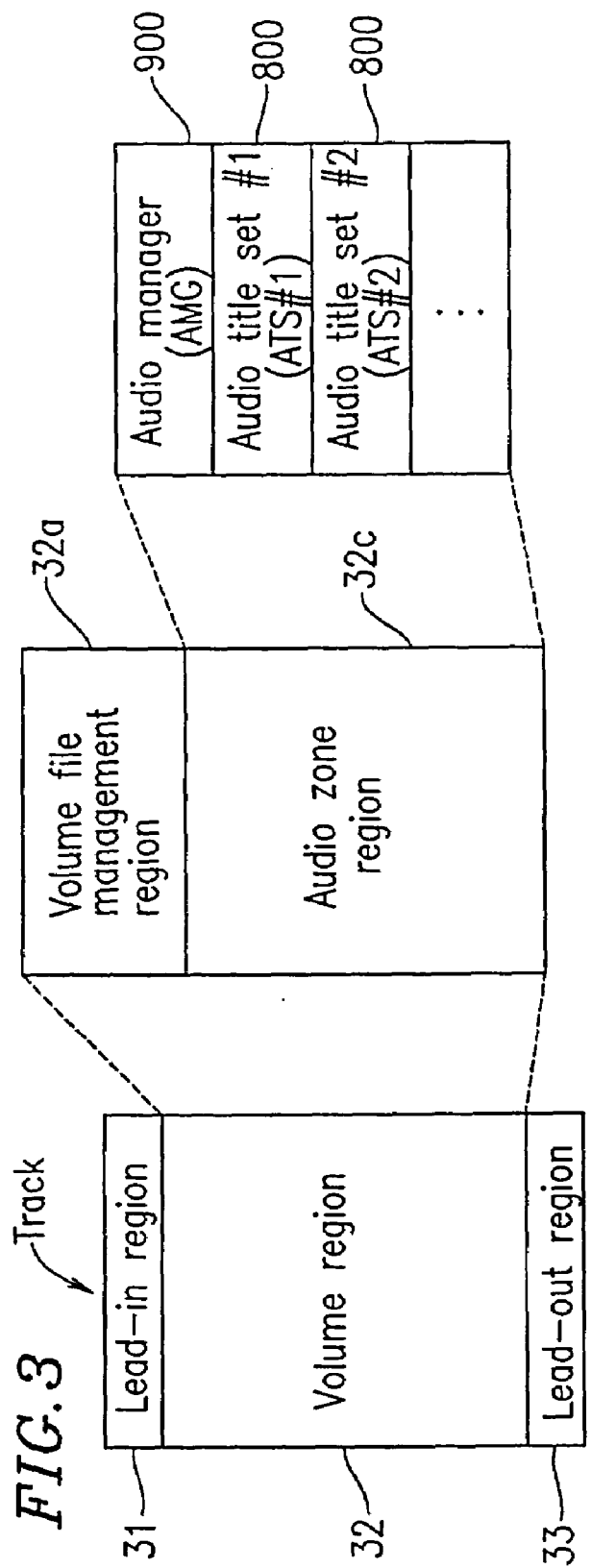
FIG. 3 shows a logical structure of the optical disk shown in FIG. 1A.

FIG. 3 shows a logical structure of the DVD 107 (FIG. 1A). As shown in FIG. 3, the region of the DVD 107 is divided into a lead-in region 31, a volume region 32, and a lead-out region 33. These regions can be identified by identification information included in sector addresses of physical sectors. The physical sectors are arrayed in an ascending order based on their sector addresses.

In the lead-in region 31, data for stabilizing the operation of a reproduction apparatus at the beginning of read, for example, is stored.

No meaningful data is stored in the lead-out region 33. The lead-out region 33 is used for informing the disk reproduction apparatus of the termination of reproduction.

The volume region 32 stores digital data corresponding to an application. The physical sectors included in the volume region 32 are managed as logical blocks. The logical blocks are identified by sequential numbers (logical block numbers) respectively assigned to the physical sectors after the first physical sector (designated as the 0th physical sector) in the volume region 32.

As shown in FIG. 3, the volume region 32 is subdivided into a volume file management region 32*a* and an audio zone region 32*c*.

The volume file management region 32*a* stores file system management information for managing a plurality of logical blocks as files in accordance with ISO13346. The file system management information is information indicating the correspondence between the name of each of a plurality of files and the addresses of the logical blocks occupied by that file. A disk reproduction apparatus achieves file-by-file access to the optical disk based on the file system management information. Specifically, the disk reproduction apparatus refers to the file system management information to obtain the addresses of the logical blocks corresponding to a given file name, and accesses the logical blocks based on these addresses. As a result, the digital data contained in a desired file can be read.

An audio zone region 32*c* stores an audio manager 900 and one or more audio title sets 800.

The audio title set 800 contains a plurality of pieces of audio data and management information for managing the order of reproducing the plurality of pieces of audio data. An audio title set 800 has a data structure which allows for management of the audio data in units which are referred to as audio titles. Typically, an audio title corresponds to a music album containing one or more tunes.

(3) Data Structure of the Audio Zone Region 32*c*

The audio zone region 32*c* stores an audio manager 900 and one or more audio title sets 800.

(3.1) Data Structure of the Audio Title Set 800

Figure 5:
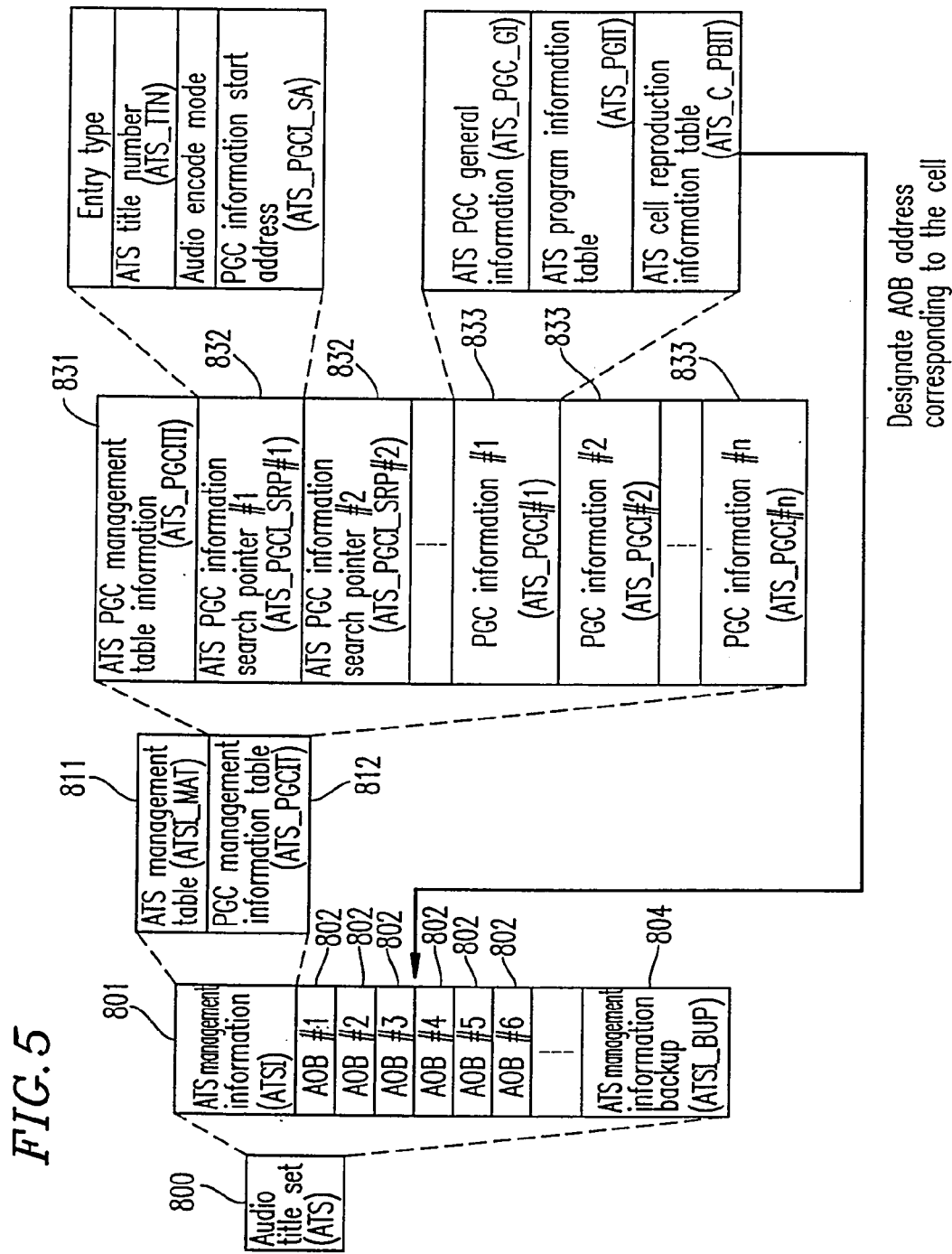
FIG. 5 shows a data structure of an audio title set.

FIG. 5 shows a data structure of an audio title set 800. The audio title set 800 includes a plurality of audio objects (hereinafter, referred to as "AOBs") 802, audio title set management information (ATSI) 801 for managing the order of reproducing the plurality of AOBs 802, and audio title set management information backup (ATSI_BUP) 804 which is backup data of the audio title set management information 801. In the following description, an "audio title set" will generally be referred to as an "ATS".

(3.1.1) Data Structure of the AOB 802

The AOB 802 is packetized into 2 Kbytes. The AOB 802 stores data in the LPCM format, AC3 format, DTS format or other compression formats. In the case of the LPCM format, the sample bit is 16, 20, or 24 bits, with a sampling frequency of 48 kHz, 96 kHz, 192 kHz, 44.1 kHz, 88.2 kHz, or 176.4 kHz.

(3.1.2) Data Structure of the Audio Title Set Management Information 801

The audio title set management information (ATSI) 801 includes information for managing the order of reproducing the AOBs 802. The order of reproducing the AOBs 802 is designated by a program chain (PGC), as in the case of video objects (VOBs). Different PGCs can define different orders of reproduction of AOBs 802.

As shown in FIG. 5, the audio title set management information (ATSI) 801 includes an ATS management table (ATSI_MAT) 811 and a PGC management information table (ATS_PGCIT) 812.

The ATS management table 811 serves as header information of the audio title set management information 801. The ATS management table 811 includes a pointer indicating a region in which each AOB 802 is stored, a pointer indicating a region in which the PGC management information table 812 is stored, and attribute information on each AOB 802. In the case where a still picture is stored on the DVD 107 (FIG. 1A), the ATS management table 811 also includes attribute information and the like for the still picture.

The PGC management information table (ATS_PGCIT) 812 includes ATS PGC management table information (ATS_PGCITI) 831, a plurality of ATS PGC information search pointers (ATS_PGCI_SRPs) 832, and a plurality of PGC information (ATS_PGCI) units 833.

The ATS PGC information search pointers (ATS_PGCI_SRPs) 832 are indices for a plurality of PGCs stored in the PGC management information table 812 and designate the PGC information to be executed first on a title-by-title basis.

Each of the PGC information units describes positions on the optical disk 107 where one or more audio objects are recorded and the order of reproduction thereof. Reproduction of the same audio object can be described by different PGC information. Specifically, each PGC information unit includes "ATS PGC general information (ATS_PGC_GI)", "ATS program information table (ATS_PGIT)", and "audio cell reproduction information table (ATS_C_PBIT)".

Figure 7:
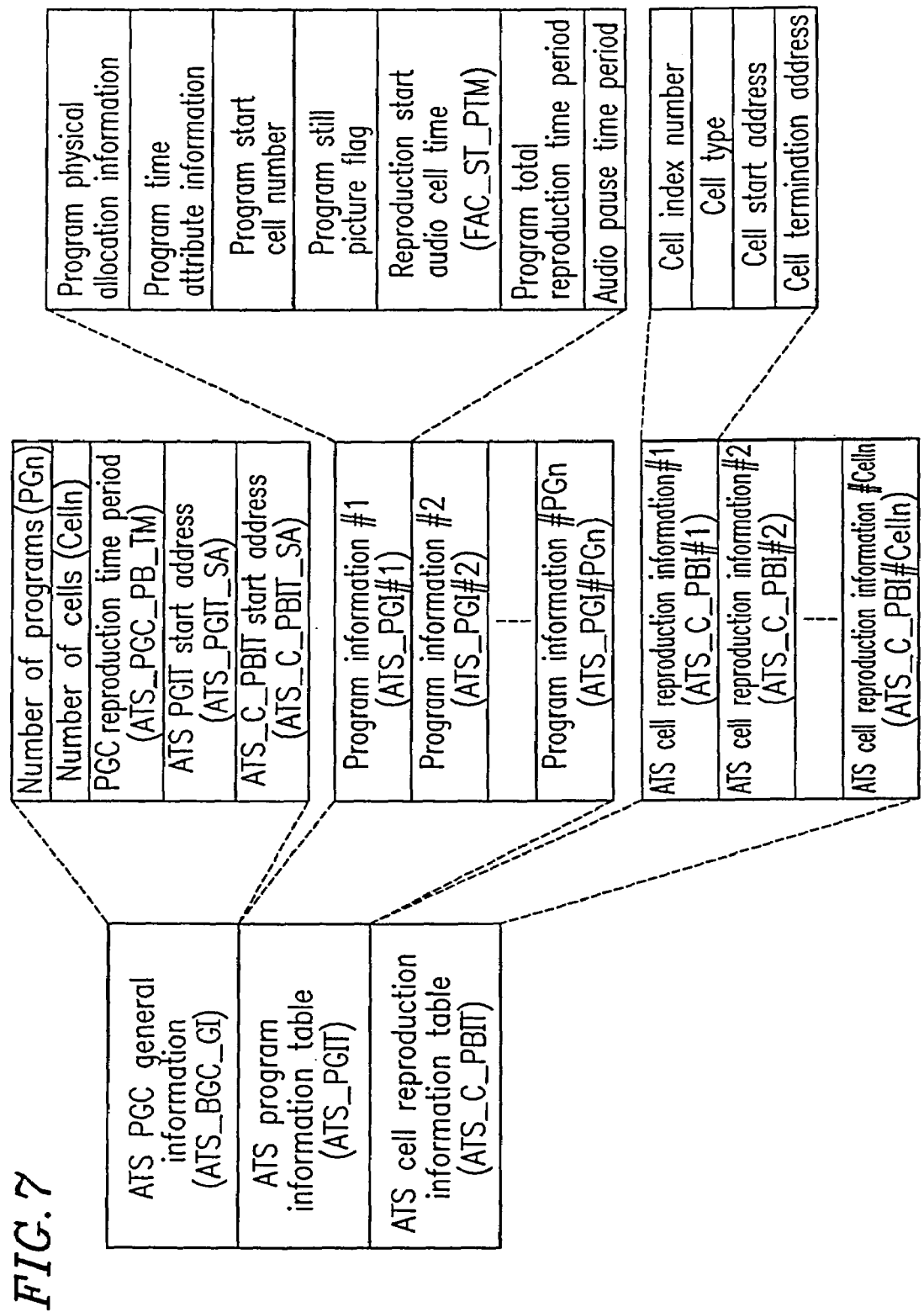
FIG. 7 shows a data structure of PGC information and cell information.

FIG. 7 shows a data structure of each PGC information unit. As shown in FIG. 7, "ATS PGC general information (ATS_PGC_GI)" includes the number of programs and the number of cells included in the PGC information, the reproduction time period of the PGC, and information on pointers to "ATS program information table (ATS_PGIT)" and to "audio cell reproduction information table (ATS_C_PBIT)".

The "ATS program information table (ATS_PGIT)" includes "program physical allocation information" indicating whether or not the AOB of each program and the AOB of the previous program are recorded at physically discontinuous positions on the optical disk, "program time attribute information" indicating whether or not the time information of the AOB is continuous with the time information of the previous AOB, "program start cell number" indicating the first cell number forming the program, "program still picture flag" indicating whether or not the program includes a still picture, "reproduction start audio cell time" indicating the first time information of the first audio cell included in the program, "program total reproduction time period" indicating the reproduction time period of the program, and "audio pause time period" indicating the silent period until the reproduction of the audio cell of the program starts.

The "audio cell reproduction information table (ATS_C_PBIT)" stores cell information forming the AOB to be reproduced. Specifically, the "ATS cell reproduction information table" includes "cell index number" indicating the order of cells included in the program, "cell type" indicating the attribute of the cell (i.e., whether the cell is a still picture cell, a silent cell or an audio cell), "cell start address" indicating the start address of the cell in the form of a relative address with respect to the first pack of the AOB of the ATS including the cell, and "cell termination address" indicating the final address of the cell in the same manner.

Figure 6:
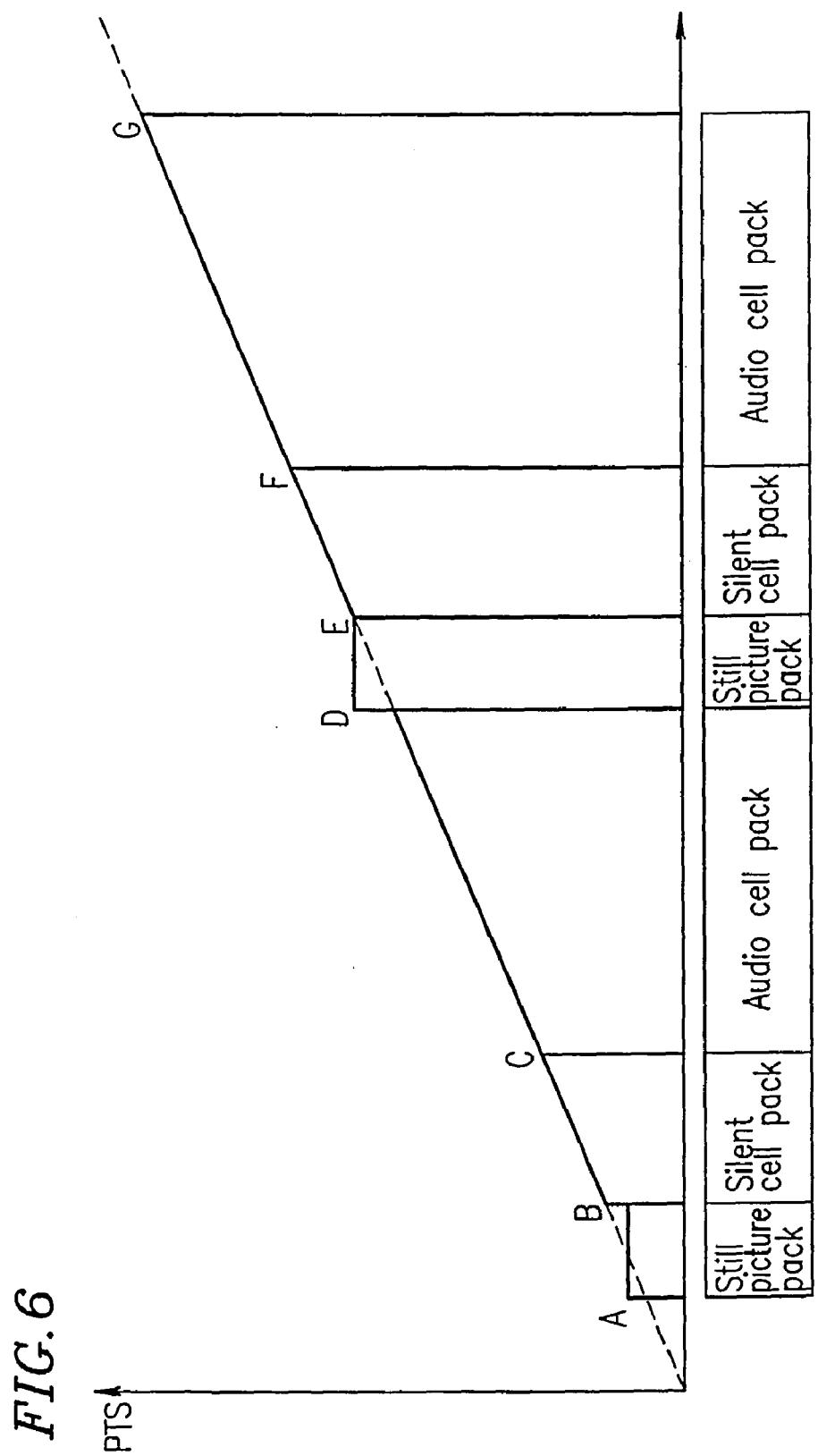
FIG. 6 shows an exemplary structure of an audio object (AOB)

FIG. 6 shows an exemplary structure of the AOB. The AOB is part of an MPEG2 stream and includes a still picture cell including a still picture pack, a silent cell including an audio pack including substantially silent audio data, and an audio cell including an audio pack of audio data forming a tune. The AOB includes one or more audio cells and may not include a still picture cell or a silent cell. Still picture cells are never continuous with each other and silent cells are never continuous with each other. A still picture cell is always followed by a silent cell or an audio cell. A silent cell is always followed by an audio cell. In the example shown in FIG. 6, audio cells and silent cells exist and are physically continuous. Time information is also continuous; i.e., the "program physical allocation information" has a value representing "continue", and the "program time attribute information" also has a value representing "continue".

In FIG. 6, the line passing through points B, C, E, F and G represents a change in the value of the time information (i.e., PTS) of the AOB. Point A represents a value of the PTS of the still picture cell. Point B represents a value of the first PTS of a silent cell. Point C represents a value of the first PTS of an audio cell. Thus, the PTS of a silent cell is continuous to the PTS of an audio cell, and there is no data underflow gap, as referred to with respect to the MPEG2 stream, between the silent cell and the audio cell. Point B, at which the value of the PTS of the silent cell is larger than the value of the PTS of the still picture cell, represents that a still picture in the still picture cell is displayed before the reproduction of the silent cell starts. The PTS of the next still picture cell is represented by point D, and the PTS of the next silent cell is represented by point E. In the case where the PTS of the still picture cell and the PTS of the silent cell have an equal value, the reproduction of the silent cell starts simultaneously when the still picture is displayed. The difference between the first PTS of the next audio cell at point F and the final PTS of the audio cell at point D is "audio pause time period". Since the gap between the PTS's needs to be 0.7 seconds or less as specified by MPEG2, the difference at point B between the first PTS of the silent cell and the PTS of the still picture cell, and the difference at point D between the first PTS of the still picture cell and the final PTS of the audio cell need to fulfill such a condition.

Figure 9:
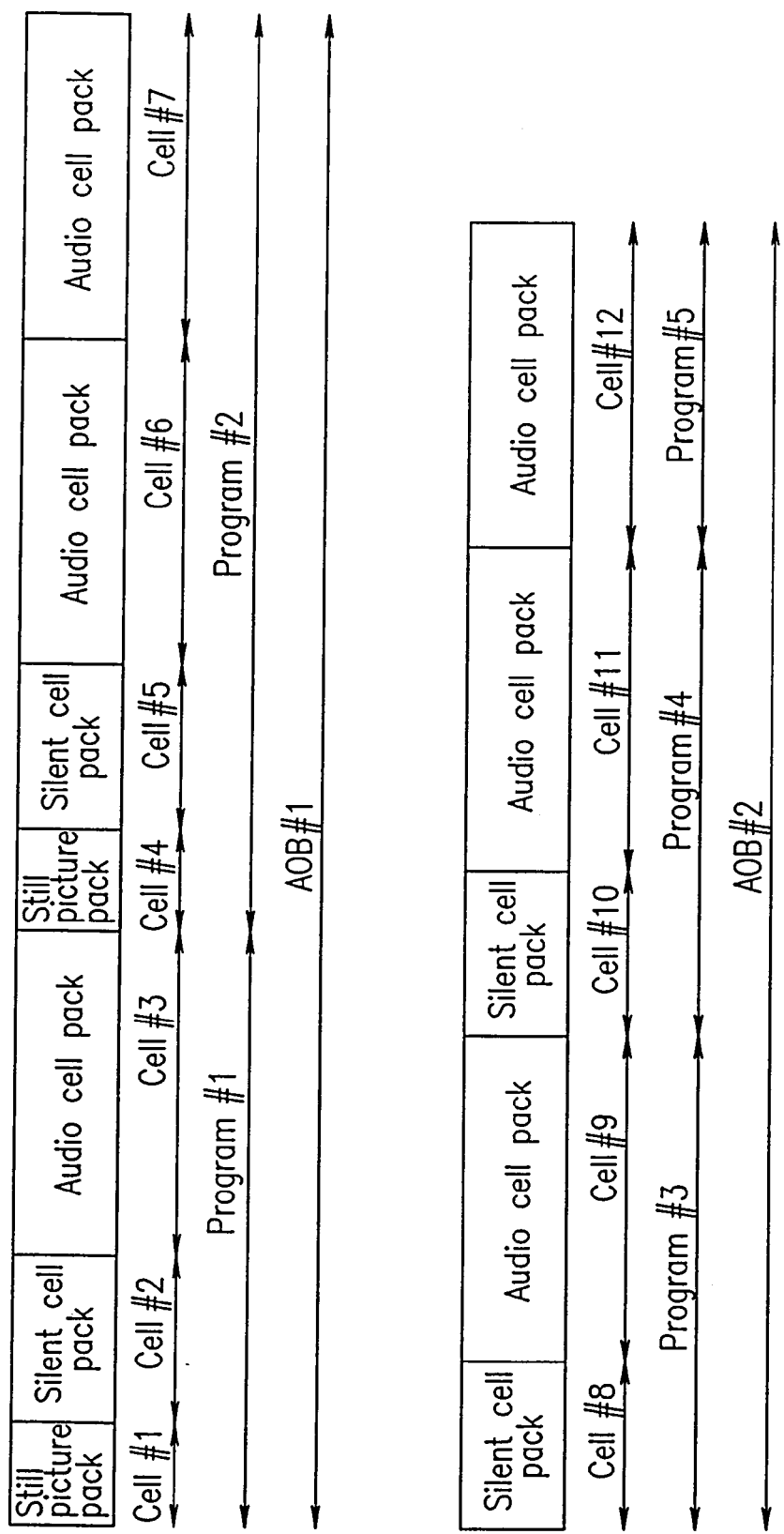
FIG. 9 shows an example of PGC forming a title.

FIG. 9 shows an exemplary PGC forming a title. The example shown in FIG. 9 includes five programs. Programs #1 and #2 correspond to AOB #1, and programs #3, #4 and #5 correspond to AOB #2. On the information storing medium, AOB #1 is recorded after AOB #2. Programs #1 and #2 both include a still picture cell and a silent cell, and program #2 includes two audio cells. Programs #3 and #4 includes only a silent cell, and program #5 includes only an audio cell.

In the case where all the audio cells each have a reproduction time period of 60 seconds (5,400,000 in PTS), all the silent cells each have a reproduction time period of 1 second (90,000 in PTS), and the PTS of the still picture cell has the same value as that of the first PTS of the silent cell, program information can be described as shown in FIG. 10. Under the conditions that the size of the still picture data is about 1.88 Mbits and the audio data is 48 kHz, 16 bit sampling with 2 channels, the number of the still picture packs is 112, the number of the silent cell packs is 96, and the number of the audio cell packs is 5760 as shown in FIG. 11.

The audio title set has been described. Next, with reference to FIG. 4, the audio manager will be described.

(3.2) Data Structure of the Audio Manager 900

The audio manager 900 is information for controlling the reproduction which is to be first referred to for performing audio-oriented reproduction of the information on the optical disk by a reproduction apparatus.

Figure 4:
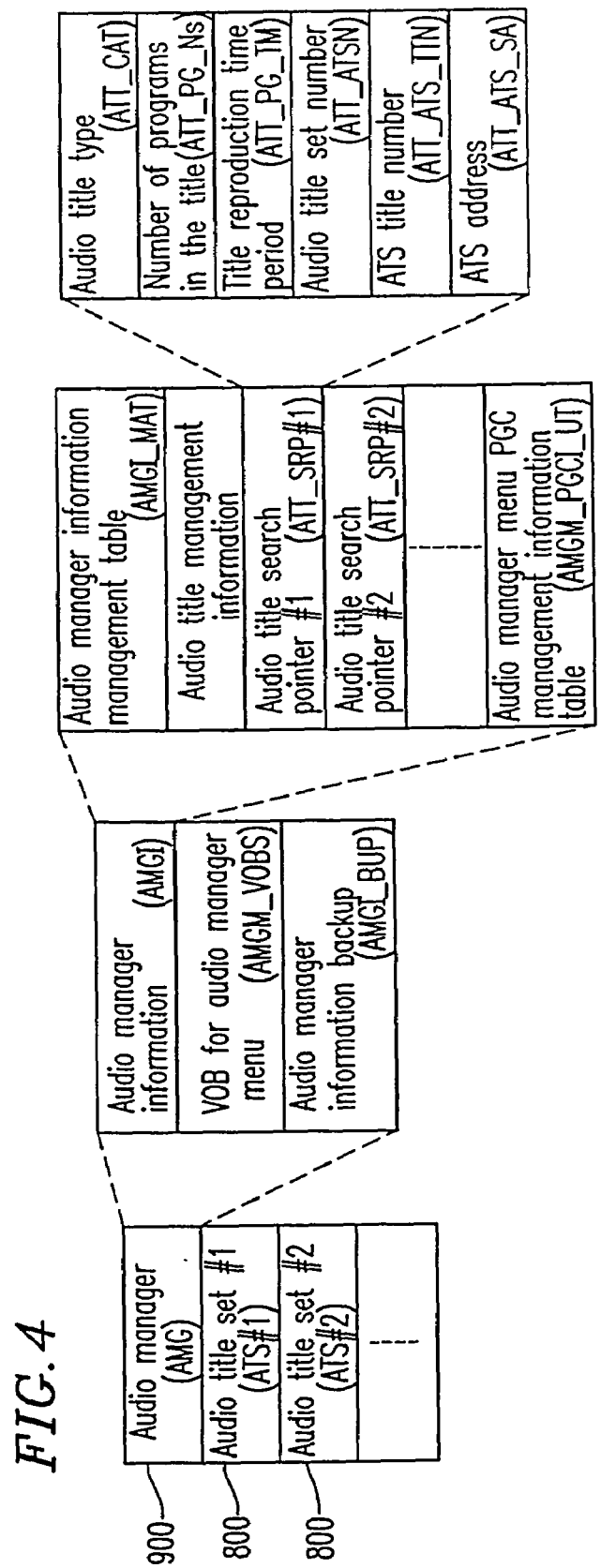
FIG. 4 shows a data structure of an audio manager.

FIG. 4 shows a data structure of the audio manager 900.

The audio manager 900 includes "audio manager information (AMGI)", "VOB for audio manager menu (AMGM_VOBS)", and "audio manager information backup (AMGI_BUP)".

The "audio manager information (AMGI)" includes "audio manager information management table (AMGI_MAT)" including attribute information and pointer information, "audio title management information" indicating the number of audio titles and the like, "audio title search pointer (ATT_SRP)" indicating search information on the audio titles, and "audio manager menu PGC management information table (AMGM_PGCI_UT)" indicating PGC information for audio manager menu.

Each "audio title search pointer (ATT_SRP)" includes "audio title type" indicating the type of each title, "number of programs in the titles" indicating the number of programs included in the titles, "title reproduction time period" indicating the reproduction time period of the titles, "ATS number" indicating the set number of the ATS to which each title belongs, "ATS title number" indicating the title number of each title in the ATS, and "ATS address" indicating the address of the ATS to which each title belongs.

The audio zone region and the DVD as a multimedia optical disk have been described. Next, a reproduction apparatus according to the present invention will be described.

Figure 19:
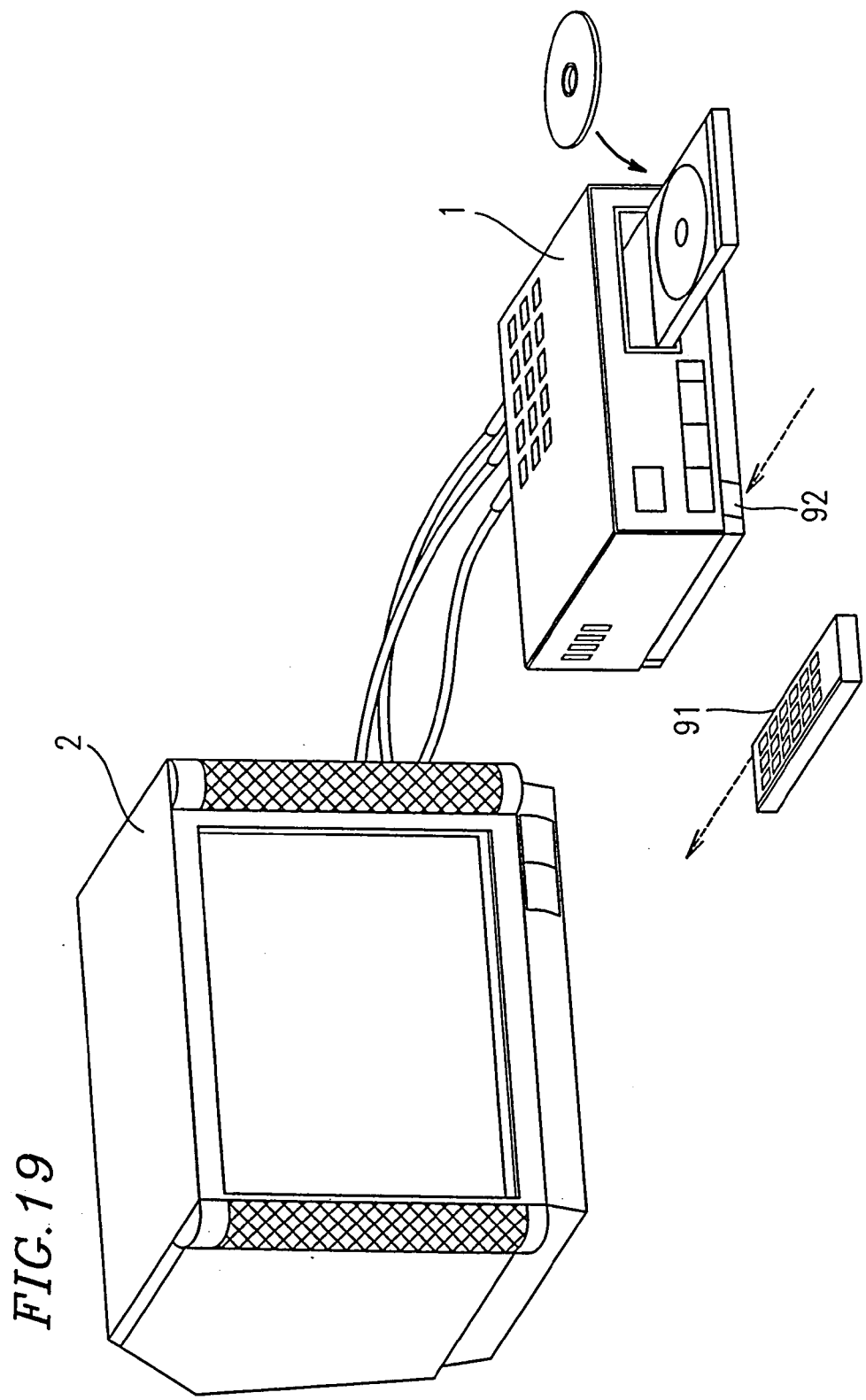
FIG. 19 is a DVD player and peripheral devices connected thereto.

First, an external appearance of a DVD player, which is a reproduction apparatus for multimedia optical disks will be described. FIG. 19 shows external appearances of a DVD player 1, a TV monitor 2 and a remote controller 91.

The DVD player 1 has an opening in a front face of a chassis thereof, and includes a driving mechanism for loading an optical disk in the depth direction of the opening.

Provided on the front face of the DVD player 1 is a remote control receiving section 92 having a light receiving element for receiving infrared rays emitted by the remote controller 91. When an operator uses a remote controller held in his/her hand, the remote control receiving section 92 sends an interrupt signal indicating that a key signal has been received.

Provided on a rear face of the DVD player 1 are video and audio output terminals. A video signal reproduced from the DVD can be output to the large TV monitor 2 for home use by connecting an AV cord to the video and audio output terminals. Thus, the operator can enjoy the video reproduced from the DVD on a large TV of, for example, 33 inches or 35 inches. As can be appreciated from the above description, the DVD player 1 in this example is not used in the state of being connected to a personal computer but is used with the TV monitor 2 as an electronic appliance for home use.

Figure 20:
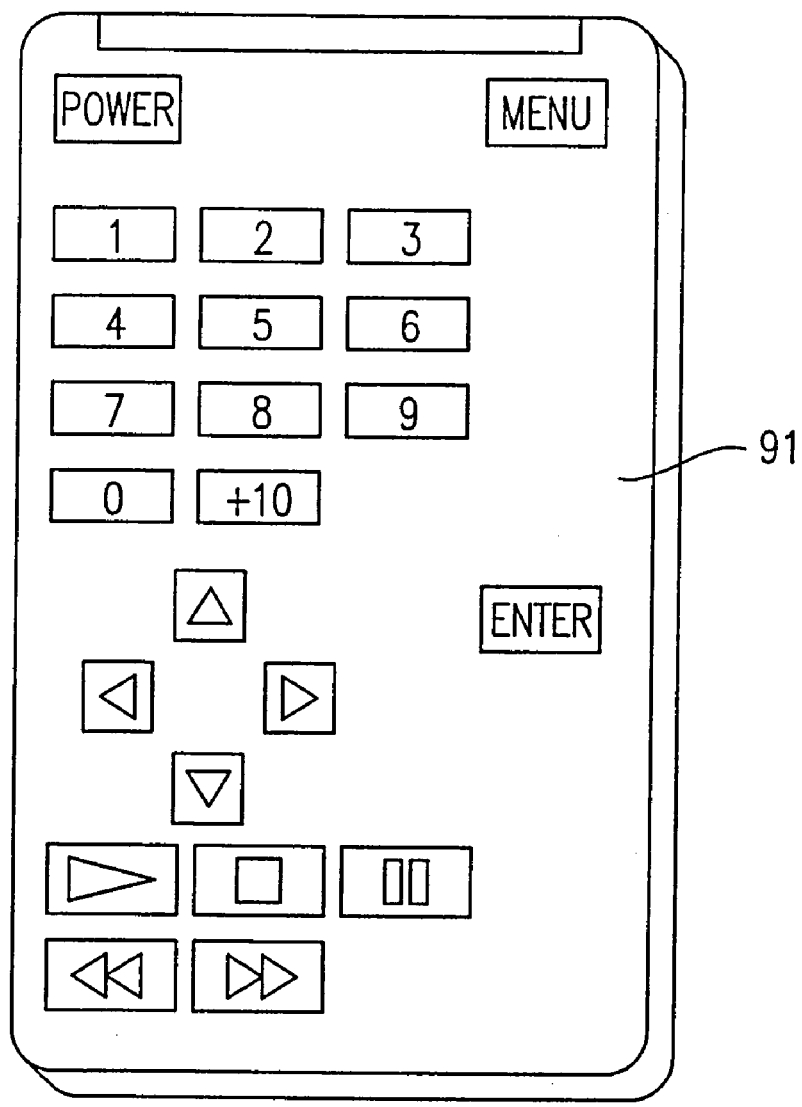
FIG. 20 shows a remote controller used for operating the DVD player.
Figure 21:
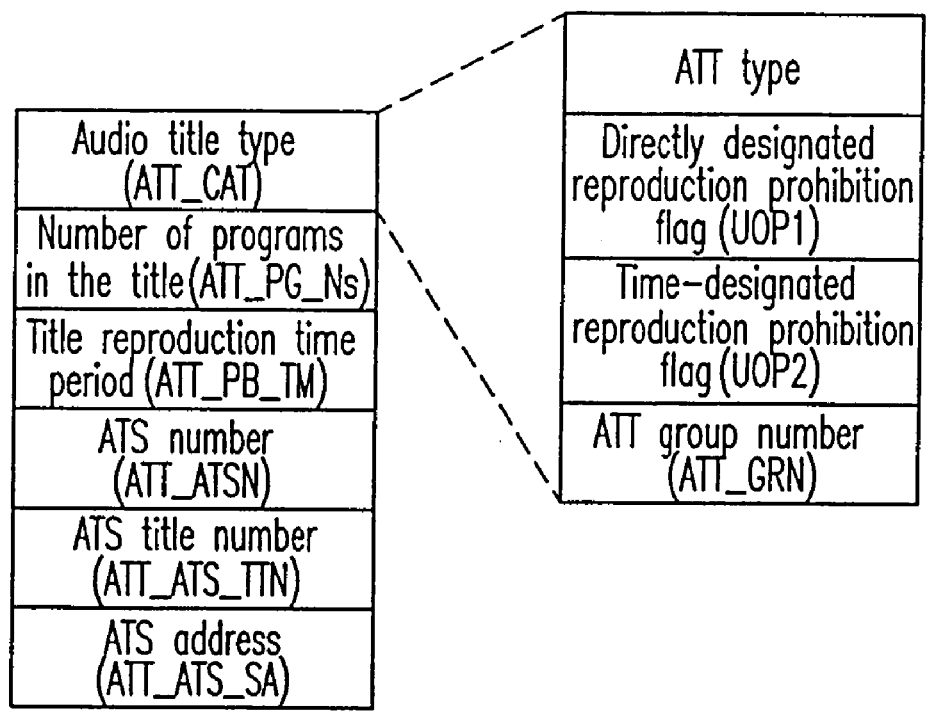
FIG. 21 shows a logical structure of a DVD as a multimedia optical disk in a second example according to the present invention.

The remote controller 91 includes a spring-loaded keypad on a surface of a casing thereof, and outputs a code corresponding to a pressed key by infrared rays. FIG. 20 shows an operation panel of the remote controller 91. The "POWER" key on the operation panel is for turning the DVD player 1 ON or OFF. The "MENU" key is used for retrieving the volume menu of the optical disk during reproduction of the program chain. Ten keys are used for, for example, chapter-jumping the movie or selecting music tunes. Upward, downward, leftward and rightward cursor keys are used for selecting items. The "ENTER" key is used for confirming an item selected by the cursor. When the cursor is moved on items by the upward, downward, leftward and rightward cursor keys, the item on which the cursor is positioned is displayed with a select color of item color information of the management information pack. When the item is confirmed by the "ENTER" key, the item is displayed with a confirmation color. In addition, there are keys which are common with other AV apparatuses such as, for example, "PLAY", "STOP", "PAUSE", "FORWARD" and "REWIND" keys.

Next, the structure of the DVD player, which is a reproduction apparatus for multimedia optical disks will be described.

Figure 8:
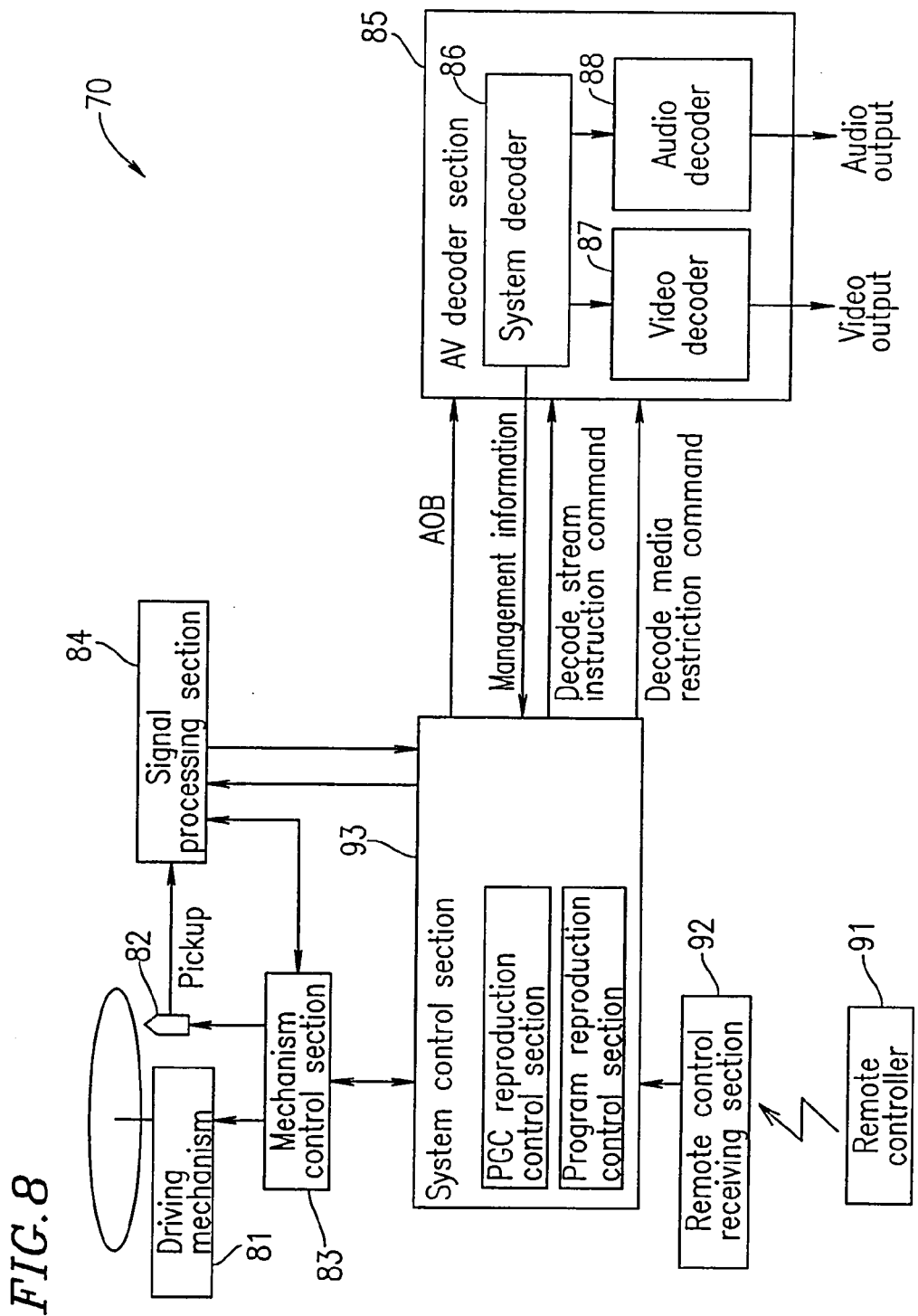
FIG. 8 is a block diagram showing an internal structure of a DVD player, which is a reproduction apparatus.

FIG. 8 is a block diagram of an internal structure of a DVD player 70. The DVD player 70 includes a driving mechanism 81, an optical pickup 82, a mechanism control section 83, a signal processing section 84, an AV decoder section 85, a remote control receiving section 92 and a system control section 93.

The driving mechanism 81 includes a table on which an optical disk is set and a spindle motor for clamping and rotating the optical disk which is set on the table. The table is structured to be moved in and out of the chassis by an eject mechanism not shown. When the table is out of the chassis, the operator sets an optical disk onto the table. When the optical disk is set on the table and the table is moved back into the chassis, the optical disk is loaded on the DVD player 70.

The mechanism control section 83 controls a mechanical system including the motor for driving the disk and the optical pickup 82 for reading a signal recorded on the disk. Specifically, the mechanism control section 83 adjusts the motor speed in accordance with the position of the track indicated by the system control section 93. The mechanism control section 83 also controls an actuator of the optical pickup 82 to move the optical pickup 82. When an accurate track is detected by servo control, the mechanism control section 83 instructs the optical disk to wait until a desired physical sector on the rotating optical disk reaches the position of the optical pickup 82. Then, signals are continuously read from the desired position.

The signal processing section 84 processes the signal read from the optical pickup 82 with, for example, amplification, waveform shaping, binarization, demodulation, and error correction to convert the signal into a digital data stream, and then stores the resultant data stream in a buffer memory in the system control section 93 (described below) on a logical block-by-logical block basis.

The AV decoder section 85 processes the digital data, which is an input VOB, in a prescribed manner to convert the data into a video signal or an audio signal. Specifically, the AV decoder section 85 includes a system decoder 86, a video decoder 87 and an audio decoder 88.

The system decoder 86 receives the digital data stream transferred from the buffer memory on a logical block-by-logical block basis (i.e., on a packet-by-packet basis) and distinguishes a stream ID and a sub stream ID in the header of each packet, thereby classifying the data into a moving picture data pack, an audio data pack and a management information pack. At this point, the moving picture data pack is output to the video decoder 87. Regarding the audio data pack, only an audio data pack having a designated stream number is output to the audio decoder 88 in accordance with a decode stream instruction command sent from the system control section 93. The management information pack is output to the system control section 93. The moving picture data pack input to the video decoder 87 is extended by the prescribed format defined by the MPEG2 format and output as digital video data. Then, the digital video data is converted into a video signal of the NTSC format and externally output. The audio data input to the audio decoder 88 is decoded in the LPCM or AC3 format in accordance with the data type, D/A converted, and then externally output as an audio signal.

The audio decoder 88 processes the digital data, which is an input AOB, in a prescribed manner in accordance with the data type, converts the data into an audio signal, and externally outputs the data.

The system control section 93 includes a working memory and a CPU integrated together and performs the overall control of the DVD player 70.

The reproduction apparatus according to the present invention operates in, for example, the following manner.

When a DVD is loaded in the DVD player 70, the system control section 93 detects that a DVD is loaded from the optical sensor or the like. Then, the system control section 93 controls the mechanism control section 83 and the signal processing section 84, thereby controlling rotation of the DVD so as to cause the optical pickup 82 to seek to the lead-in region. Thus, the DVD player 70 is initialized and reproduction starts.

For starting the reproduction, the system control section 93 determines whether or not the DVD player 70 is in a video-oriented reproduction mode, by a reproduction mode determination section. When it is determined that the DVD player 70 is in the video-oriented reproduction mode, the system control section 93 reads the video manager based on the information which is read from the volume file management region. The system control section 93 refers to the PGC management information table for the video manager menu to calculate the recording address of the PGC for the volume menu. The resultant PGC is reproduced and retained inside. When the PGC for the volume menu is retained inside, the system control section 93 refers to the retained PGC information to calculate the video object (VOB) to be reproduced and the recording address of the VOB on the optical disk. When the VOB to be reproduced is determined, the system control section 93 outputs a control signal to the mechanism control section 83 and the signal processing section 84 so as to retrieve the determined VOB from the DVD for reproduction. Thus, the video menu from which the user can select the title to be reproduced is displayed.

The user sees the menu and selects and confirms the title that he/she is interested in by designating the item number in the menu using the remote controller. Then, the system control section 93 receives the designation of the item number in the menu from the remote controller and refers to the management information pack included in the VOB of the video menu which is being reproduced, the VOB being input from the AV decoder section 85, to execute a control command corresponding to the designated number. The control command is PlayTitle #n or the like, and the title number to be reproduced is designated by "n". As an execution operation by the PlayTitle command, the system control section 93 refers to the title search pointer table, which is a part of the audio manager, to determine the audio title set (ATS) to which the designated title belongs to and the title number in the ATS. When the ATS is confirmed, the system control section 93 outputs a control signal to the mechanism control section 83 and the signal processing section 84 so as to reproduce the ATS management information of the confirmed title set and retrieves the title search pointer table of the ATS, which is a part of the ATS management information, to the system control section 93. When the title search pointer table is retrieved, the system control section 93 refers to the table to determine the PGC information for starting the reproduction of the title to be reproduced. When the PGC information is determined, the system control section 93 outputs a control signal to the mechanism control section 83 and the signal processing section 84 so as to reproduce the determined PGC information and retain the information in the inside buffer memory for the PGC information. When the PGC information is retained, the system control section 93 refers to the retained PGC information to determine the audio object (AOB) to be reproduced and the recording address thereof. Then, the AOB is reproduced by a control signal output to the mechanism control section 83 and the signal processing section 84 from the system control section 93.

The system control section 93 sequentially determines the AOBs to be reproduced and controls the reproduction thereof in accordance with the retained PGC information. When the reproduction of the final AOB indicated by the PGC information is completed, the system control section 93 searches for the PGC information of the next title and reproduces the AOBs described in the PGC information in the same manner. Thus, all the titles are reproduced and the operation is stopped. In accordance with specific setting of the DVD player or the DVD, only one title can be reproduced before the operation is stopped, or a menu can be displayed after reproduction of one or more titles is completed.

Next, a method for reproducing a still picture cell, a silent cell and an audio cell will be described in detail.

Figure 14:
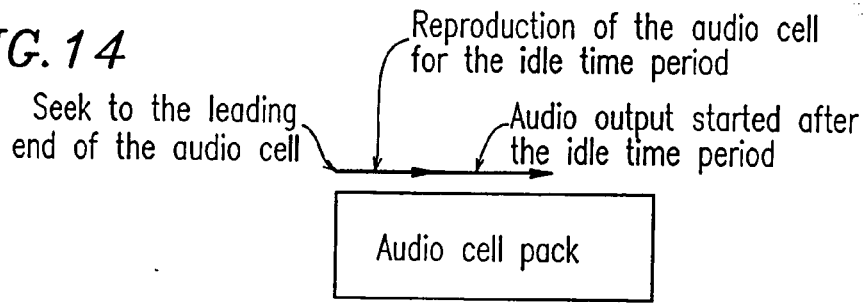
FIG. 14 shows a conventional process for reproducing audio data.
Figure 15:
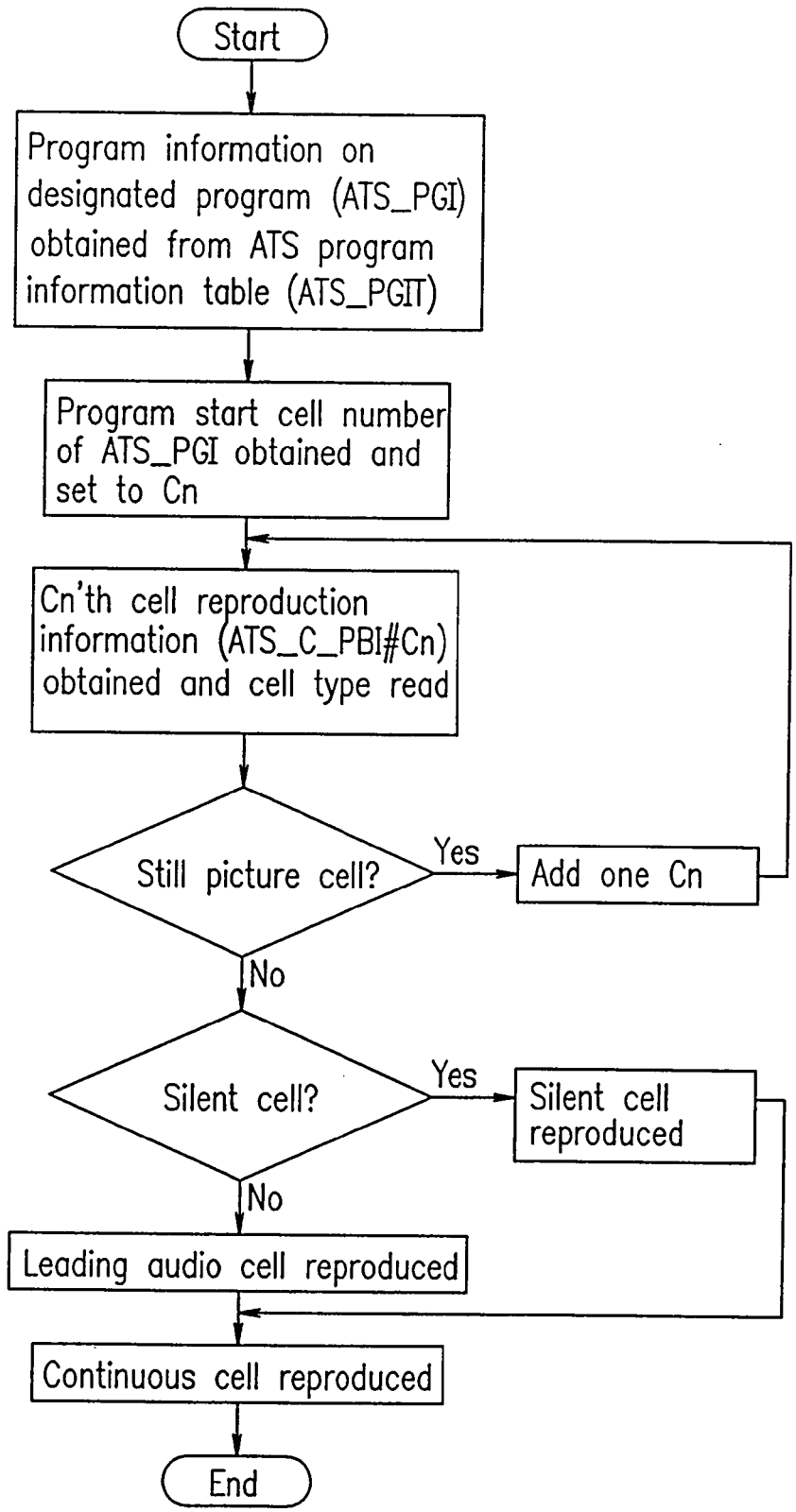
FIG. 15 shows a schematic flow for reproducing a program.
Figure 16:
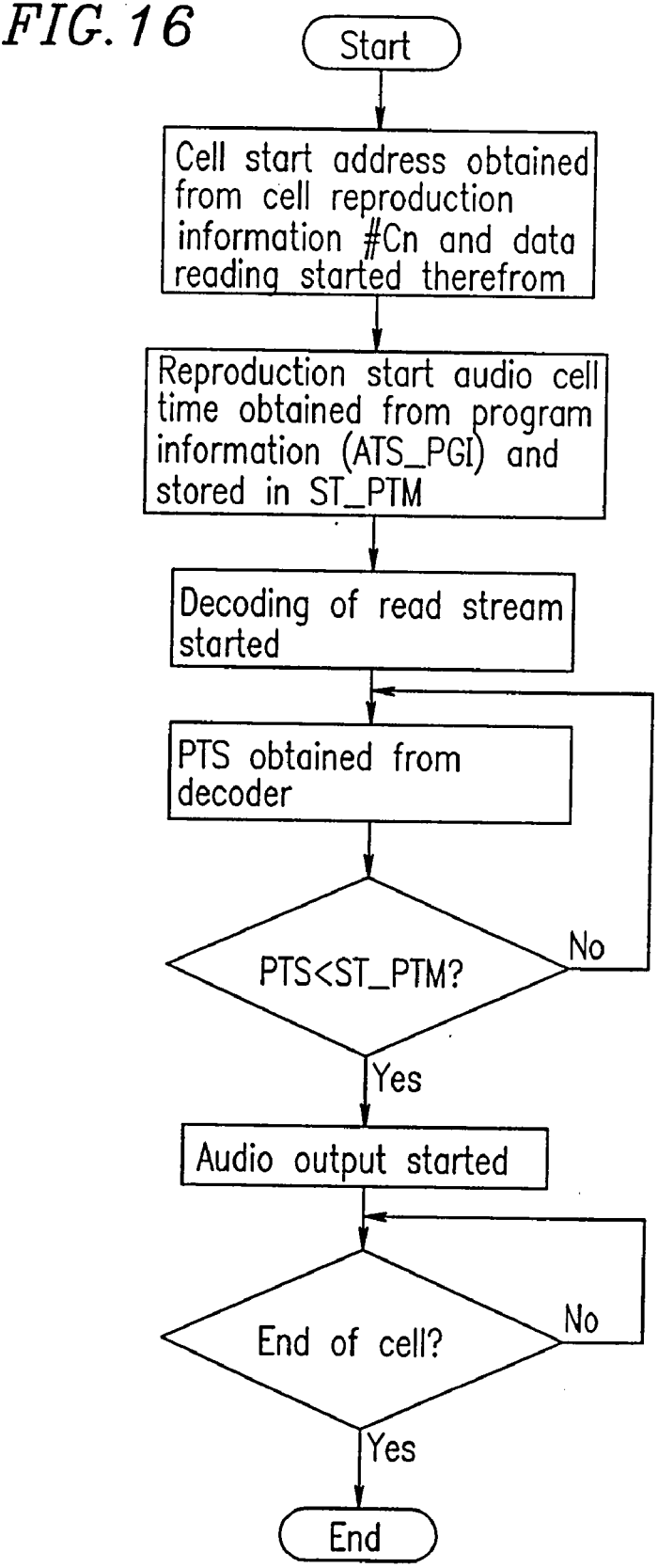
FIG. 16 shows a schematic flow for reproducing a leading audio cell.
Figure 17:
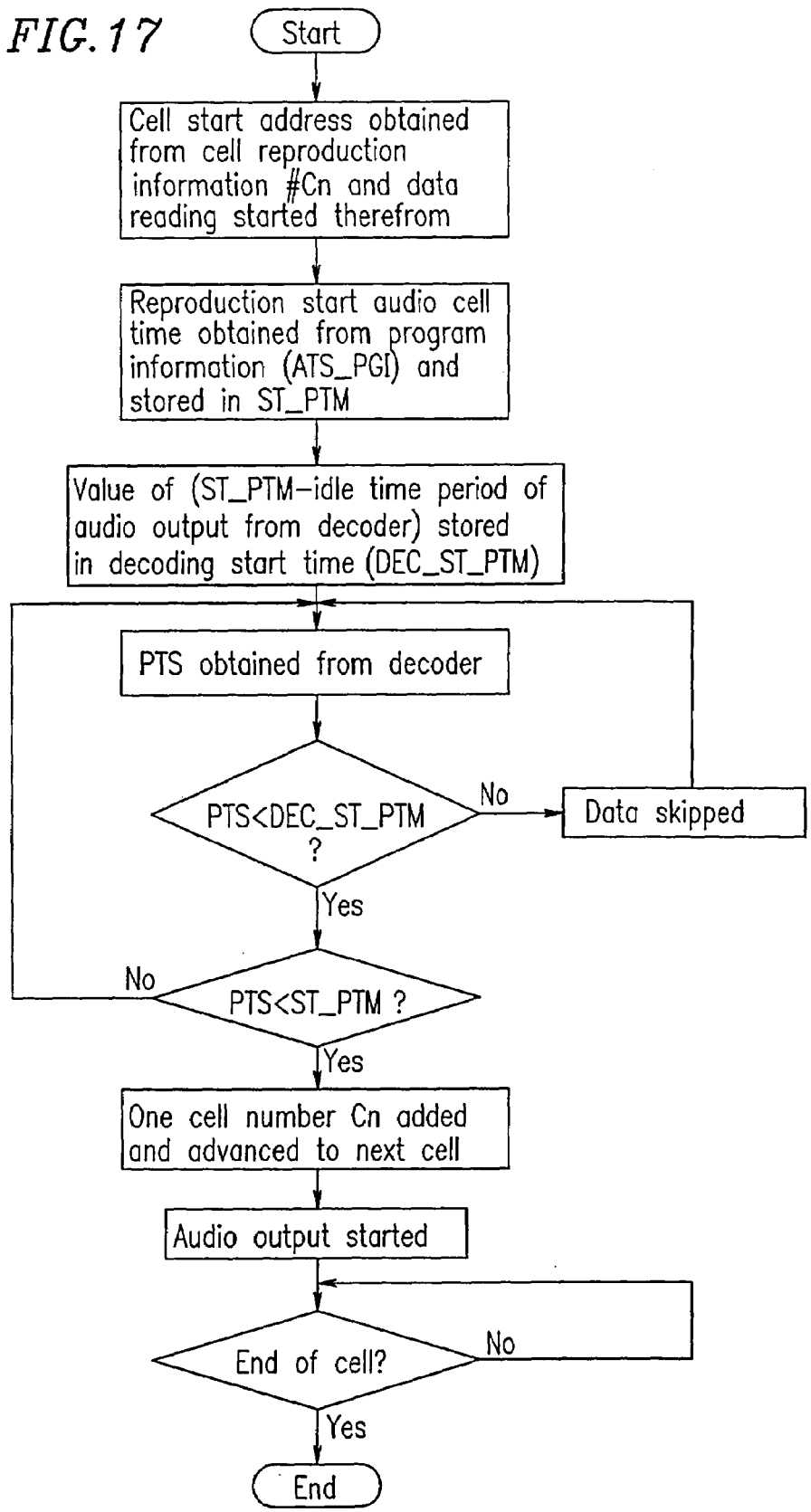
FIG. 17 shows a flow for reproducing a silent cell.
Figure 18:
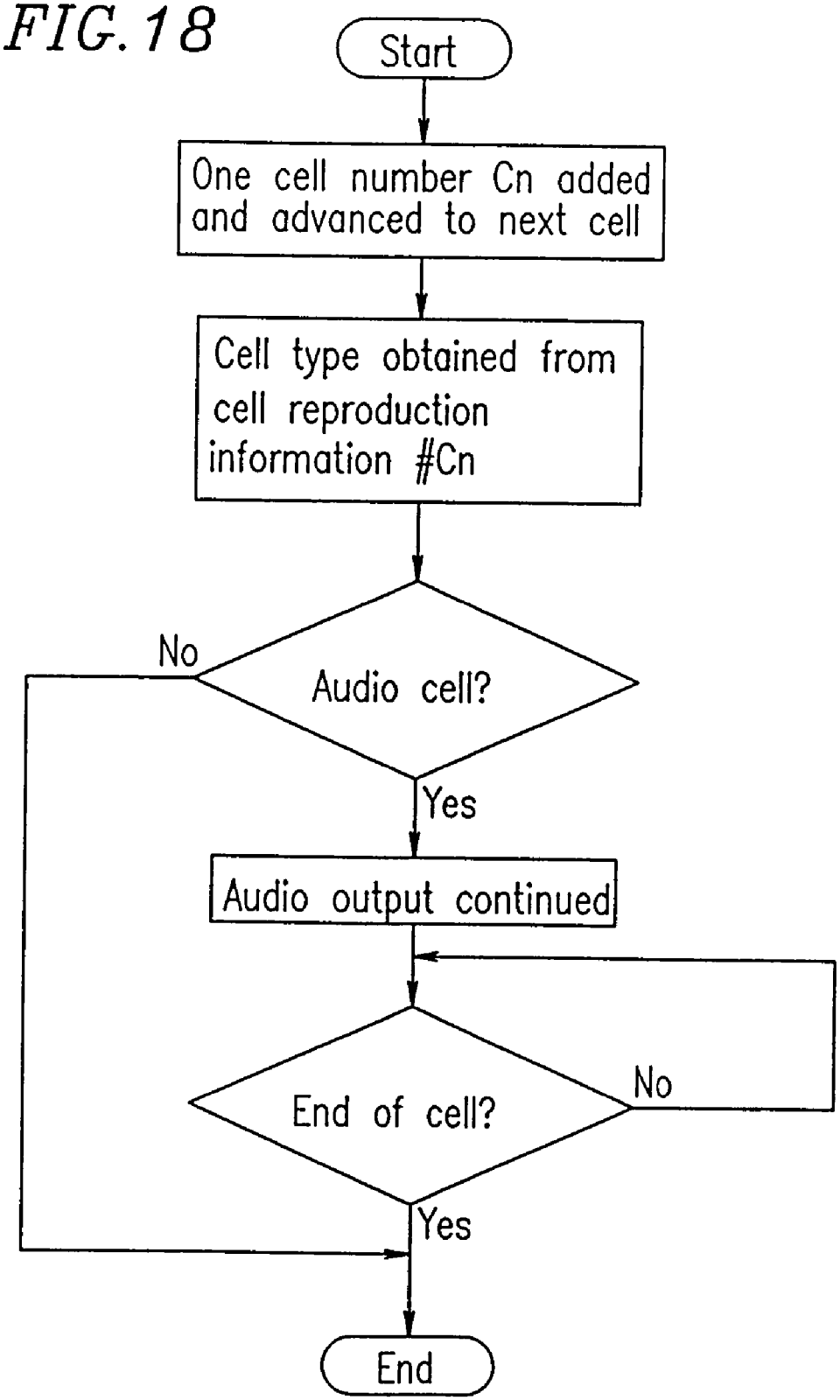
FIG. 18 shows a flow for reproducing a continuously reproduced cell.

FIG. 14 shows a conventional method for reproducing the audio cell. Conventionally, for reproducing an MPEG2 stream, the leading end of the audio cell pack is first sought and data reading starts. However, audio output does not immediately start but starts after an idle time period, which is predetermined in each reproduction apparatus. The idle time period includes a time period required for determining the PTS of the audio data, a time period required for determining that data is correct, and a time period required for the muting circuit in an analog output section to be transitioned from a mute state to a non-mute state. Thus, the idle time period varies in accordance with the type of reproduction apparatus. Especially when the reproduction section and the decoder are accommodated in separate chassis, the idle time period tends to be extended because determination on the PTS and the determination on the correctness of the audio data are separately performed.

Figure 12A:
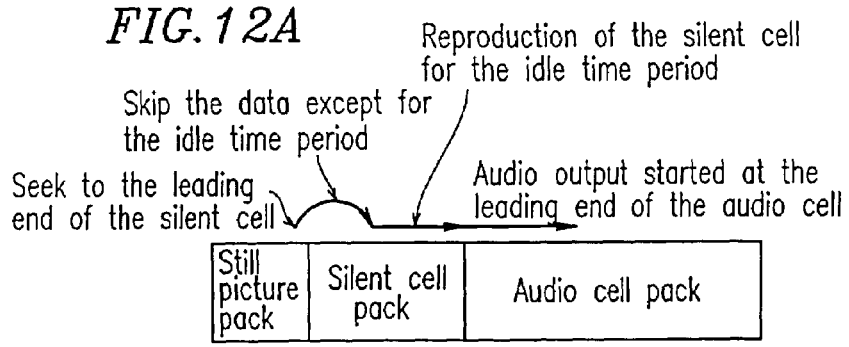
FIG. 12A shows a process for reproducing audio data without displaying a still picture.
Figure 12B:
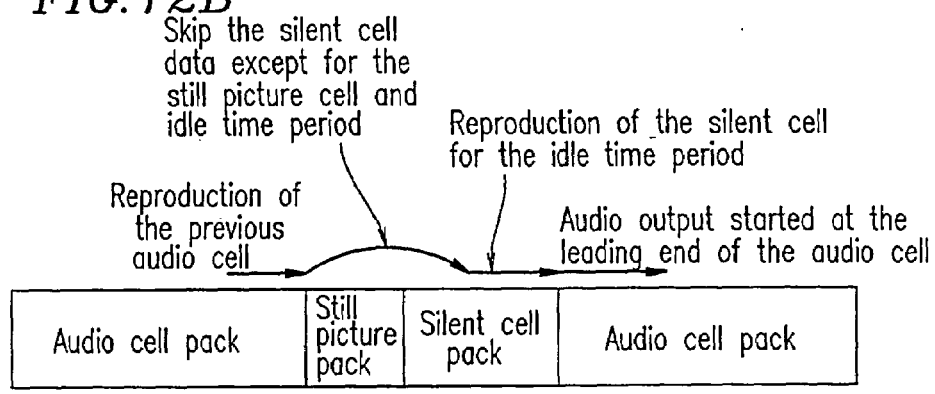
FIG. 12B shows a process for reproducing audio data without displaying a still picture.

FIGS. 12A and 12B show methods for reproducing only audio data without displaying a still picture even though the still picture is included. FIG. 12A shows the method in the case where the reproduction is performed from the leading end of the data, and FIG. 12B shows the method in the case where the reproduction is performed in continuation from the previous cell.

In the case where reproduction is performed from the leading end of the data by selecting a title or program from the menu or the like through jumping, the leading pack of the silent cell is jumped to with reference to the start address of the cell information. At this point, the STC, which is the reference time of the decoder is set with the SCR of the leading pack of the silent cell. Next, skipping and jumping of data corresponding to a prescribed idle time period are performed with reference to the PTS of the silent cell, and the silent cell for the idle time period is reproduced. Audio output is prepared for during this period. At this point, the next title number is not displayed on the display device of the reproduction apparatus, and the passage of reproduction time period is not updated. In the case where the audio output is started and display of the title number and the updating of the passage of the reproduction time period are performed simultaneously when the first PTS of the leading cell is detected, the reproduction apparatus behaves as if the audio data is output simultaneously with the completion of the jump such as menu selection. In the case where the reproduction is performed in continuation from the previous cell, a still picture pack is jumped over and a silent cell is jumped over or skipped except for the idle time period. At this point, by continuously counting the STC, which is reference for the system time, the interval between the completion of the audio output by the previous cell and the start of the audio output by the next cell equals the audio pause time period. The counting of the STC is continued when the physical allocation information and the time attribute information both have a value indicating "continue". When either one of them indicates "no-continue", the same processing as in the jump from the menu is performed, and thus the STC is reset at the leading end of the silent cell pack. Even in the case where there is no still picture cell, the method is substantially the same as described above. In the case where there is no silent cell and the reproduction starts from the leading end of the data, the operation is similar to the conventional operation shown in FIG. 14. In the case where the reproduction is performed in continuation from the previous cell, the operation is as follows. When the time attribute information indicates "continue", the audio cell is decoded continuously from the previous cell and audio data is output. When the time attribute information indicates "no-continue", the operation is the same as the conventional operation shown in FIG. 14 as in the case where the reproduction is performed from the leading end of the data.

Figure 13A:
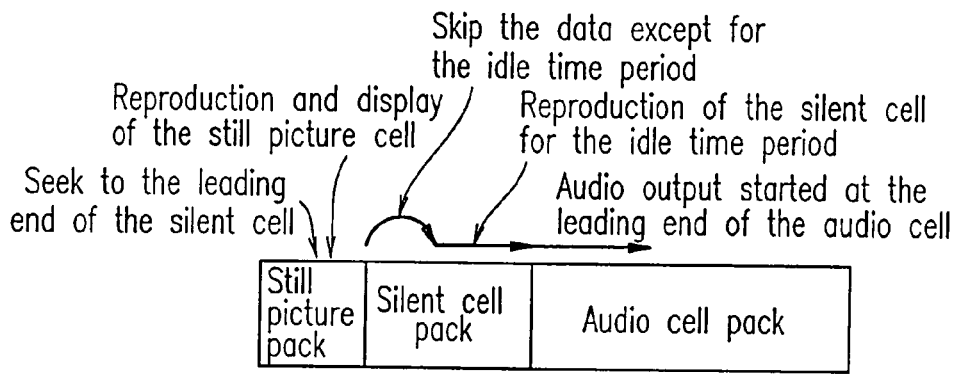
FIG. 13A shows a process for reproducing audio data while displaying a still picture.
Figure 13B:
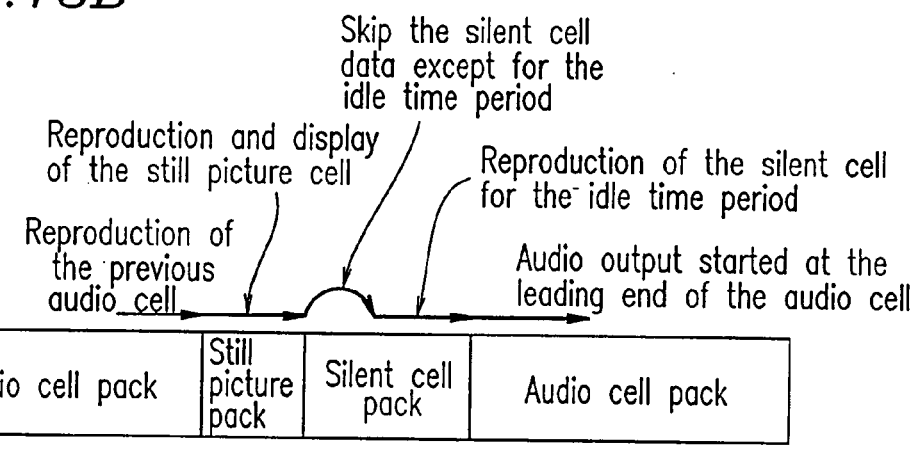
FIG. 13B shows a process for reproducing audio data while displaying a still picture.

FIGS. 13A and 13B show methods for reproducing the audio data while displaying a still picture. FIG. 13A shows the method in the case where the reproduction is performed from the leading end of the data, and FIG. 13B shows the method in the case where the reproduction is performed in continuation from the previous cell.

In the case where the reproduction is performed from the leading end of the data or by selecting a title or program from the menu or the like through jumping, the pack of the still picture cell is sought from the cell information. Thus, the still picture cell is read and decoded. At this point, the STC, which is the reference time of the decoder, is set with the SCR of the leading pack of the still picture cell. Next, the leading pack of the silent cell is read. When an STC reaches an STC of the still picture cell, the still picture is displayed. The rest of the operation is the same as the operation when there is no still picture. The display of the still picture can be during the processing of the silent cell, simultaneously with the start of output of the audio cell, or after the start of output of the audio cell in the range permitted by the MPEG2 format. In the case where the reproduction is performed in continuation from the previous cell, the still picture cell is read and decoded when a still picture pack is detected. Next, the silent cell is processed. Whether or not the STC is set depends on the time attribute information as in the case where there is no still picture cell. The rest of the operation is the same as the operation when no still picture is displayed, except that the still picture is displayed when the STC becomes a PTS of the still picture cell and that the STC is set with the SCR of the leading pack of the still picture cell.

FIGS. 15 through 18 are flowcharts each illustrating a program. In the case where the physical allocation information of the program information shows "continue" and the program previously reproduced has a program number which is smaller by one than the program number of the program to be reproduced now, seek to the reading head for the DVD is not specifically necessary. When the time attribute information indicates "continue" and the reproduction is performed in continuation from the previous program, the STC, which is the reference time for the decoder, does not need to be reset.

The determination of whether or not the cell is a still picture cell can be performed using the cell type in the cell information or using a still picture flag of the program information. The determination of whether or not the cell is a silent cell is performed by the cell type in the cell information. The determination that the cell is the final cell is performed by comparing the termination address of the cell information and the address read from the data in the DVD. The completion of the reproduction of the program can be determined by the cell index of the cell information returning to zero, the cell type indicating a still picture cell or a silent cell, or the start cell number of the next program in the program information.

The skipping of the silent cell is performed while detecting the PTS when the silent cell is decoded or by obtaining the number of packs to be skipped based on the data rate.

As described above, in the first example according to the present invention, program reproduction information including the start time and reproduction time period of each of audio data based on the reproduction start time of the leading audio data in an MPEG2 stream is recorded in the management region as a part of the reproduction control information. Accordingly, a multimedia information storing medium which realizes reproduction of high quality digital audio data and video data added thereto under a restricted bit rate can be provided. The interval between the reproduced audio data can be uniform even in low-cost reproduction apparatuses or reproduction apparatuses having no reproduction function for video data. Thus, title creators can prepare data easily.

EXAMPLE 2

An optical disk, and an apparatus and method for reproducing information from the optical disk in a second example according to the present invention will be described. Identical elements previously discussed in the first example bear identical reference numerals and the descriptions thereof will be omitted.

(1) Physical Structure of the Optical Disk

The physical structure of the optical disk is identical with that described in the first example and thus the description thereof will be omitted.

(2) Logical Structure of the Optical Disk

The logical structure of the optical disk is identical with that described in the first example and thus the description thereof will be omitted.

(3) Data Structure of the Audio Zone Region 32c

The audio zone region 32c stores an audio manager 900 and one or more audio title sets 800 as in the first example. The data structure of the audio manager 900 and the data structure of the audio title sets 800 are different from those in the first example.

(3.1) Data Structure of the Audio Title Set 800

Figure 23:
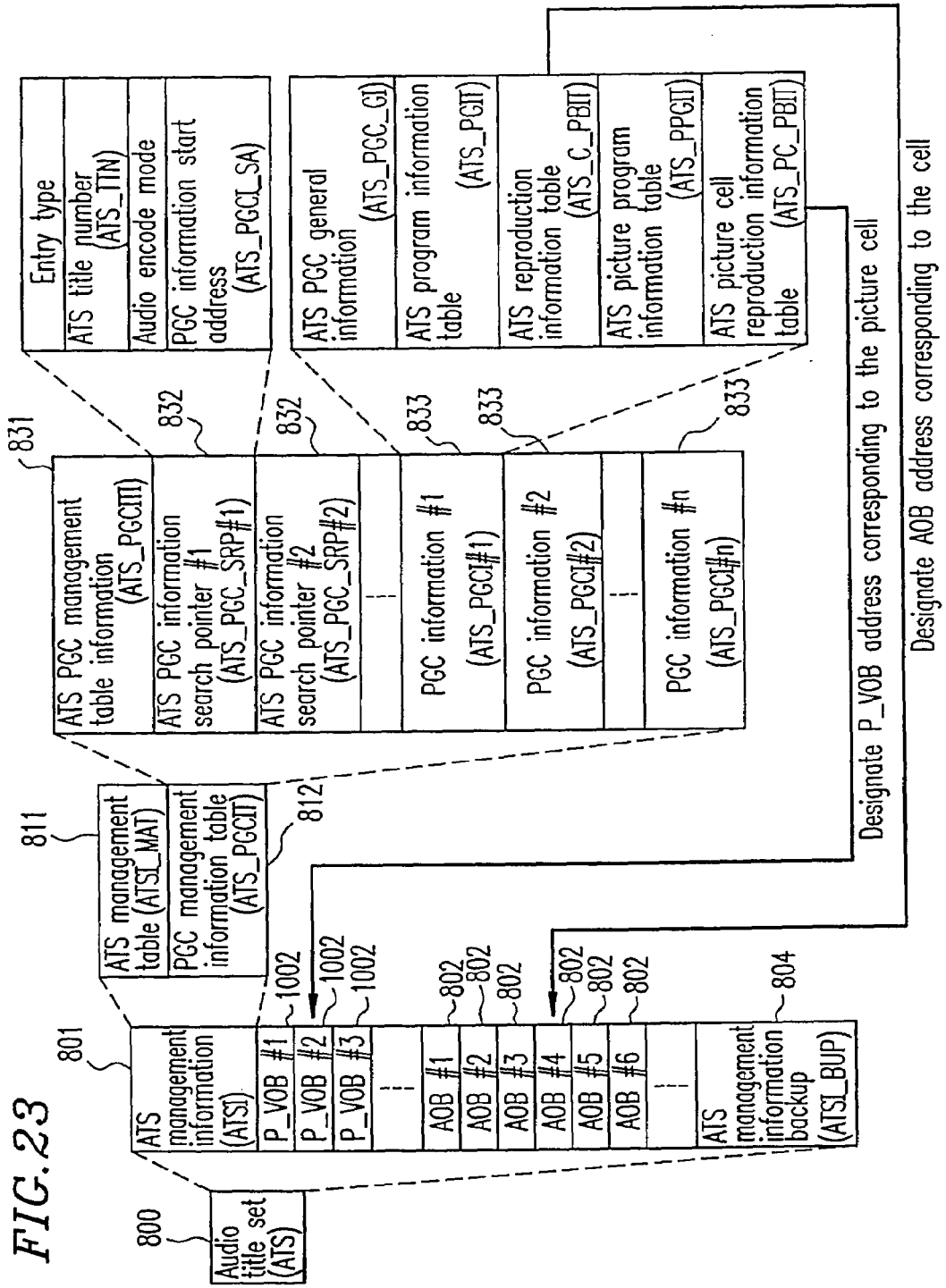
FIG. 23 shows a data structure of an AOB of the DVD in the second example.

FIG. 23 shows a data structure of the audio title set 800 in the second example. The audio title set 800 includes a plurality of audio objects (hereinafter, referred to as "AOBs") 802, a plurality of picture video objects (hereinafter, referred to as "P_VOBs" 1002), audio title set management information (ATSI) 801 for managing the order of reproducing the plurality of AOBs 802 and the plurality of P_VOBs 1002, and audio title set management information backup (ATSI_BUP) 804 which is backup data of the audio title set management information 801. In the following description, an "audio title set" will generally be referred to as an "ATS".

(3.1.1) Data Structure of the AOB 802

The data structure of the AOB 802 of the optical disk is identical with that described in the first example and thus the description thereof will be omitted.

(3.1.2) Data Structure of P_VOB 1002

Figure 31:
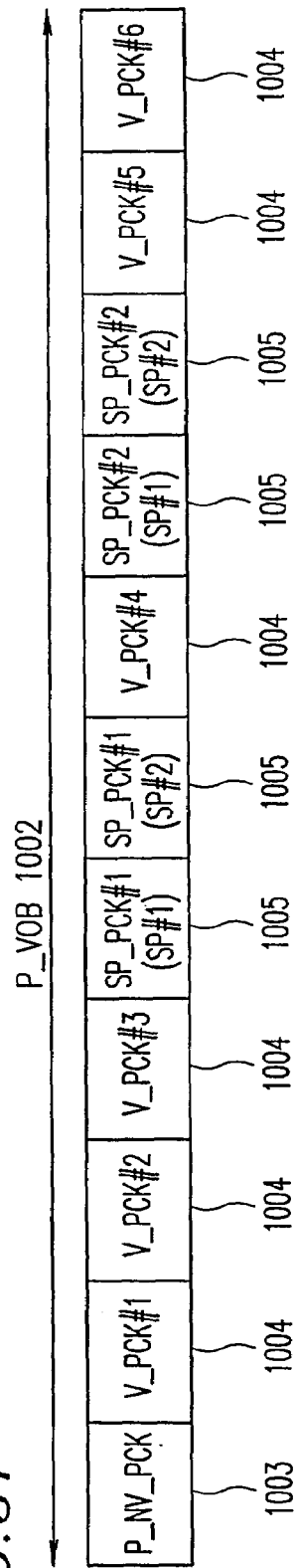
FIG. 31 shows a P_VOB of the DVD in the second example.

FIG. 31 shows a data structure of the P_VOB 1002. The P_VOB 1002 includes a picture NV pack (P_NV_PCK) 1003, a plurality of video packs (V_PCK) 1004, and a plurality of sub-picture packs (SP_PCK) 1005.

Unlike in the case of DVD-Video, the P_VOB 1002 includes one picture video object unit (P_VOBU), and only one picture NV pack (P_NV_PCK) 1003 is included.

The sub-picture packs (SP_PCK) 1005 can each have a plurality of sub-picture streams and has an identification code as in the case of DVD-Video. The sub-picture packs (SP_PCK) 1005 can be omitted.

The P_VOB 1002 does not include audio data, unlike in the case of DVD-Video. The picture NV pack (P_NV_PCK) 1003 includes a P_PCI packet and a P_DSI packet in a similar manner as a PCI packet and a P_DSI packet of DVD-Video.

Figure 41:
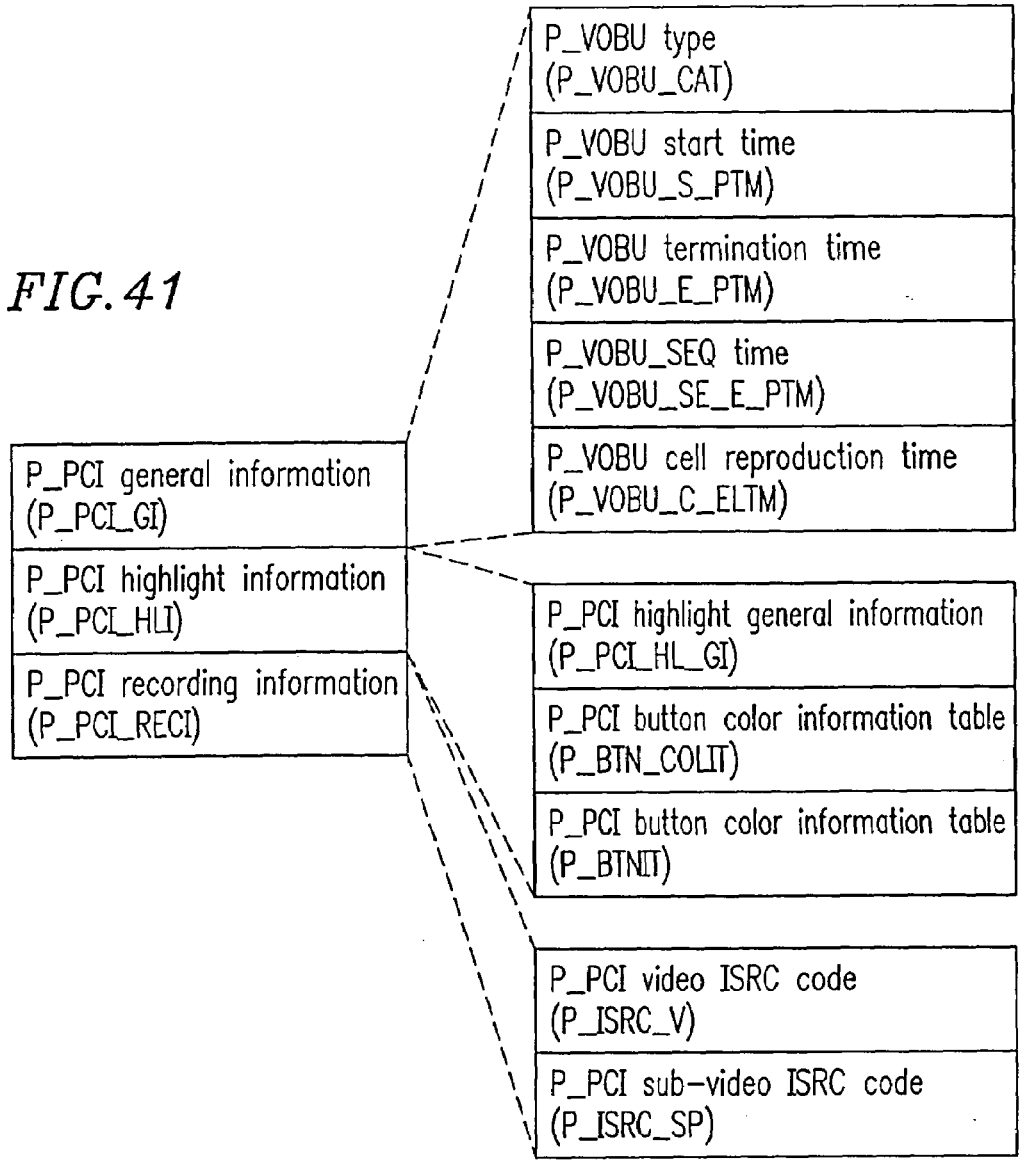
FIG. 41 shows a structure of P_PCI.

As shown in FIG. 41, the P_PCI includes P_VOBU to which the P_PCI belongs to (i.e., attribute information, reproduction time information, highlight information and the like of P_VOB), as in the case of DVD-Video, but does not include address information.

Figure 42:
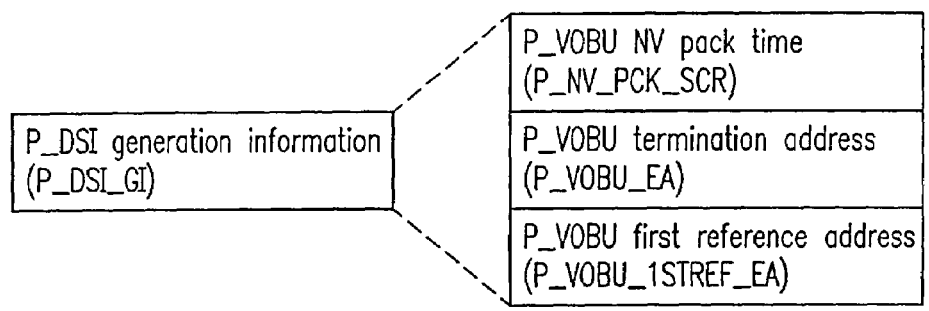
FIG. 42 shows a structure of P_DSI.

As shown in FIG. 42, the P_DSI includes an SCR of the NV_PCK to which the P_DSI belongs, and a termination address of the P_VOBU, i.e., P_VOB to which the P_DSI belongs, and address information of a pack including the final data of the first I picture of the video pack (P_PCK) as in the case of DVD-Video, but does not include other information.

(3.1.3) Data Structure of the Audio Title Set Management Information 801

The audio title set management information (ATSI) 801 includes information for managing the order of reproducing the AOBs 802 and the P_VOB 1002. The order of reproducing the AOBs 802 is designated by a program chain (PGC), as in the case of video objects (VOBs).

The data structure of the audio title set management information 801 is identical with that shown in FIG. 5 except for the data structure of the PGC information 833.

Each of the PGC information units describes positions on the optical disk where one or more audio objects are recorded and the order of reproduction thereof. Reproduction of the same audio object can be described by a different PGC information unit. Specifically, the PGC information includes "ATS PGC general information (ATS_PGC_GI)", "ATS program information table (ATS_PGIT)", "audio cell reproduction information table (ATS_C_PBIT)", "ATS picture program information table (ATS_PPGIT)", and "ATS picture cell reproduction information table (ATS_PC_PBIT)".

Figure 25:
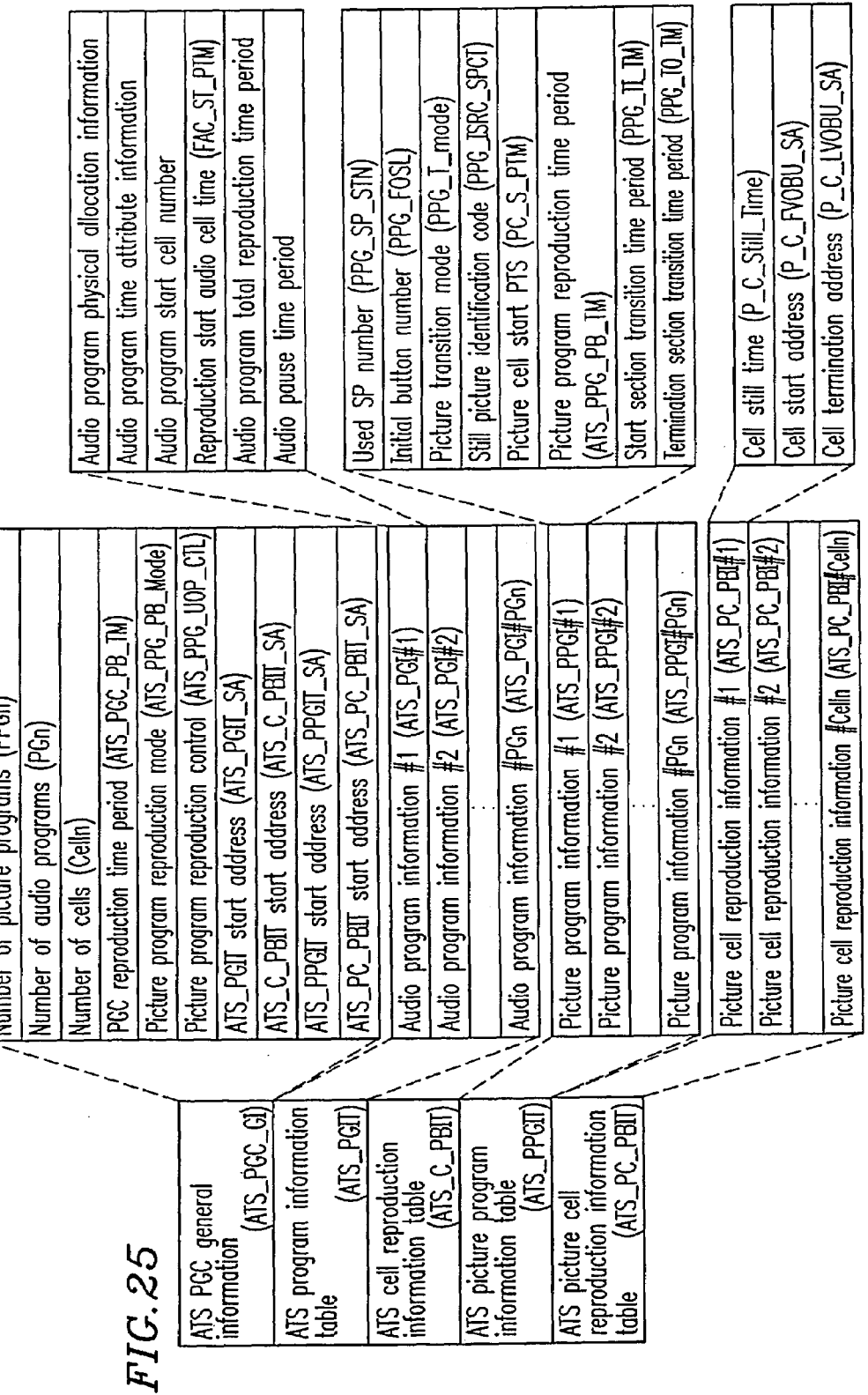
FIG. 25 shows a data structure of PGC information of the DVD in the second example.

FIG. 25 shows a data structure of the PGC information. As shown in FIG. 25, "ATS PGC general information (ATS_PGC_GI)" includes the number of picture programs, the number of audio programs and the number of cells included in the PGC information; the reproduction time period of the PGC; and information on pointers to a picture program reproduction mode, picture program reproduction control, the "ATS program information table (ATS_PGIT)", "audio cell reproduction information table (ATS_C_PBIT)", "ATS picture program information table (ATS_PPGIT)", and "ATS picture cell reproduction information table (ATS_PC_PBIT)".

The "ATS program information table (ATS_PGIT)" includes a plurality "audio program information (ATS_PGI)" units included in the PGC. Each of the plurality of "audio program information (ATS_PGI)" units includes "audio program physical allocation inforamtion" indicating whether or not the AOB of each program and the AOB of the previous program are recorded at physically discontinuous positions on the optical disk, "audio program time attribute information" indicating whether or not the time information of the AOB is continuous with the time information of the previous AOB, "audio program start cell number" indicating the first cell number forming the audio program, "reproduction start audio cell time" indicating the first time information of the first audio cell included in the audio program, "audio program total reproduction time period" indicating the reproduction time period of the audio program, and "audio pause time period" indicating the silent period until the reproduction of the audio cell of the audio program starts.

The "audio cell reproduction information table (ATS_C_PBIT)" stores cell information forming the AOB to be reproduced as in the first example.

The "ATS picture program information table (ATS_PPGIT)" includes a plurality of "ATS picture program information" units. Each ATS picture program information unit includes a used SP number (PPG_SP_STN) describing a stream number of a sub-picture used in the picture program, an initial button number (PPG_FOSL) indicating the number of a button which is in the highlight information used in the picture program and is selected in an initial state, a picture transition mode (PPG_T_mode) indicating a transition mode of a still picture in the program, a still picture identification code (PPG_ISRC_SPCT) indicating an ISRC code of the still picture in the program, a picture cell start PTS (PC_S_PTM) indicating a PTS of a first pack of the picture cell of the program, a picture program reproduction time period (ATS_PPG_PB_TM) which is a reproduction time period of the program, a start section transition time period (PPG_TI_TM) indicating the transition time period at the time of starting the reproduction of the still picture of the program, and a termination section transition time period indicating the transition time period at the time of terminating reproduction of the still picture of the program.

In this example, as the picture transition modes, "no transition", "fading from black", "fading into black", "cross-fading", and "wiping in several directions" are assumed. Each of the programs includes one cell. Since each cell has an independent P_VOB, the reproduction time period of the picture program is a 1-frame time period.

The "ATS picture cell reproduction information table (ATS_PC_PBIT)" includes a cell still time period (P_C_Still_Time) indicating a continuous time period during which the picture cell is displayed, a start address (P_C_FVOBU_SA) of a cell of the picture program, and a termination address (P_C_LVOBU_SA) indicating an address of the final packet of the cell.

Figure 24:
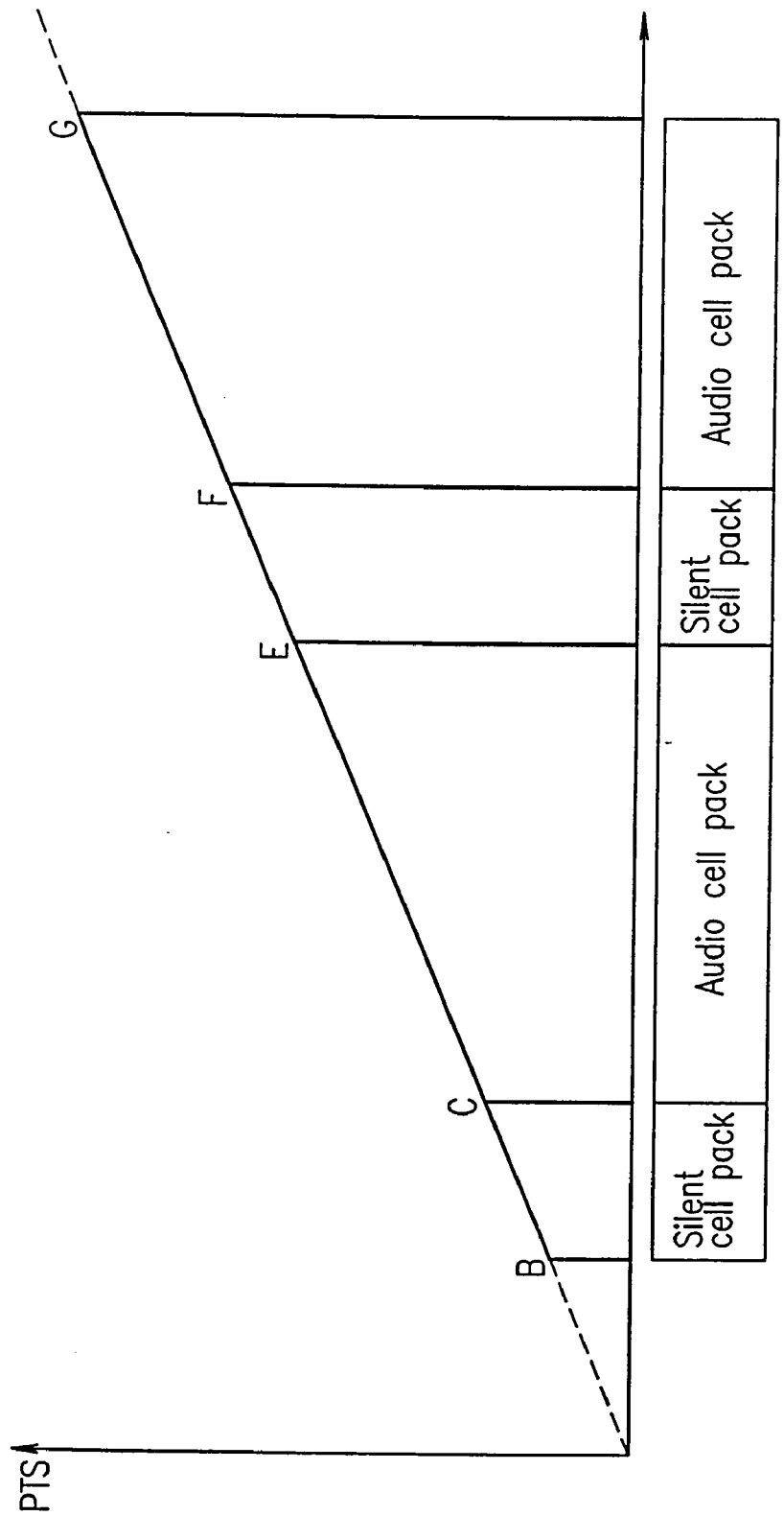
FIG. 24 shows an exemplary structure of the AOB.

FIG. 24 shows an exemplary structure of the AOB. The AOB is a part of an MPEG2 stream and includes a silent cell including an audio pack including substantially silent audio data and an audio cell including an audio pack of audio data forming a tune. The AOB includes one or more audio cells and may not include a silent cell. A silent cell is never followed by another silent cell and is always followed by an audio cell. In the example shown in FIG. 24, audio cells and silent cells exist and are physically continuous. Time information is also continuous; i.e., the "audio program physical allocation information" has a value representing "continue", and the "audio program time attribute information" also has a value representing "continue".

In FIG. 24, the line passing through points B, C, E, F and G represents a change in the value of the time information (i.e., PTS) of the AOB. Point B represents a value of the first PTS of a silent cell. Point C represents a value of the first PTS of an audio cell. Thus, the PTS of a silent cell is continuous to the PTS of an audio cell, and there is no data underflow gap, as referred to with respect to the MPEG2 stream, between the silent cell and the audio cell. In a similar manner, the PTS of the next silent cell is represented by point E. The difference between the first PTS of the next audio cell at point F and the final PTS of the audio cell at point D is an "audio pause time period". Since the PTS's need to be continuous in one stream as specified by MPEG2, the change in the PTS is linear as shown in FIG. 24.

With reference to FIGS. 31, 41 and 42, the picture video object (P_VOB) will be described in detail. As described above, the leading pack of the P_VOB 1002 is a picture NV pack (P_NV_PCK) 1003 including a P_PCT packet and a P_DSI packet having time information, position information and highlight information. Only one picture NV pack (P_NV_PCK) 1003 always exists at the leading end thereof. The picture NV pack (P_NV_PCK) 1003 is followed by video packs (V_PCK) 1004 which are MPEG2 video packs for storing video data and sub-picture packs (SP_PCK) 1005 for dividing sub-picture streams which are permitted to be included up to 32 streams and storing the divided sub-picture streams. In FIG. 31, 2 sub-picture streams 1005 (SP#1 and SP#2) are included and each sub-picture stream is divided into 2 packs. In FIG. 31, the video packs (V_PCK) 1004 precede the sub-picture packs (SP_PCK) 1005, but there is no limitation regarding the order as long as the MPEG2 standards are fulfilled. Although termination codes such as program encodes or the like are not shown in FIG. 31, such termination codes can be included as long as the requirements of MPEG2 streams are fulfilled. Such termination codes need not be included since the P_VOB 1002 is a part of the MPEG2 program stream.

FIG. 41 shows a structure of the P_PCI information included in the P_PCI packet. The P_PCI information includes P_PCI general information, P_PCI highlight information, and P_PCI recording information. The P_PCI general information includes a P_VOBU type (P_VOBU_CAT) describing the type of the analog copy protection with respect to the P_VOBU video data, P_VOBU start time (P_VOBU_S_PTM) describing the PTS of the first video to be displayed included in the P_VOBU, P_VOBU termination time (P_VOBU_E_PTM) describing the PTS of the final video to be displayed included in the P_VOBU, P_VOBU_SEQ time (P_VOBU_SEQ_E_PTM) describing the PTS including the SEQ existing in the P_VOBU, and P_VOBU cell reproduction time (P_VOBU_C_ELTM) indicating relative time in a picture cell of the first video to be displayed of the P_VOBU. The P_VOB is always an I picture of 1 VOBU, 1 cell and 1 video frame, and always includes SEQ. Accordingly, the P_VOBU_S_PTM, P_VOBU_E_PTM, P_VOBU_SE_E_PTM have an identical value, and the P_VOBU_E_ELTM indicates 0.

The P_PCI highlight information includes P_PCI highlight general information (P_PCI_HL_GI) describing the start time, termination time, number of buttons, the initial selection button number, forcible execution button number and the like of the highlight information; a P_PCI button color information table (P_BTN_COLIT) describing button color information; and a P_PCI button information table (P_BTNIT) describing the coordinate, magnitude, operation mode and the like of the button. Since the P_VOBU includes one video frame as described above, the P_PCI_HL_GI is described so that the start time of the highlight information indicates 0 and the termination time indicates infinity.

The P_PCI recording information includes a P_PCI video ISRC code (P_ISRC_V) describing an ISRC code of the video of the P_VOBU; and a P_PCI sub-picture ISRC code (P_ISRC_SP) describing an ISRC code of the sub-picture of the P_VOBU.

FIG. 42 shows a structure of the P_DSI information described in the P_DSI packet. The P_DSI includes only the P_DSI general information (P_DSI_GI). The P_DSI general information includes P_VOBU_NV pack time (P_NV_PCK_SCR) corresponding to the least significant 32 bits of the SCR of the NV pack of the P_VOBU, a P_VOBU termination address describing the relative address with respect to the NV pack of the final pack of the P_VOBU, and a P_VOBU first reference address (P_VOBU_1STREF_EA) describing the relative address with respect to the NV pack of the pack including the final data of the first I picture of the video of the P_VOBU. Since the P_VOBU includes 1 VOBU, the P_NV_PCK_SCR is always 0.

Figure 29:
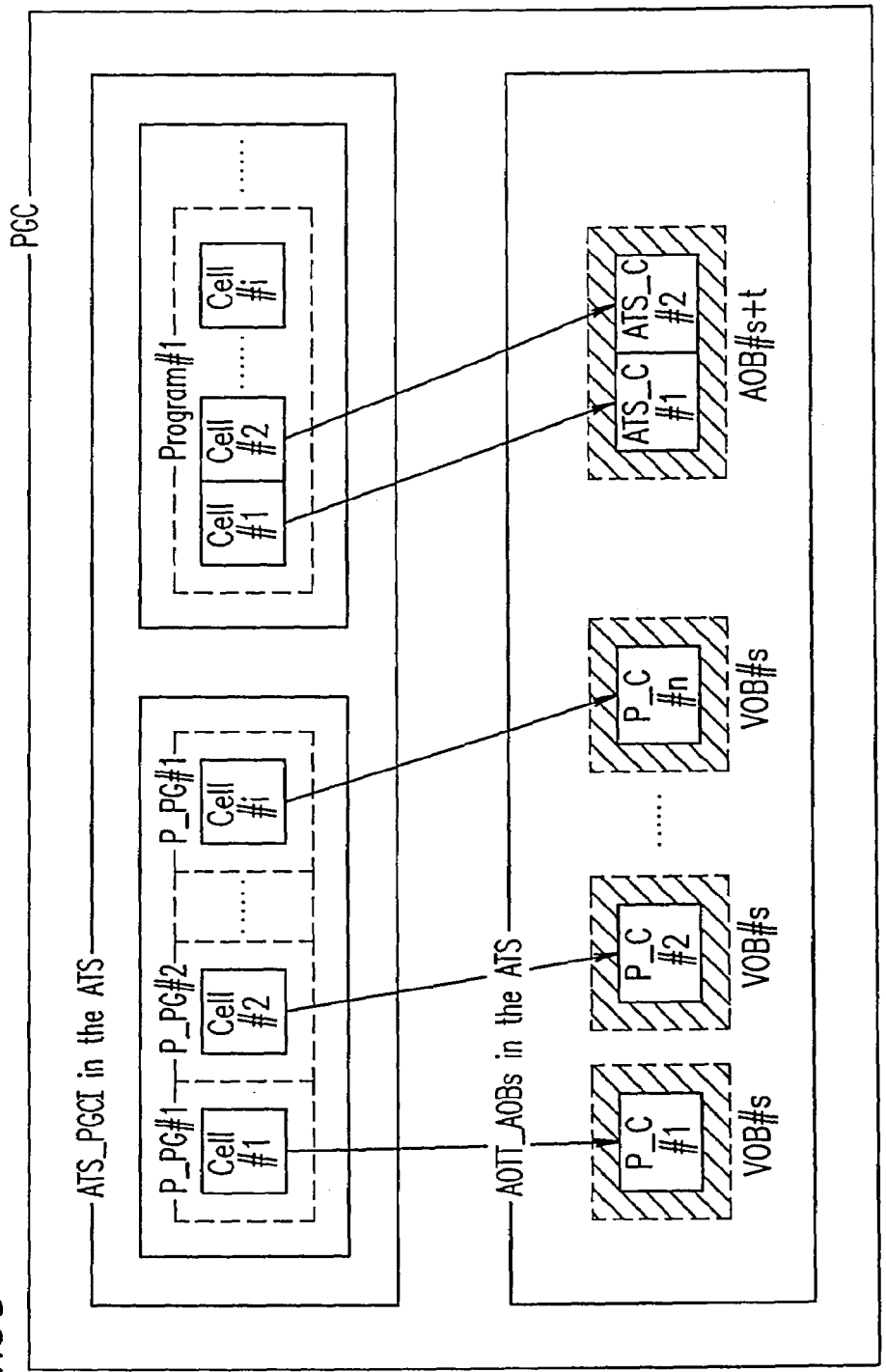
FIG. 29 shows the relationship among PGC, audio program, cell, picture program, picture cell, AOB and P_VOB.

FIG. 29 shows the relationship among the PGC, audio program, cell, picture program, picture cell, AOB, and P_VOB. The entirety of FIG. 29 represents one PGC. A plurality of such PGCs are included in one ATS. As described above, a PGC includes audio programs describing the reproduction order by the audio data access unit and picture programs describing the reproduction order by the video data access unit. Each audio program has a cell, which is the minimum management unit. The cell points to an AOB which is actual audio data and thus determines the reproduction data. In a similar manner, each picture program has a picture cell, which points to a P_VOB, which is actual video data, and determines the contents to be reproduced.

Due to such a structure, actual reproduction data pieces can be recorded on the disk in a different order. Alternatively, the same data piece can be pointed by a plurality of cells or picture cells. In order to guarantee the reproduction continuity, the audio data pieces has a flag which indicates whether the physical layout of the data on the disk is continuous or the data is a continuous part of one AOB (i.e., audio program physical allocation information, audio program time attribute information). The video data is fundamentally a still picture. Accordingly, one video data program includes one cell, and one cell includes one P_VOB. The physical arrangement of the P_VOBs causes no specific problems. Thus, the video data does not have such a flag.

Figure 30:
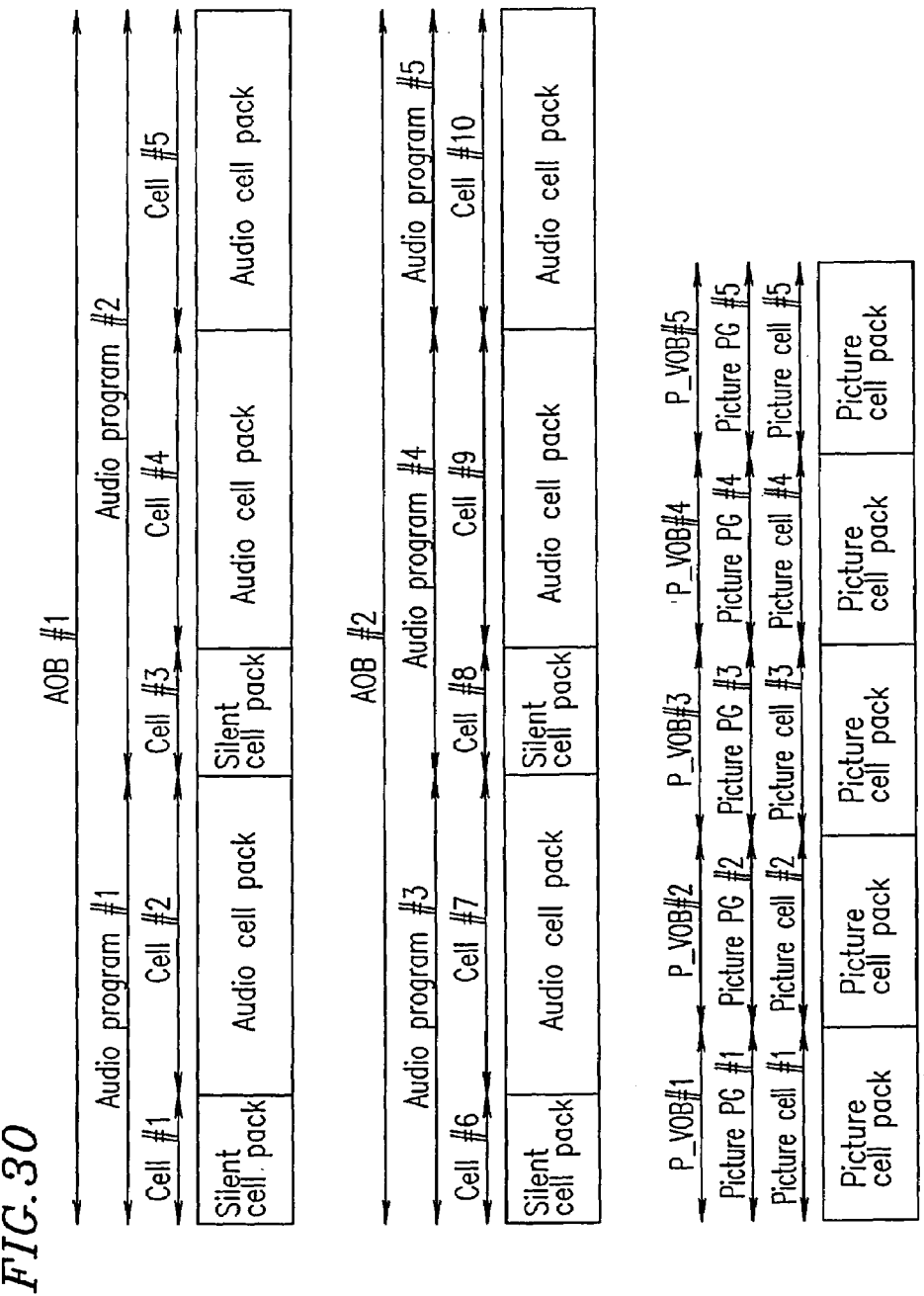
FIG. 30 shows an example of program information forming a title.

FIG. 30 shows an exemplary PGC forming a title. The example shown in FIG. 30 includes five programs. Programs #1 and #2 correspond to AOB #1, and programs #3, #4 and #5 correspond to AOB #2. On the recording medium, AOB #1 is recorded after AOB #2. Programs #1 and #2 both include a silent cell and a silent cell, and program #2 includes two audio cells. Programs #3 and #4 include a silent cell, and program #5 includes only an audio cell.

In the case where all the audio cells each have a reproduction time period of 60 seconds (5,400,000 in PTS) and all the still picture cells each have a reproduction time period of 1 second (90,000 in PTS), audio program information can be described as shown in FIG. 32. Picture program information can be described as shown in FIG. 33. Under the conditions that the audio data is 48 kHz, 16 bit sampling with 2 channels, the number of the silent packs is 96 and the number of the audio cell packs is 5760 as shown in FIG. 34. Where the number of still picture packs is 50, the picture cell information is as shown in FIG. 35. In such a case, it is assumed that the P_VOB used in the picture cell is recorded at a position following an AOB. The recording positions for the P_VOB and AOB are not physically limited, and the P_VOB and AOB can be positioned in a mixed state with no specific problem. In such a case, the physical allocation of the audio program information of no-Continue indicates that the AOB indicated by the audio program is not continuously reproducible. The audio cell and the picture cell both share the AOBs and P_VOBs used by the other cells.

The audio title set has been described. Next, with reference to FIG. 22, the audio manager will be described.

(3.2) Data Structure of the Audio Manager 900

The audio manager 900 is information for controlling the reproduction which is to be first referred to for performing audio-oriented reproduction of the information on the optical disk by a reproduction apparatus.

Figure 22:
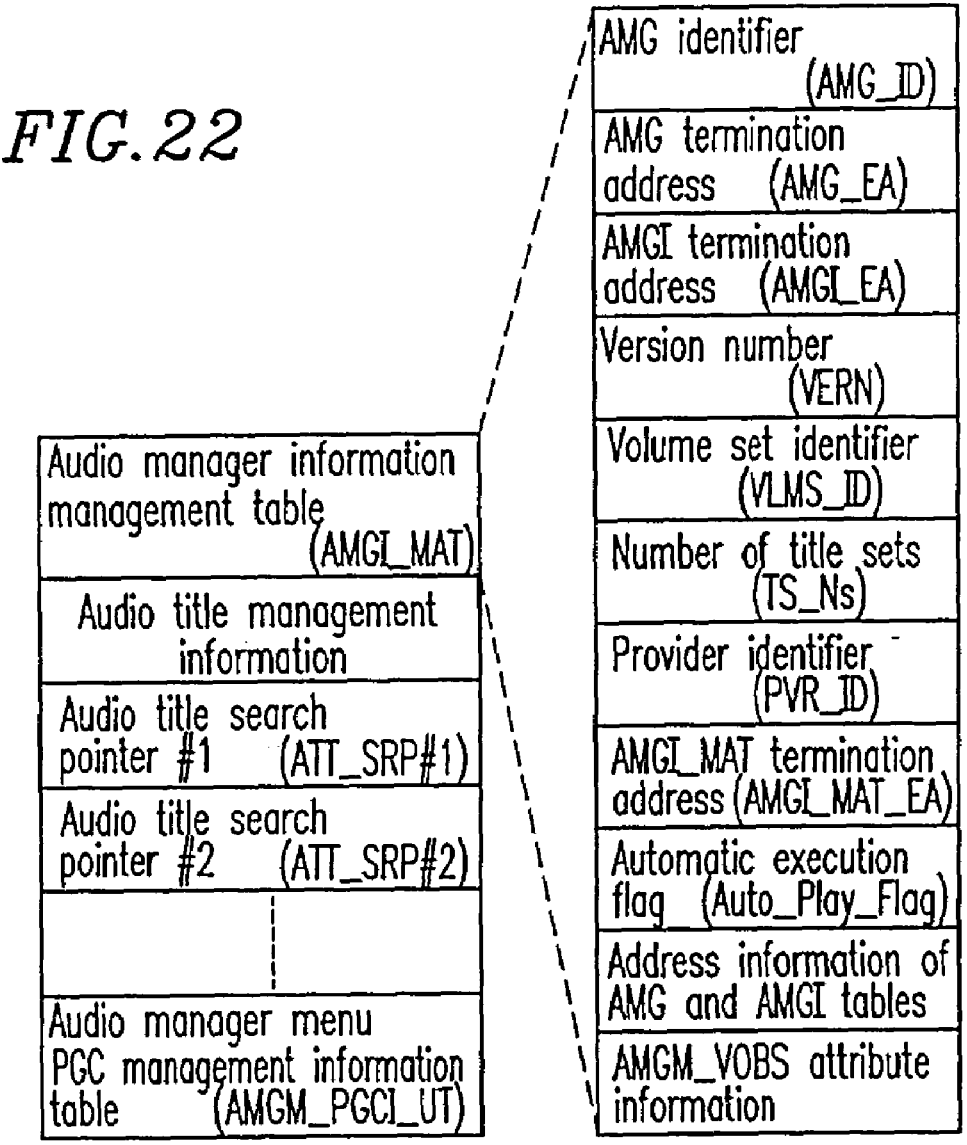
FIG. 22 shows a structure of an audio manager.

FIG. 22 shows a data structure of the audio manager 900.

The audio manager 900 includes "audio manager information (AMGI)", "VOB for audio manager menu (AMGM_VOBS)", and "audio manager information backup (AMGI_BUP)" as in the first example.

The "audio manager information (AMGI)" includes "audio manager information management table (AMGI_MAT)" including attribute information and pointer information, "audio title management information" indicating the number of audio titles and the like, "audio title search pointer (ATT_SRP)" indicating search information on the audio titles, and "audio manager menu PGC management information table (AMGM_PGCI_UT)" indicating PGC information for audio manager menu, as in the first example.

The "audio manager information management table (AMGI_MAT)" includes an AMG identifier (AMG_ID) for identifying an audio manager, an AMG termination address (AMG_EA) which is a termination address for table management, an AMGI termination address (AMGI_EA), an AMGI_MAT termination address (AMGI_MAT_EA), address information on the AMG and AMGI tables, version number (VERN), a volume set identifier (VLMS_ID), a number of title sets (TS_Ns) indicating the number of the title sets included in the volume, a provider identifier (PRV_ID) for identifying the provider which produced the disk, an automatic execution flag (Auto_Play_Flag) defining the operation of the player when the disk is inserted, and AMGM_VOBS indicating VOB attribute information existing in the audio manager.

The "audio title search pointer table (ATT_SRP)" has an identical structure with that in the first example.

The audio zone region and the DVD as a multimedia optical disk have been described. Next, a reproduction apparatus, according to the present invention, for reproducing a media having the above-described structure will be described.

The basic structure of the reproduction apparatus is similar to the structure described in the first example. In the second example, a key for separately controlling audio data and video data is provided in a remote controller for operating the DVD player or a front panel of the DVD player. With such a key, the video data can be skipped forward and backward or rewound to the start of the video data while continuously reproducing the audio data.

Figure 26:
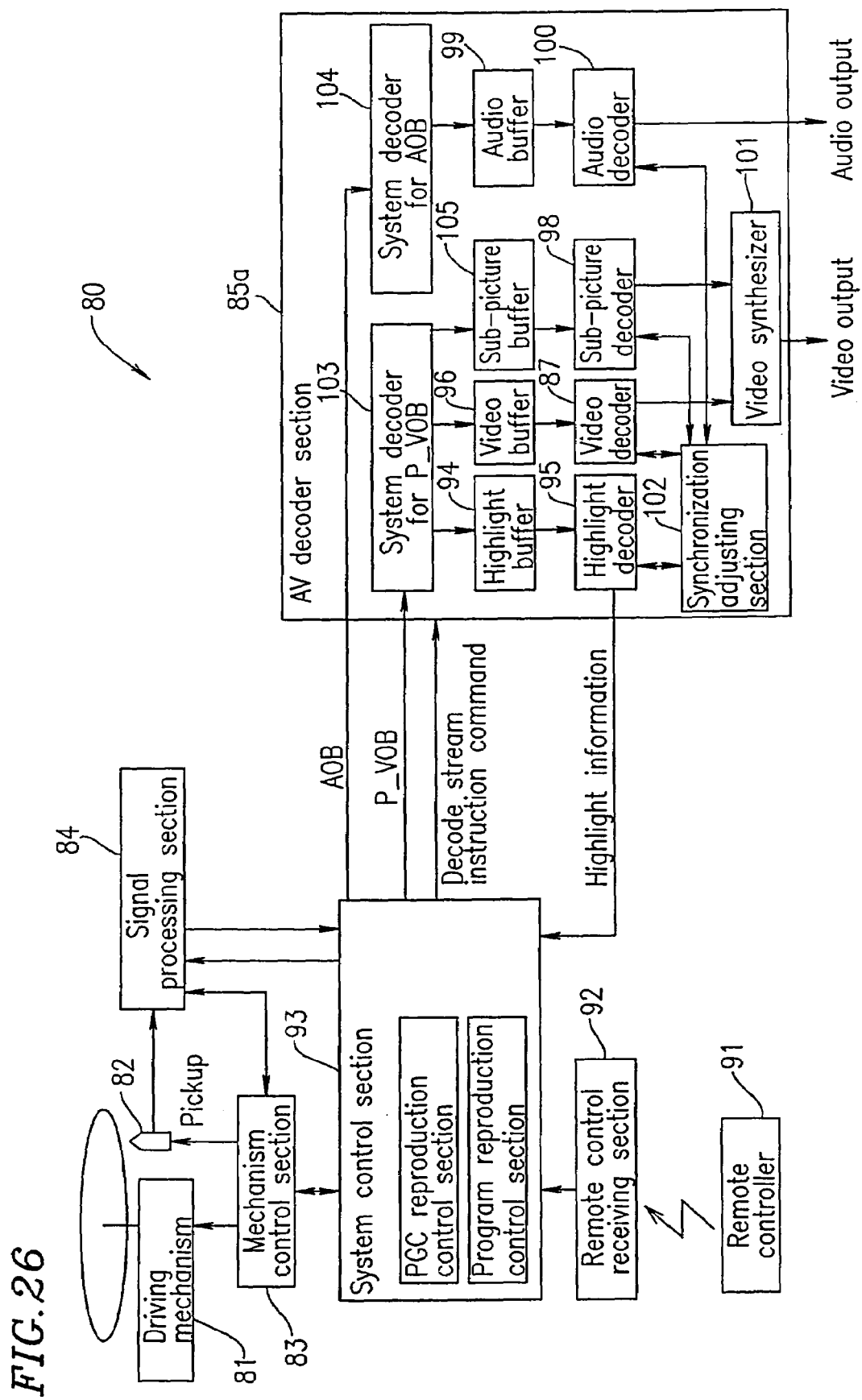
FIG. 26 is a block diagram showing an internal structure of a DVD player in the second example.

FIG. 26 is a block diagram illustrating an internal structure of a DVD player 80 in the second example. The DVD player 80 is different from the DVD player 70 shown in FIG. 8 in the structure of the AV decoder section, which will be described below.

In the second example, there are two streams, which are an AOB as audio data and P_VOB as video data. An AV decoder section 85a includes two decoders respectively corresponding to the AOB and P_VOB. These decoders are operated synchronously with or asynchronously from each other. Specifically, the AV decoder section 85a includes a P_VOB system decoder 103 for receiving a P_VOB stream and distinguishing a stream ID and sub-stream ID in a header of each packet included in the stream, thereby classifying the data into a video packet, a PCI packet, and a sub-picture packet. The AV decoder section 85a further includes an AOB system decoder 104 for receiving an AOB stream and classifying the data on a packet header-by-packet header basis. The AV decoder section 85a still further includes a highlight buffer 94 for temporarily storing highlight information of a PCI packet from the P_VOB system decoder 103, a video buffer 96 for temporarily storing a video packet in a similar manner, a sub-picture buffer 105 for temporarily storing a sub-picture packet, an audio buffer 99 for temporarily storing an audio packet from the AOB system decoder 104, a highlight decoder 95 for decoding the highlight information from the highlight buffer 94 and outputting the decoded highlight information to the system control section 93, a video decoder 87 for decoding the video data from the video buffer 96, a sub-picture decoder 98 for decoding the sub-picture data from the sub-picture buffer 105, an audio decoder 100 for decoding the audio data from the audio buffer 99 and outputting the decoded audio data as an audio output, a video synthesizer 101 for synthesizing the decoding results of the video decoder 87 and the sub-picture decoder 98 into one piece of video data, and a synchronization adjusting section 102 for managing the synchronization of the highlight decoder 95, the video decoder 87, the sub-picture decoder 98 and the audio decoder 100.

The reproduction apparatus according to the present invention operates in, for example, the following manner. The operation up to the reading of the stream is the same as described in the first example and will not be described below.

For starting the reproduction, the system control section 93 determines whether or not the DVD player 80 is in a video-oriented reproduction mode, by a reproduction mode determination section. When it is determined that the DVD player 80 is in the video-oriented reproduction mode, the system control section 93 reads the video manager based on the information which is read from the volume file management region. The system control section 93 refers to the PGC management information table for the video manager menu to calculate the recording address of the PGC for the volume menu. The resultant PGC is reproduced and retained inside. When the PGC for the volume menu is retained inside, the system control section 93 refers to the retained PGC information to calculate the video object (VOB) to be reproduced and the recording address of the VOB on the optical disk. When the VOB to be reproduced is determined, the system control section 93 outputs a control signal to the mechanism control section 83 and the signal processing section 84 so as to retrieve the determined VOB from the optical disk for reproduction. Thus, the video menu from which the user can select the title to be reproduced is displayed (see FIG. 40).

The user sees the menu and selects and confirms the title that he/she is interested in by designating the item number in the menu using the remote controller. Then, the system control section 93 receives the designation of the item number in the menu from the remote controller and refers to the management information pack included in the VOB of the video menu which is being reproduced, the VOB being input from the AV decoder section 85a, to execute a control command corresponding to the designated number. The control command is PlayTitle #n or the like, and the title number to be reproduced is designated by "n". As an execution operation by the PlayTitle command, the system control section 93 refers to the title search pointer table, which is a part of the audio manager, to determine the audio title set (ATS) to which the designated title belongs to and the title number in the ATS. When the ATS is confirmed, the system control section 93 outputs a control signal to the mechanism control section 83 and the signal processing section 84 so as to reproduce the ATS management information of the confirmed title set and retrieves the title search pointer table of the ATS, which is a part of the ATS management information, to the system control section 93. When the title search pointer table is retrieved, the system control section 93 refers to the table to determine the PGC information for starting the reproduction of the title to be reproduced. When the PGC information is determined, the system control section 93 outputs a control signal to the mechanism control section 83 and the signal processing section 84 so as to reproduce the determined PGC information and retain the information in the inside buffer memory for the PGC information. When the PGC information is retained, the system control section 93 first refers to the ATS picture program information table, with reference to the retained PGC information, to read all the P_VOBs described in the PGC information and inputs the P_VOBs to the AV decoder section 85a. The AV decoder section 85a separates the input P_VOBs on a pack-by-pack basis or packet-by-packet basis by the P_VOB system decoder 103 and stores the P_VOBs in corresponding buffer memories.

At this point, the highlight decoder 95, the video decoder 87, and the sub-picture decoder 98 do not perform decoding operations. When all the P_VOBs are stored in the corresponding buffer memories, the AOB to be reproduced and the recording address thereof are determined by the ATS program information table and the ATS cell reproduction information table. Then, the AOB is reproduced by a control signal output to the mechanism control section 83 and the signal processing section 84 from the system control section 93. At this point, the highlight decoder 95, the video decoder 87, and the sub-picture decoder 98 perform decoding operations for the first time to start video output, highlight processing and audio output. The output timing is adjusting by the synchronization adjusting section 102 in accordance with the audio program information, picture program information, highlight information and time code information (PTS) of each packet.

In the second example, data for the corresponding picture programs is all stored in the corresponding buffers before the audio data is reproduced. Accordingly, the highlight buffer 94, the video buffer 96, and the sub-picture buffer 105 in the DVD player 80 in the second example require a larger buffer memory capacity than the capacity specified by MPEG2 or DVD-Video.

Thereafter, the system control section 93 sequentially determines the AOBs to be reproduced and controls the reproduction thereof in accordance with the retained PGC information, and also decodes the highlight information, sub-picture information and video information which are already read in the buffer memories. When the reproduction of the final AOB indicated by the PGC information is completed, the system control section 93 searches for the PGC information of the next title and reproduces the P_VOBs and the AOBs described in the PGC information in the same manner.

Thus, the all the titles are reproduced and the operation is stopped. In accordance with specific setting of the DVD player or the DVD, only one title can be reproduced before the operation is stopped, or a menu can be displayed after reproduction of one or more titles is completed.

Next, a method for reproducing a still picture cell, a silent cell and an audio cell will be described in detail.

FIG. 14 shows a conventional method for reproducing the audio cell. Conventionally, for reproducing an MPEG2 stream, the leading end of the audio cell pack is first sought by the optical head and data reading starts. However, audio output does not immediately start but starts after an idle time period, which is predetermined in each reproduction apparatus. The idle time period includes a time period required for determining the PTS of the audio data, a time period required for determining that data is correct, and a time period required for the muting circuit in an analog output section is to be transitioned from a mute state to a non-mute state. Thus, the idle time period varies in accordance with the type of reproduction apparatus. Especially when the reproduction section and the decoder are accommodated in separate chassis, the idle time period tends to be extended because determination on the PTS and the determination on the correctness of the audio data are separately performed.

Figure 36A:
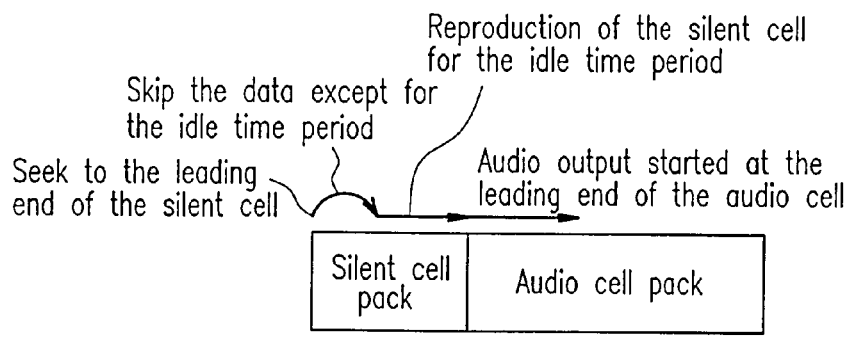
FIGS. 36A and 36B show methods for reproducing a silent cell and an audio cell.
Figure 36B:
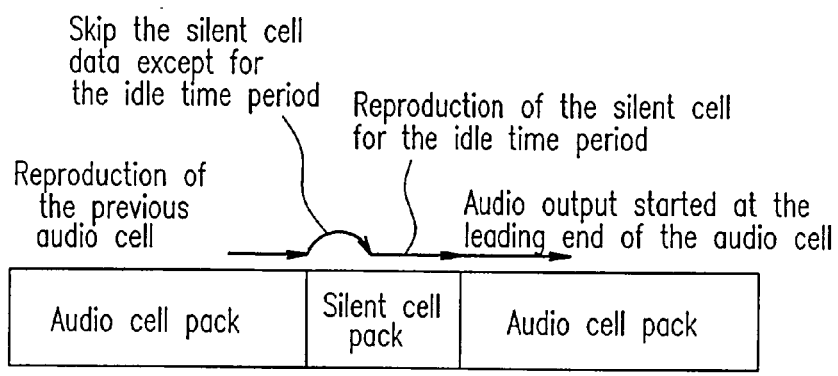

FIGS. 36A and 36B show methods for reproducing a silent cell and an audio cell. FIG. 36A shows the method in the case where the reproduction is performed from the leading end of the data, and FIG. 36B shows the method in the case where the reproduction is performed in continuation from the previous cell.

In the case where reproduction is performed from the leading end of the data by selecting a title or program from the menu or the like through jumping, the leading pack of the silent cell is jumped to with reference to the start address of the cell information. At this point, the STC, which is the reference time of the decoder, is set with the SCR of the leading pack of the silent cell. Next, skipping and jumping of data corresponding to a prescribed idle time period are performed with reference to the PTS of the silent cell, and the silent cell for the idle time period is reproduced. Audio output is prepared for during this period. At this point, the next title number is not displayed on the display device of the reproduction apparatus, and the passage of reproduction time period is not updated. In the case where the audio output is started and display of the title number and the updating of the passage of the reproduction time period are performed simultaneously when the first PTS of the leading cell is detected, the reproduction apparatus behaves as if the audio data is output simultaneously with the completion of the jump such as menu selection.

In the case where the reproduction is performed in continuation from the previous cell, a silent cell is jumped over or skipped except for the idle time period. At this point, by continuously counting the STC, which is reference for the system time, the interval between the completion of the audio output by the previous cell and the start of the audio output by the next cell equals the audio pause time period. The counting of the STC is continued when the physical allocation information and the time attribute information both have a value indicating "continue". When either one of them indicates "no-continue", the same processing as in the jump from the menu is performed, and thus the STC is reset at the leading end of the silent cell pack. In the case where there is no silent cell and the reproduction starts from the leading end of the data, the operation is similar to the conventional operation shown in FIG. 14. In the case where the reproduction is performed in continuation from the previous cell, the operation is as follows. When the time attribute information indicates "continue", the audio cell is decoded continuously from the previous cell and audio data is output. When the time attribute information indicates "no-continue", the operation is the same as the conventional operation shown in FIG. 14 as in the case where the reproduction is performed from the leading end of the data.

Figure 37:
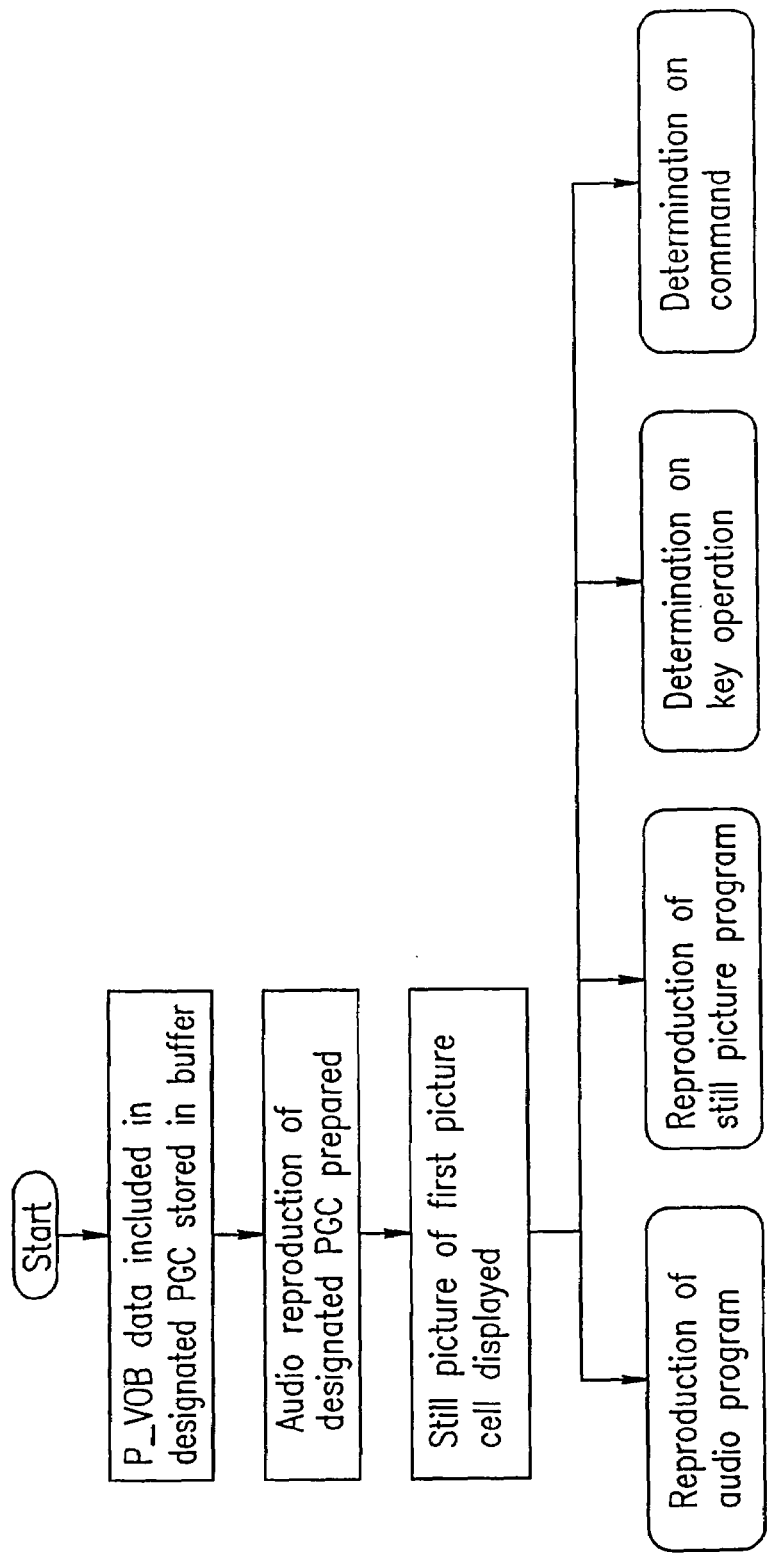
FIG. 37 is a flowchart illustrating a method for producing one of programs.
Figure 38:
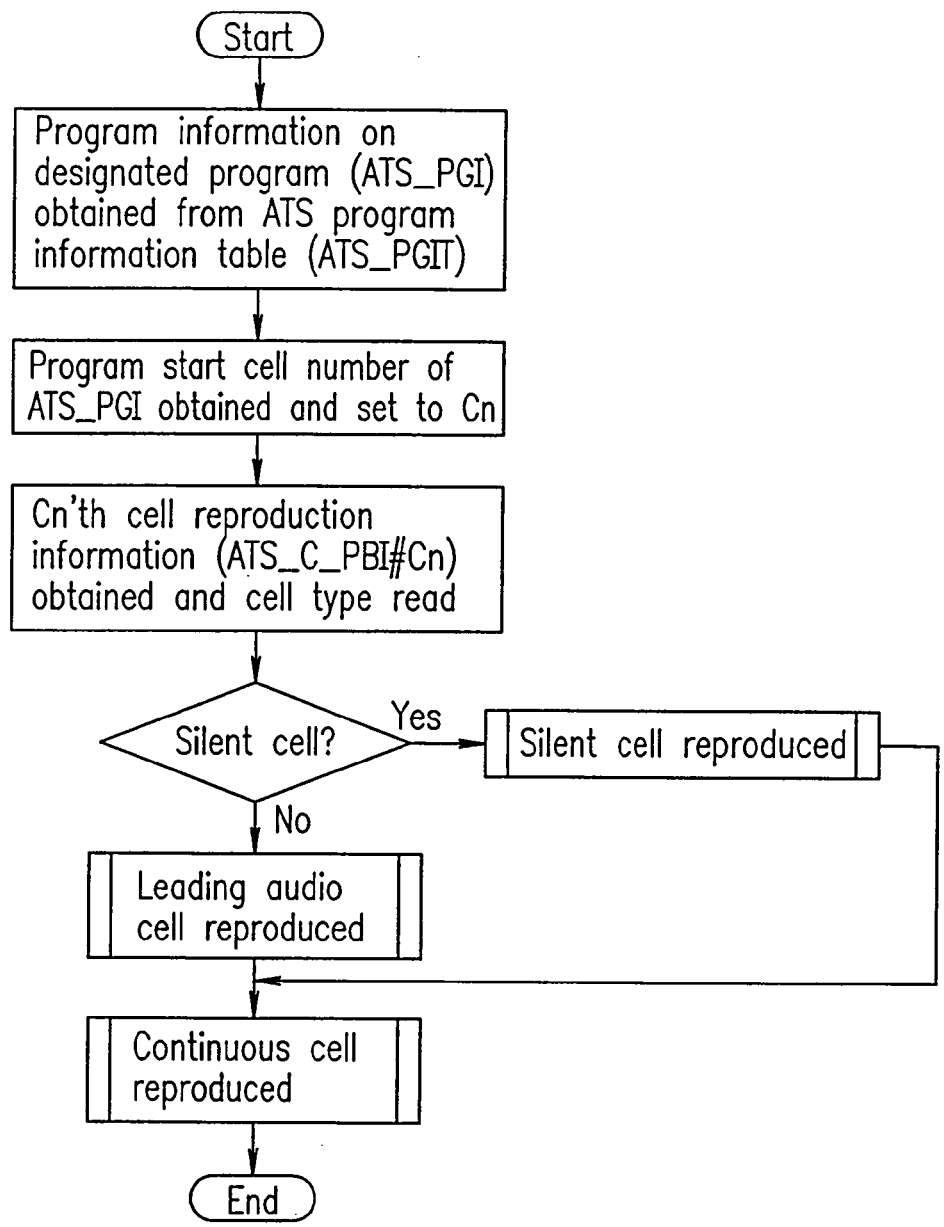
FIG. 38 is a flowchart illustrating a method for producing one of the programs.
Figure 39:
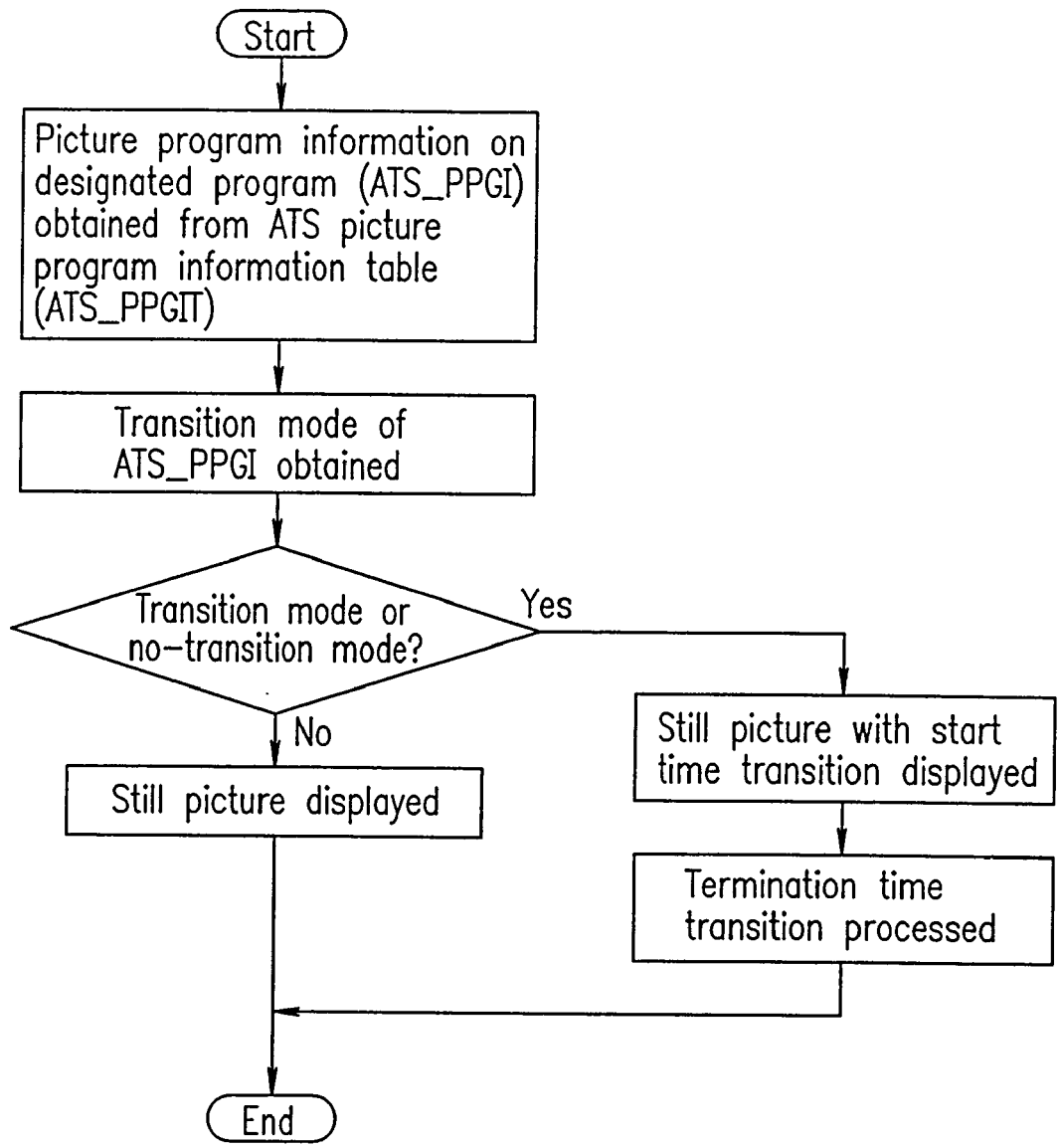
FIG. 39 is a flowchart illustrating a method for producing one of the programs.

FIGS. 37 through 39 are flowcharts each illustrating a program. Since information on the P_VOBs is read in the corresponding buffer memories, reproduction of the audio data and processing of the highlight information can be performed asynchronously from each other, and the still picture and the sub-picture can be output asynchronously from each other. Needless to say, synchronous display is possible based on the time code or the time information of the system.

Regarding reproduction of audio information, in the case where the physical allocation information of the audio program information shows "continue" and the program previously reproduced has a program number which is smaller by one than the program number of the program to be reproduced now, seek to the reading head for the DVD is not specifically necessary. When the time attribute information indicates "continue" and the reproduction is performed in continuation from the previous program, the STC, which is the reference time for the decoder, does not need to be reset.

The determination of whether or not the cell is a silent cell is performed using the cell type in the cell information. The determination that the cell is the final cell is performed by comparing the termination address of the cell information and the address read from the data in the DVD. The completion of the reproduction of the audio program can be determined by the cell index of the cell information returning to zero, the cell type indicating a still picture cell or a silent cell, or the start cell number of the next program in the audio program information.

The skipping of the silent cell is performed while detecting the PTS when the silent cell is decoded or by obtaining the number of packs to be skipped based on the data rate.

Since data of a still picture is already stored in the buffer memory, the display of the still picture is managed based on the position in the buffer memory at which the still picture of the designated cell of the designated program is recorded or based on the ordinal number (i.e., first, second, etc.) of the still picture with respect to the start. When the management is performed based on the position in the buffer memory, the data is sent to the video decoder 87 from the designated address in the video buffer 96 and displayed. When the management is performed based on the ordinal number of the still picture, the data stored in the video buffer 96 from the leading end thereof is sent to the video decoder 87 and the display is switched when the designated ordinal number is reached. The transmission of the data is stopped at this point. The display time period of the still picture is in accordance with the description in the picture cell still time (P_C_Still_Time). Since still pictures are each 1-frame data, the present still picture is switched into the next still picture when the time period described in the picture cell still time has passed. Such control is usually performed by the system control section 93. A picture cell still time of FFh indicates infinity, which means that the still picture is switched basically only by a command, user operations, or completion of the audio program. When the still picture is switched, display effects can be added by designating the transition mode. The time to switch the still picture can be designated on a program-by-program basis before and after the display of the still picture. However, in the case where the reproduction apparatus does not have a special effect display function, the still picture can simply be switched with the display effects being ignored.

In a synchronous mode, the audio data is reproduced based on the audio program reproduction time period and the time code information of the audio data, and the still picture and the sub-picture are reproduced based on the picture program reproduction time period. The synchronization adjusting section 102 compares the reference time information of the system and the reproduction time periods and thus performs synchronization control.

In an asynchronous mode, audio data is not synchronized with and reproduced separately from highlight data, sub-picture data and still picture data. The highlight data, sub-picture data and still picture data are synchronized to one another, and the audio data is continuously reproduced realtime based on the time information of the system. The still picture is switched in the asynchronous mode by the user operations and the command. The user operations basically include an operation of continuously reproducing audio programs while feeding picture programs forward, backward or to the leading end; and an operation of feeding both audio programs and picture programs simultaneously forward, backward or to the leading end. The command has similar functions.

The synchronous mode and the asynchronous mode are switched over in accordance with the picture program reproduction control. In the case where the picture program reproduction control is designated so as to prohibit control by the user operations, the data is basically reproduced in the synchronous mode except for by the command.

In the case where the picture program reproduction mode prevents the user operations and command from synchronizing audio programs and picture programs with each other, the DVD player can wait until the synchronization is obtained or the picture programs can be continuously reproduced in accordance with the picture program reproduction time period without synchronization. In the case where the reproduction of the audio programs is not completed when the reproduction of the picture programs is completed, the picture programs can be continuously reproduced from the first picture program or the final picture program can be continuously reproduced. In the case where the reproduction of all the picture programs are completed before all the audio programs are completed, only the picture programs can be reproduced with the audio part being silent, the audio programs can be reproduced from the first audio programs, or the reproduction of the audio title can be terminated. Some of the audio programs and the picture programs included in the audio title can be randomly selected and repeated a designated number of times. Such audio and picture programs can be repeated so that no same program is repeated (shuffle mode). The audio programs and the picture programs are synchronized to each other so that the audio program and the picture program having the same number can be always reproduced simultaneously, or the audio programs and the picture programs can be reproduced independently and asynchronously.

An audio title number or time can be directly designated for reproduction by user operations, i.e., usually by a remote controller or other keys. Such reproduction by direct designation by user operations cannot be used when the directly designated reproduction prohibition flag (UOP1) and the time designated reproduction prohibition flag (UOP2) of the ATT_CAT indicate prohibition. By such a designation, the title creators can describe reproducible audio titles by a command under some conditions of the reproduction apparatus. For example, an audio title which is not usually reproducible can be reproduced under certain conditions. For example, a certain parameter can be set in a specific players so that the parameter can be evaluated by a command, and the command can be described so as to reproduce the audio title only when a value is set in the parameter. When UOP1 and UOP2 are set so as to prohibit directly designated reproduction, the audio title can be reproduced only by the specific player. Such a system easily allows reproduction of certain audio titles, recorded on a disk including a plurality of audio titles, for which fee has been paid.

Figure 27:
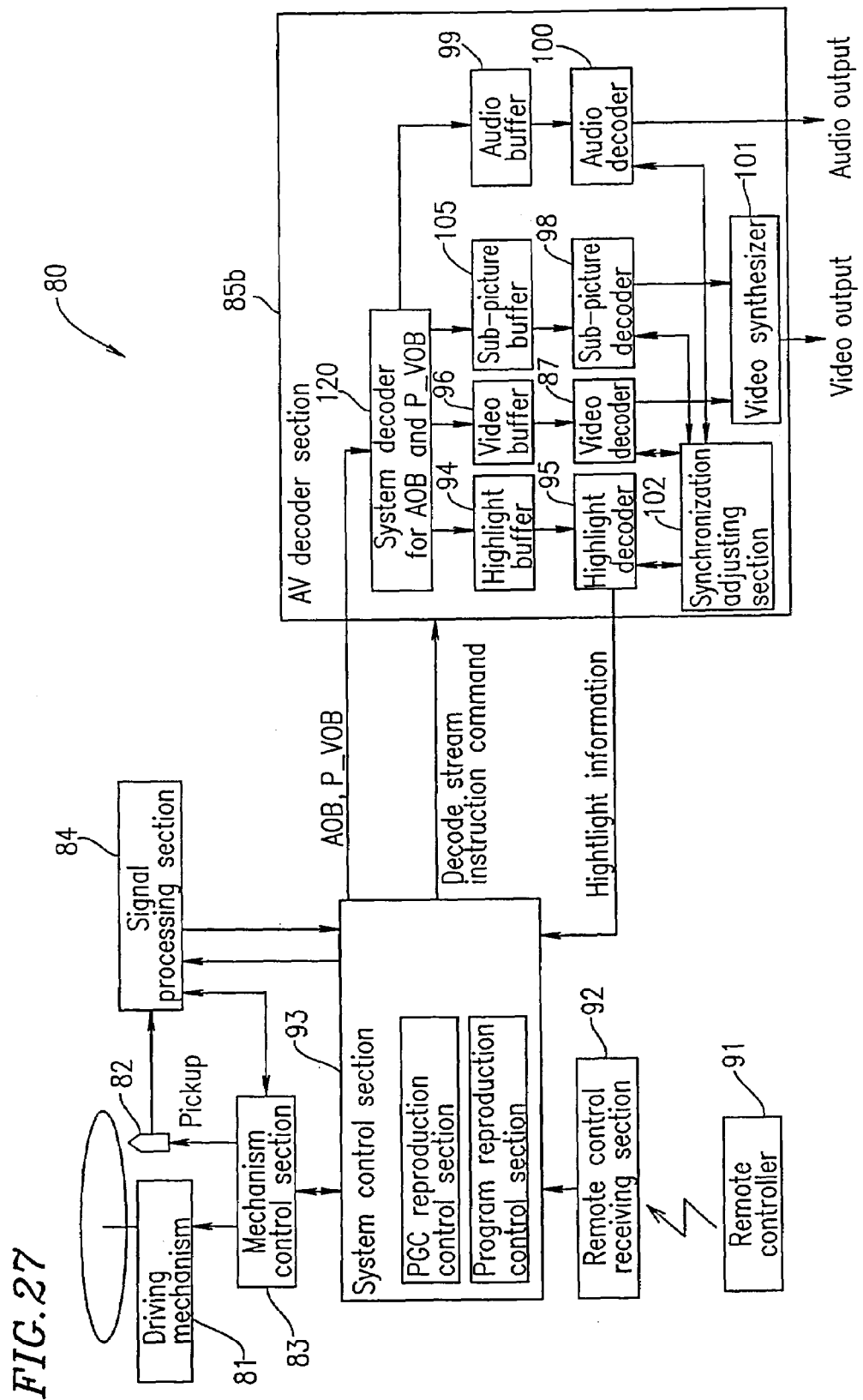
FIG. 27 is a block diagram showing an internal structure of a DVD player including a system decoder for AOB and P_VOB.

AV decoder sections having other structures are usable. For example, as shown in FIG. 27, an AV decoder section 85b also acts as a system decoder for AOB and P_VOB. Since the AOB and P_VOB are input at different timing, the same type of AV decoder section as used by DVD-Video is usable except that the capacities of the highlight buffer 94, the video buffer 96, and the sub-picture buffer 105 are increased and that a still picture management mechanism is added to the control of the video buffer 96. The operation of the AV decoder section 85b is substantially the same as that of the AV decoder section 85a.

Figure 28:
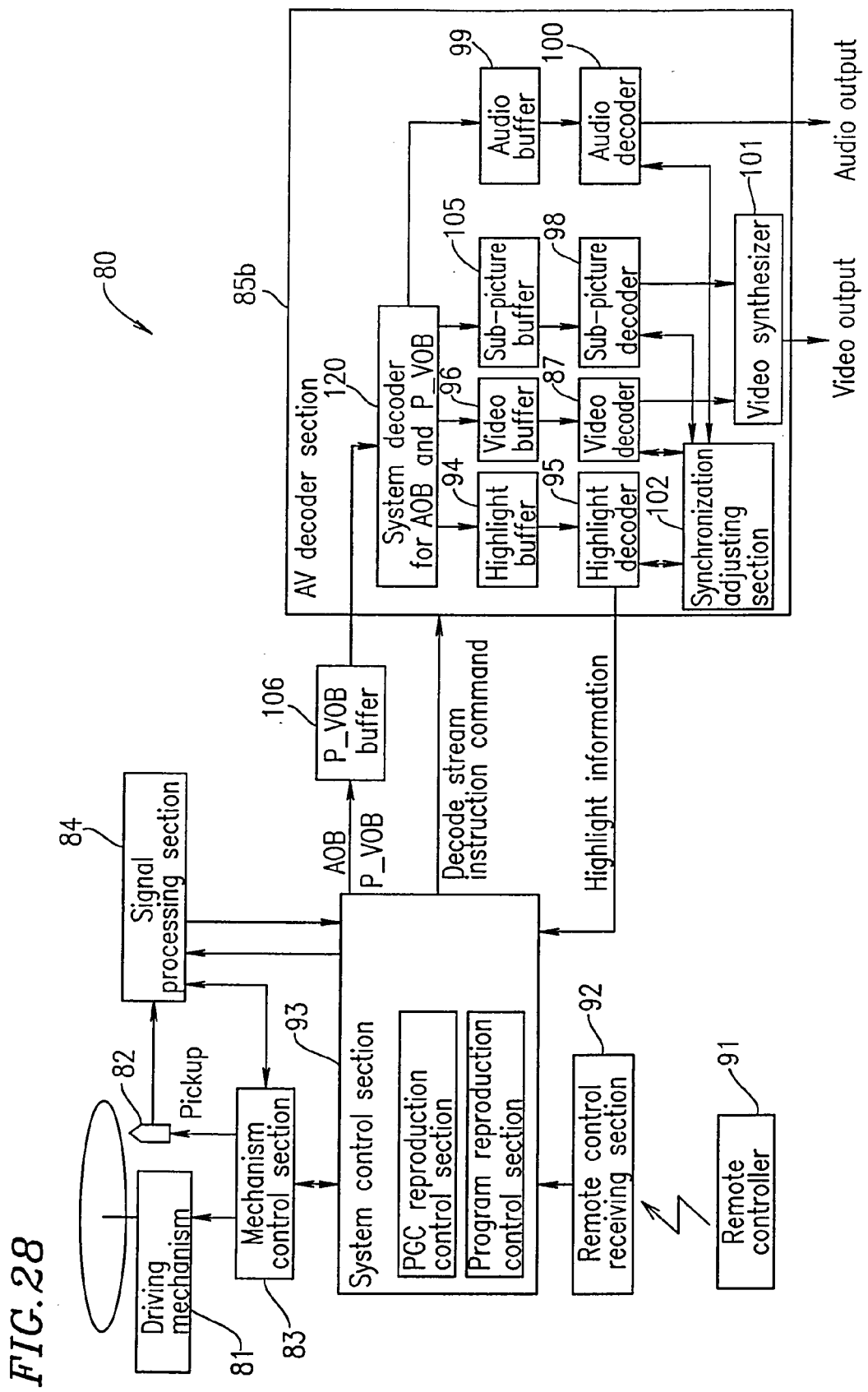
FIG. 28 is a block diagram showing an internal structure of a DVD player including a P_VOB buffer immediately before an AV decoder section.

The DVD player can have the structure shown in FIG. 28. In this structure, a P_VOB buffer 106 for P_VOB streams is provided immediately before the AV decoder section 85b. The same type of AV decoder section as used by DVD-Video is usable. All the P_VOB data to be read before the reproduction of the audio data is stored in the P_VOB buffer 106. The P_VOB buffer 106 dynamically multiplexes the P_VOBs corresponding to the reproduction order with the audio stream and sends the resultant data to the AV decoder section 85b. Accordingly, the system decoder 120 for AOB and P_VOB in the AV decoder section 85b is required to have a processing speed which is slightly higher than the speed specified by the DVD-Video standards. Streams need to be supplied to the AV decoder section 85b so that the audio buffer 99 does not underflow.

In the second example, as described above, program reproduction information including the start time and reproduction time period of each piece of audio data based on the reproduction start time of the leading audio data in the MPEG2 stream is recorded in the management region as a part of the reproduction control information. Accordingly, an optical disk for realizing reproduction of high quality digital audio data along with the video data in a restricted range of bit rates is provided. Moreover, a certain interval between audio reproductions can be maintained even in an inexpensive reproduction apparatus including no video data reproduction function. This allows title creators to create data easily.

Since a plurality of still pictures, sub-picture and menu can be displayed synchronously with or asynchronously from high quality audio data, a wider variety of displays become available.

EXAMPLE 3

An optical disk, and an apparatus and method for reproducing information from the optical disk in a third example according to the present invention will be described. Identical elements previously discussed in the first example bear identical reference numerals and the descriptions thereof will be omitted.

(1) Physical Structure of the Optical Disk

The physical structure of the optical disk is identical with that described in the first and second examples and thus the description thereof will be omitted.

(2) Logical Structure of the Optical Disk

The logical structure of the optical disk is identical with that described in the first and second examples and thus the description thereof will be omitted.

(3) Data Structure of the Audio Zone Region 32c

Figure 43:
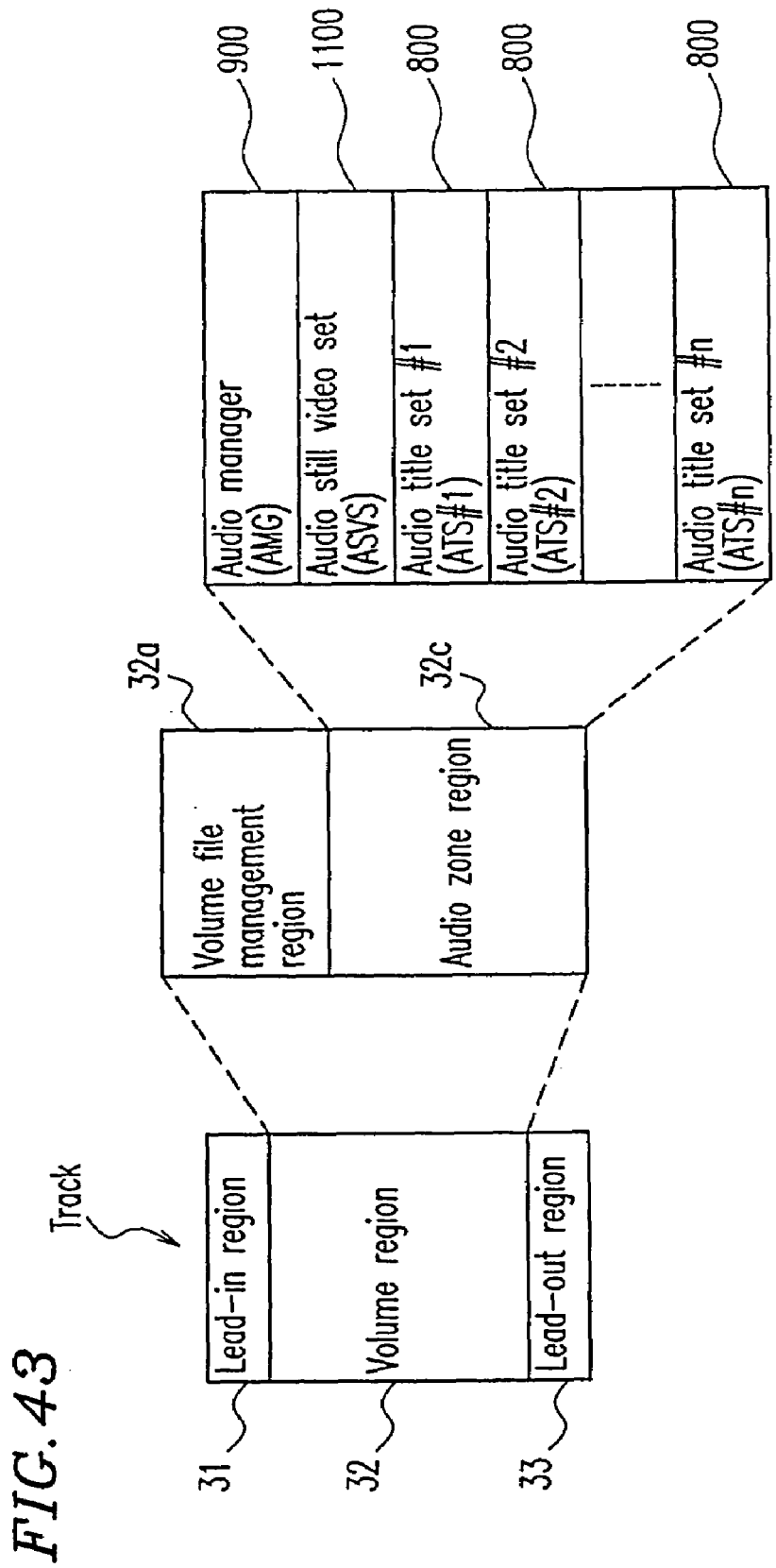
FIG. 43 shows a logical structure of an optical disk in a third example according to the present invention.

FIG. 43 shows a data structure of the audio zone region 32c. The audio zone region 32c stores an audio manager 900 and one or more audio title sets 800 as in the first and second examples. The audio zone region 32c further stores an audio still video set 1100.

(3.1) Data Structure of the Audio Manager 900

Figure 44:
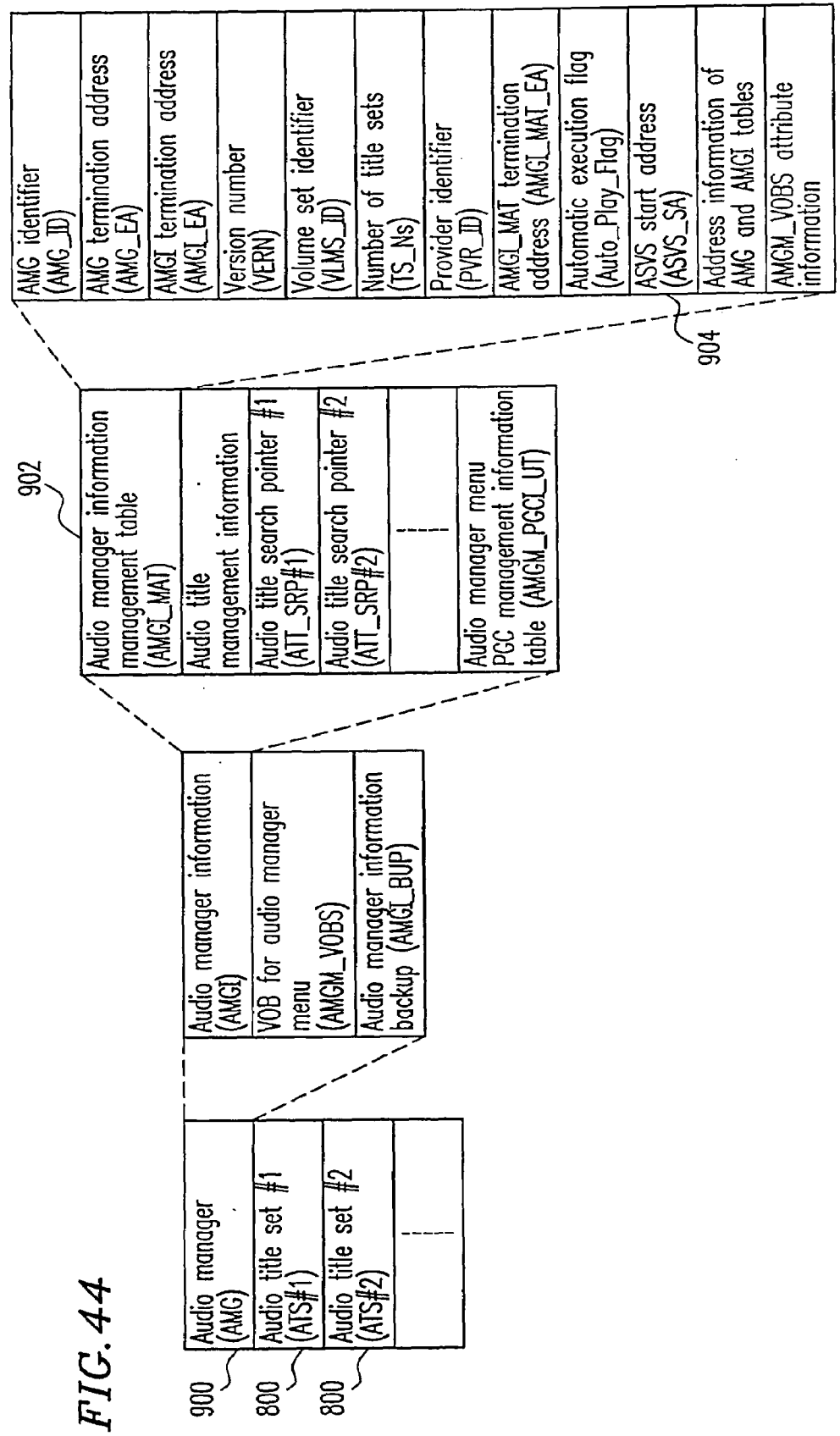
FIG. 44 shows a data structure of an audio manager (AMG)

FIG. 44 shows a data structure of the audio manager 900 in the third example. The structure of the audio manager 900 has the same structure as that shown in FIG. 4 down to the stage of the audio manager information management table (AMGI_MAT) 902.

The audio manager information management table 902 includes an ASVS start address (ASVS_SA) 904 for storing the position of the audio still video set.

The structure of the audio manager information management table 902 is the same as that shown in FIG. 22 except for the ASVS start address 904.

(3.2) Data Structure of the Audio Still Video Set 1100

Figure 45:
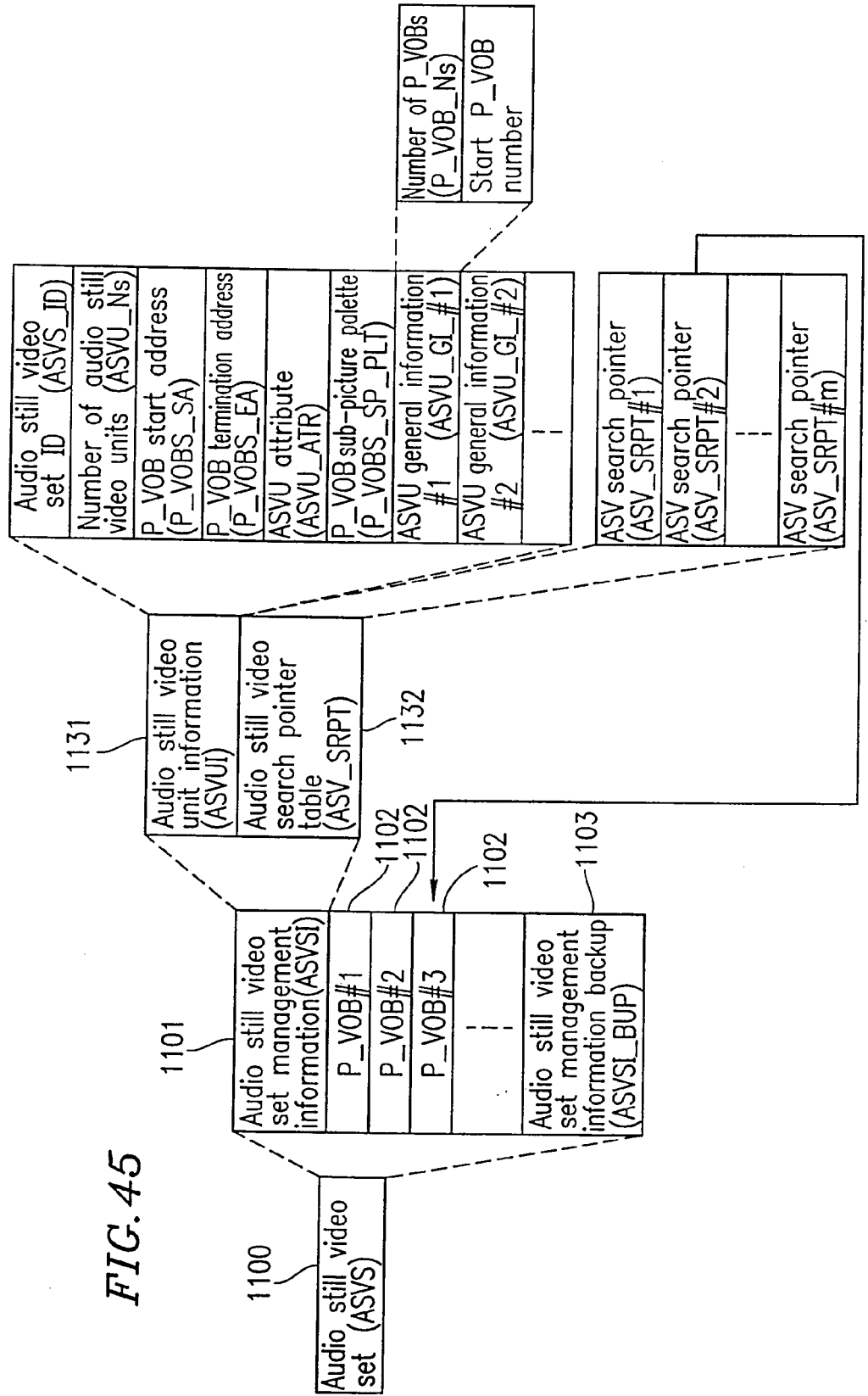
FIG. 45 shows a data structure of an audio still video set (ASVS)

FIG. 45 shows a data structure of the audio still video set 1100. The audio still video set 1100 includes a plurality of picture video objects (hereinafter, referred to as "P_VOBs") 1102, audio still video set management information (AS-VSI) 1101 for managing the plurality of P_VOBs 1102, and audio still video set management information backup (AS-VSI_BUP) 1103. In the following description, the audio still video set will generally be referred to as an "ASVS". The P_VOBs 1102 will generally be referred to as an "audio still video object (ASVOB)".

(3.2.1) Data Structure of the P_VOB 1102

Figure 46:
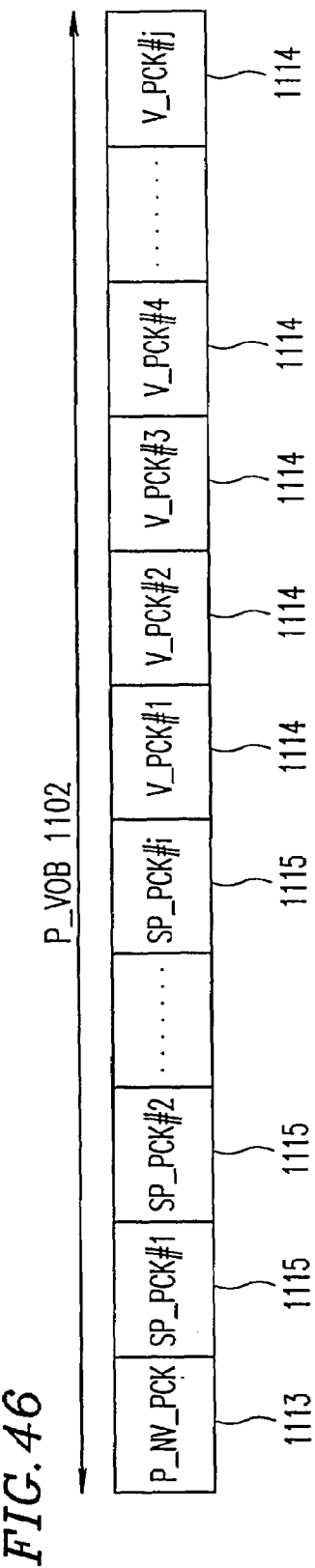
FIG. 46 shows a data structure of P_VOB.

FIG. 46 shows a data structure of the P_VOB 1102. The P_VOB 1102 includes a picture NV pack (P_NV_PCK) 1113, a plurality of video packs (V_PCK) 1114, and a plurality of sub-picture packs (SP_PCK) 1115. Only one picture NV pack 1113 is included in each P_VOB 1102.

The video packs (V_PCK) 1114 each stores video data forming an MPEG-system I picture. Unlike the VOB, the P_VOB is for storing a still picture but not a moving picture. Accordingly, the video data stored in each video pack 1114 includes only an I picture which is in-frame-compressed. Herein, information indicating one still picture corresponds to one I picture.

The sub-picture packs 1115 can each store a plurality of sub-picture streams. Each sub-picture packs 1115 stores an identification code for identifying the plurality of sub-picture streams. The sub-picture packs 1115 need not be included in the P_VOB 1102.

The picture NV pack 1113 includes a DSI packet (not shown) and a PCI packet (not shown). The DSI packet stores information used for special effects such as fast-forward reproduction. The PCI packet stores highlight information 1120 (FIG. 47).

Figure 47:
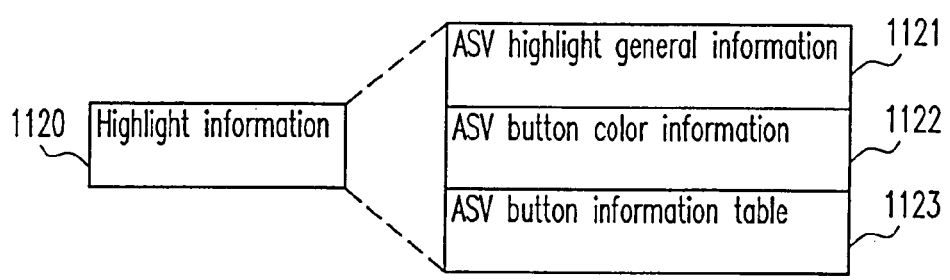
FIG. 47 shows a data structure of highlight information.

As shown in FIG. 47, the highlight information 1120 includes ASV highlight general information 1121 indicating an effective period, the number of buttons, and the like of highlight; ASV button color information 1122 indicating the display color of the button; and an ASV button information table 1123 indicating a button command and the like.

Unlike in the case of DVD-Video, the P_VOB 1102 does not have any audio data.

(3.2.2) Data Structure of the Audio Still Video Set Management Information 1101

As shown in FIG. 45, the audio still video set management information 1101 includes audio still video unit information (ASVUI) 1131 for managing a plurality of still pictures as a group and an audio still video search pointer table (ASV-SRPT) 1132 for managing the recording position of the P_VOB 1102.

The audio still video unit information 1131 is information for managing a plurality of P_VOBs 1102 having the same attribute and continuously recorded on the disk. Such information is a basic unit for reproduction processing.

The audio still video unit information 1131 includes an "audio still video set ID (ASVS_ID)"; a "number of audio still video sets (ASVS_Ns)"; a "P_VOB start address (P_VOBS_SA)" and a "P_VOB termination address (P_VOBS_EA)" indicating the recording position of the P_VOB; an "ASVU attribute" indicating the ASVU attribute such as, for example, a compression method of the P_VOB, aspect mode and existence of a button; a "P_VOB sub-picture palette (P_VOBS_SP_PLT)" for determining the display color of the sub-picture; and "ASVU general information (ASVU_GI)" corresponding to each ASVU for designating the P_VOB belonging to each ASVU.

Each "ASVU general information (ASVU_GI)" includes a "number of P_VOB (P_VOB_Ns)" indicating the number of P_VOBs forming the ASVU, and a "start P_VOB number" indicating which P_VOBs belong to the ASVU.

The audio still video search pointer table 1132 stores a plurality of "ASV search pointer (ASV_SRPT)" indicating the start address of each of the P_VOBs included in the ASVS.

(3.3) Data Structure of the Audio Title Set 800

Figure 48:
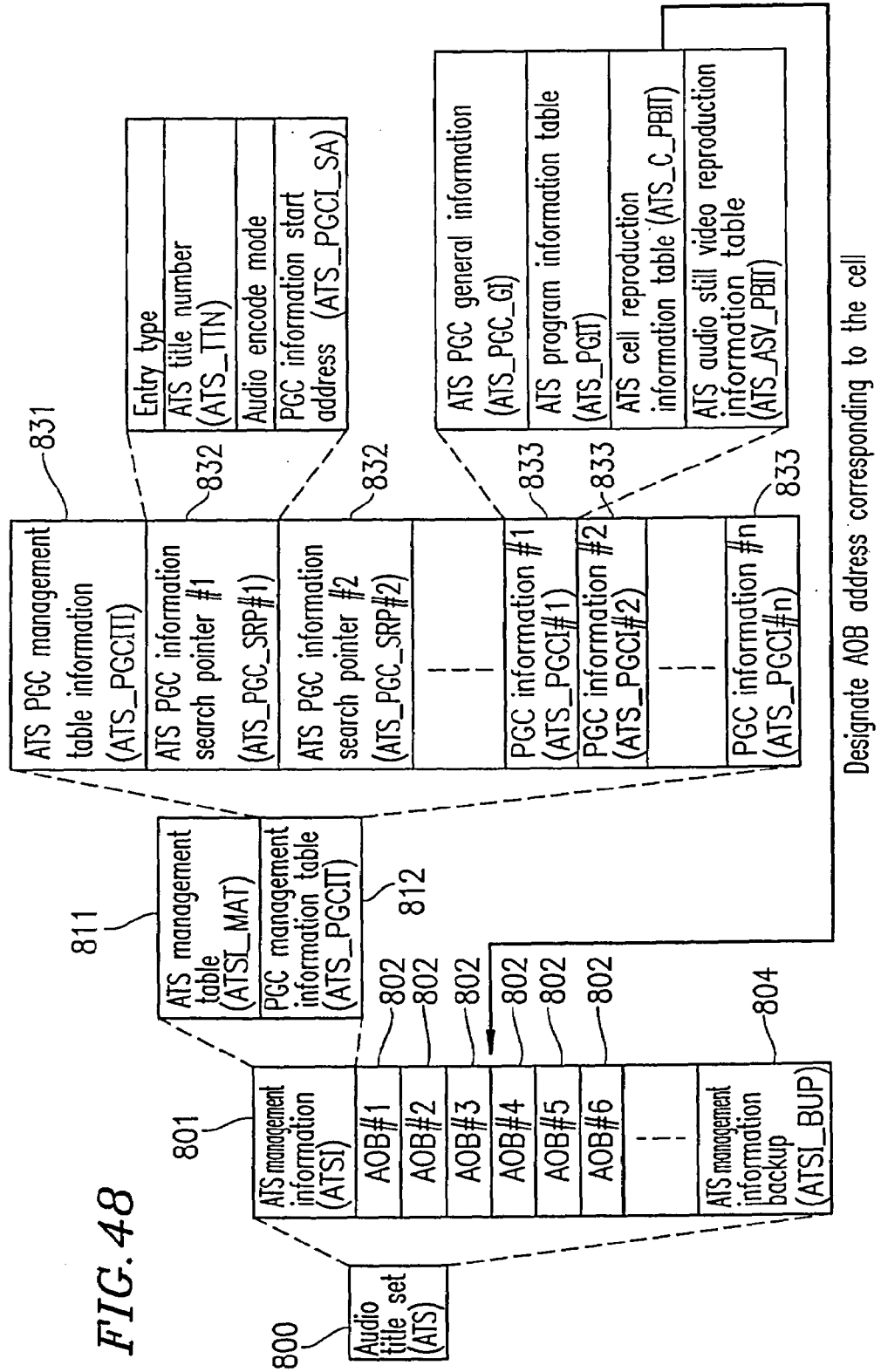
FIG. 48 shows a data structure of an audio title set (ATS)

FIG. 48 shows a data structure of the audio title set 800 in the third example. The audio title set 800 shown in FIG.

48 has the same structure as that shown in FIG. 5 except for the structure of the PGC information 833.

Figure 49:
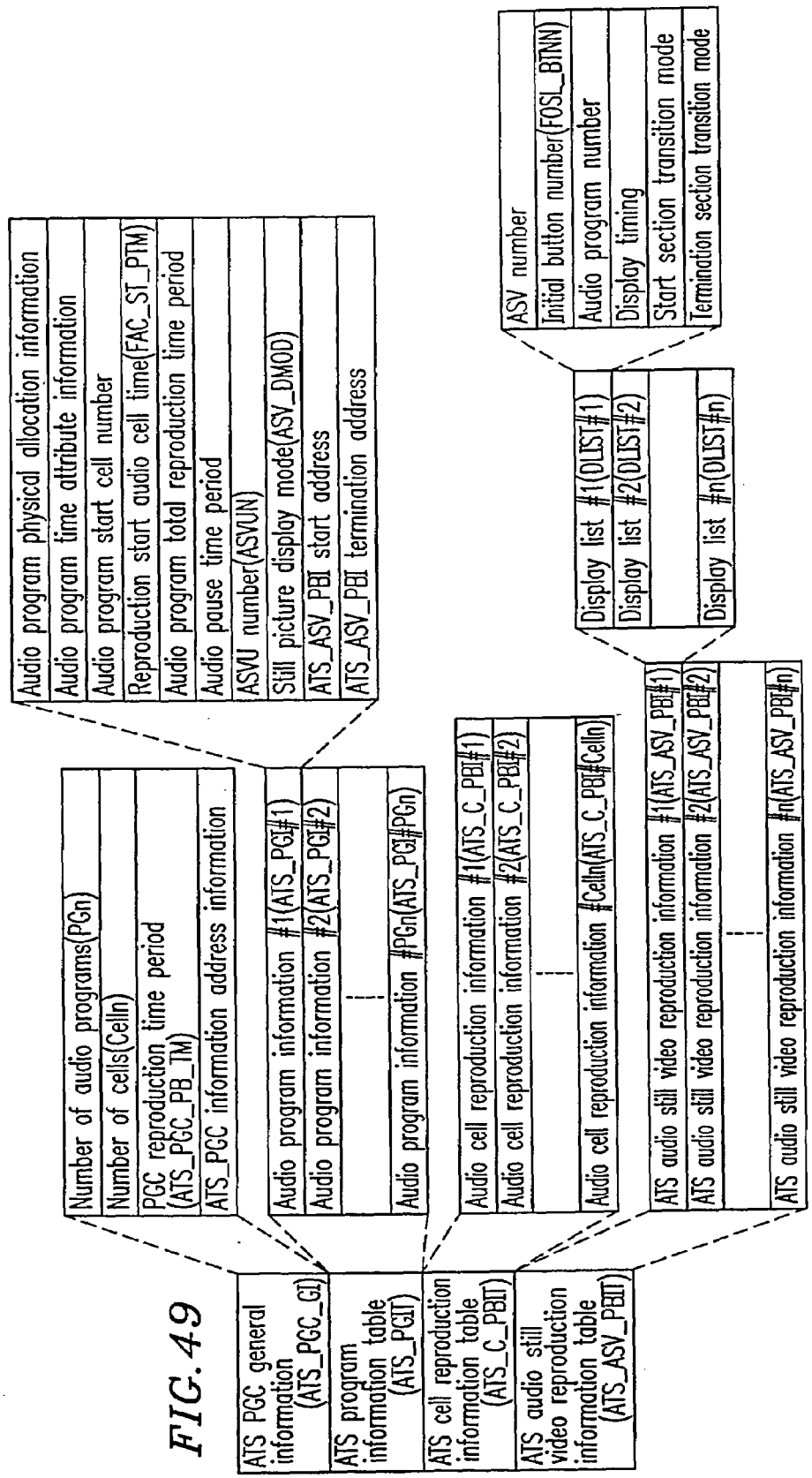
FIG. 49 shows a data structure of PGC information (ATS_PGCI)

FIG. 49 shows a data structure of the PGC information 833. The PGC information 833 includes "ATS PGC general information (ATS_PGC_GI)", an "ATS program information table (ATS_PGIT)", an "audio cell reproduction information table (ATS_C_PBIT)", and an "ATS audio still video reproduction information table (ATS_ASV_PBIT)".

The "ATS PGC general information (ATS_PGC_GI)" includes the number of audio programs and the number of cells included in the PGC information; the reproduction time period of the PGC; and information the ATS_PGC information. The address information on the ATS_PGC information includes pointer information to an "ATS program information table (ATS_PGIT)", an "audio cell reproduction information table (ATS_C_PBIT)", and an "ATS audio still video reproduction information table (ATS_ASV_PBIT)".

The "ATS program information table (ATS_PGIT)" includes a plurality "audio program information (ATS_PGI)" units included in the PGC.

Each of the plurality of "audio program information (ATS_PGI)" units includes "audio program physical allocation information" indicating whether or not the AOB of each program and the AOB of the previous program are recorded at physically discontinuous positions on the optical disk, "audio program time attribute information" indicating whether or not the time information of the AOB is continuous with the time information of the previous AOB, an "audio program start cell number" indicating the first cell number forming the audio program, "reproduction start audio cell time" indicating the first time information of the first audio cell included in the audio program, an "audio program total reproduction time period" indicating the reproduction time period of the audio program, an "audio pause time period" indicating the silent period until the reproduction of the audio cell of the audio program starts, an "ASVU number (ASVUN)" designating the still picture unit to be reproduced simultaneously with audio data of the program, an "audio still video display mode (ASV_DMOD)" indicating the display mode of the still picture such as, for example, whether the still picture or still pictures are displayed in accordance with the order or randomly, and an "ATS_ASV_PBI start address" and "ATS_ASV_PBI termination address" designating corresponding ATS audio still video reproduction information in the ATS audio still video reproduction information table (ATS_ASV_PBIT).

FIG. 50 shows a data structure of the "audio still video display mode (ASV_DMOD)". The "audio still video display mode (ASV_DMOD)" includes a "display timing mode" flag and a "display order mode" flag.

The "display timing mode" indicates specific timing for reproducing the audio data and an updating time period of the still picture.

When the "display timing mode" is Browsable, the display timing of the still picture can be changed by interaction from the user. When the "display timing mode" is SlideShow, the display timing of the still picture cannot be changed by interaction from the user.

When the "display timing mode" is SlideShow, the display of the still picture is updated in accordance with the display timing determined synchronously with the audio information which is simultaneously reproduced. When the "display timing mode" is Browsable, the display of the still picture is updated when the determined display continuation time period has passed, asynchronously from the audio information which is simultaneously reproduced.

The "display order mode" indicates whether the still picture or still pictures are displayed sequentially in accordance with the display list, randomly or shuffle. A random display of the still picture refers to that the still picture or still pictures are selected randomly while permitting overlap and are displayed in conformity with the selected order. A shuffle display of the still picture refers to that the still picture or still pictures are selected randomly while prohibiting overlap and are displayed in conformity with the selected order.

The "audio cell reproduction information table (ATS_C_PBIT)" includes a plurality of "audio cell reproduction information (ATS_C_PBI)" units. Each "audio cell reproduction information unit (ATS_C_PBI)" includes a "cell index number" indicating the order of cells included in the program, a "cell type" indicating the attribute of the cell (i.e., whether the cell is a still picture cell or a silent cell), a "cell start address" indicating the start address of the cell in the form of a relative address with respect to the first pack of the AOB of the ATS including the cell, and a "cell termination address" indicating the final address of the cell in the same manner.

The "ATS audio still video reproduction information table (ATS_ASV_PBIT)" includes a plurality of "ATS audio still video reproduction information (ATS_ASV_PBI)" units. Each "ATS audio still video reproduction information unit (ATS_ASV_PBI)" includes a plurality of "display lists (DLIST)" indicating which P_VOBs stored in the audio still video set are reproduced and in which order the P_VOBs are reproduced.

Each "display list (DLIST)" includes an "ASV number" indicating the ordinal number (i.e., first, second or the like) of the P_VOB in the ASVU, an "initial button number (FOSL_BTNN)" indicating the number of a button which is in the highlight information and selected in an initial state, an "audio program number" indicating the audio program corresponding to the DLIST, "display timing" indicating the timing for displaying the P_VOB included in the DLIST, and a "start section transition mode" and a "termination section transition mode" indicating the transition of the still picture.

In this example, as the picture transition modes, "no transition", "fading from black", "fading into black", "crossfading", and "wiping in several directions" are assumed.

(3.4) Data Structure of the AOB 802

The AOB 802 is packetized into 2 Kbytes. The AOB 802 stores data in the LPCM format, AC3 format, DTS format or other compression formats. In the case of the LPCM format, the sample bit is 16, 20, or 24 bits, with a sampling frequency of 48 kHz, 96 kHz, 192 kHz, 44.1 kHz, 88.2 kHz, or 176.2 kHz.

The AOB 802 has an exemplary structure as described in the second example with reference to FIG. 24.

(4) Two Reproduction Methods

The audio zone region 32c stores three MPEG streams of a VOB, an AOB and a P_VOB. The AOB is included in the audio title set (ATS). The P_VOB is included in the audio still video set (ASVS). The VOB is included in the audio manager (AMG) as shown in FIG. 44.

The AOB and the P_VOB are the main information stored on the disk, and are typically music information with a still picture. The VOB is typically a menu for allowing the user to select any music information with a still picture.

Among the MPEG streams stored in the audio zone region 32c, the VOB is reproduced by a standard method specified by MPEG. The AOB and the P_VOB are reproduced by an expanded different method which is different from the standard method.

(4.1) Standard Reproduction Method

First, the standard reproduction method will be described. This method is used for reproducing a VOB stored on the optical disk.

Figure 51:
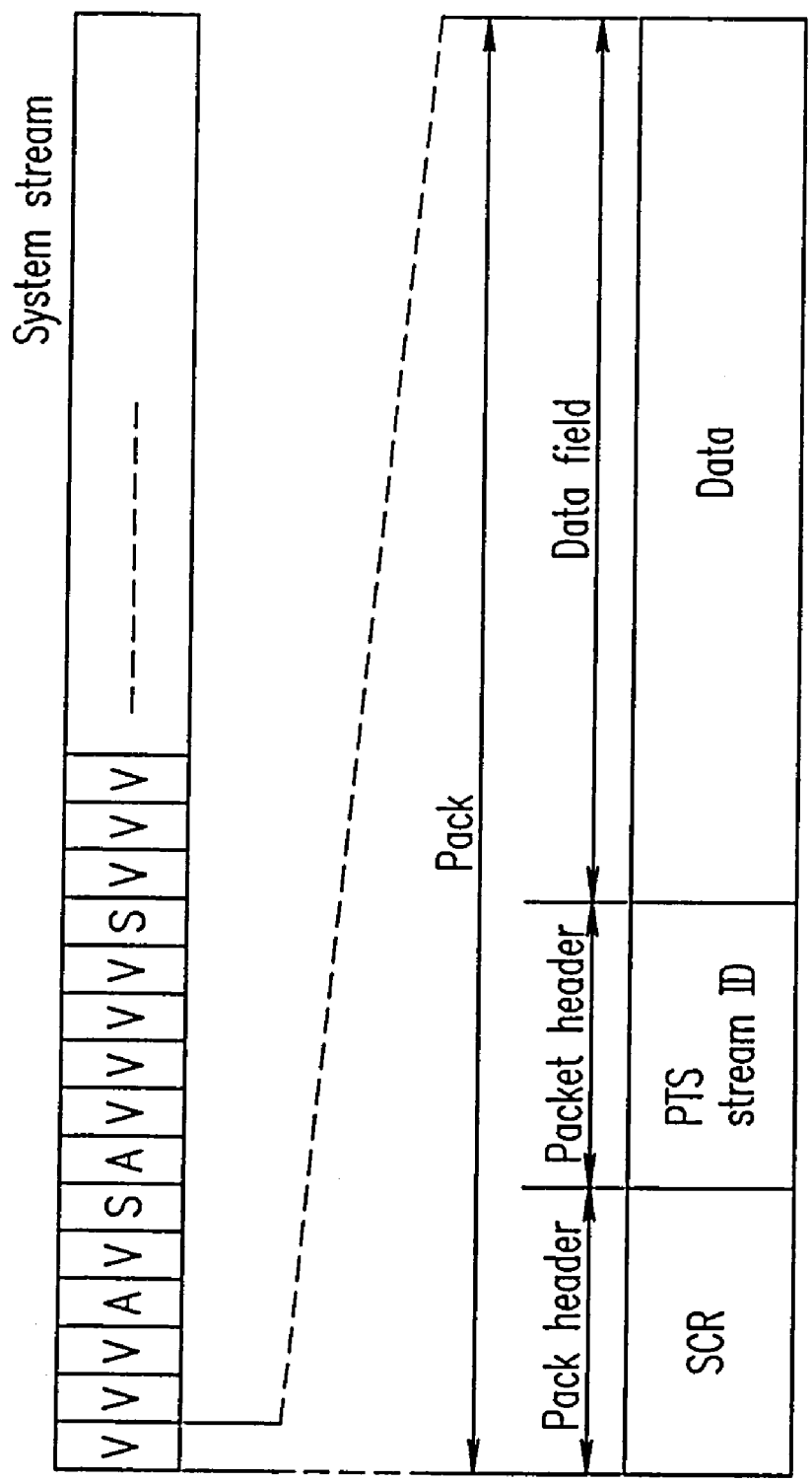
FIG. 51 shows a data structure of an MPEG system stream.

FIG. 51 shows a data structure of a system stream in the third example conforming to MPEG. The optical disk stores at least one system stream.

The system stream can include a plurality of elementary streams. The elementary streams include a video elementary stream storing moving picture information, an audio elementary stream storing audio information, and a sub-picture elementary stream storing sub-picture information. The plurality of elementary streams are each divided into a plurality of packs.

The system stream shown in FIG. 51 includes a video elementary stream, an audio elementary stream, and a sub-picture elementary stream. The video elementary stream is divided into one or more video packs. The audio elementary stream is divided into one or more audio packs. The sub-picture elementary stream is divided into one or more sub-picture packs. In FIG. 51, the letter "V" represents a video pack, the letter "A" represents an audio pack, and the letter "S" represents a sub-picture pack.

As shown in FIG. 51, each pack includes a "pack header", a "packet header" and a "data field". The data length of one pack is 2 Kbyte.

Described in the "pack header" is data conforming to MPEG including, for example, a pack start code, an SCR (System Clock Reference), and an MUX (Multiplex) rate.

Described in the "packet header" is data confirming to MPEG including, for example, a stream ID, a packet length, an STD (System Target Decoder), a buffer scale size, and a PTS (Presentation Time Stamp).

The stream ID described in the "packet header" indicates whether data stored in the "data field" is a video elementary stream or any other elementary stream. Any other elementary stream is an audio elementary stream, a sub-picture elementary stream or management information.

The management information is referred to as an "NV pack". The management information includes a PCI packet and a DSI packet. The PCI packet stores highlight information for receiving and processing user interaction. The DSI packet stores information utilized for special effects such as, for example, fast-forward reproduction.

In this example, the data field of the elementary streams other than the management information stores a sub-stream ID. The sub-stream ID is an 8-bit field indicating whether the data stored in the data field is audio data or sub-picture data. The sub-stream ID further indicates an encode type and a channel identification number. When the data stored in the data field is audio data, the encode type is one of the linear PCM format, AC-3 format, DTS format and the like, and the channel identification number is one of #0 through #7 (8 types max.). When the data stored in the data field is sub-picture data, the channel identification number is one of #0 through #31 (32 types max.).

In the "data field", data compressed in accordance with a prescribed format is recorded. For example, video data is compressed by MPEG2 and recorded in the data field. Audio data is compressed by the linear PCM, AC-3 or DTS format and recorded in the data field. Sub-picture data is compressed by the run-length coding and recorded in the data field.

The PTS in the "pack header" and the "packet header" is used to synchronize the decoding of the audio pack and the decoding the sub-picture pack.

In the case where the reproduction apparatus reproduces a system stream recorded on the optical disk, the reproduction apparatus sets the SCR included in the leading pack of the system stream as an initial value of the STC, which is a reference clock, and inputs each pack to the corresponding decoder at time timing indicated by the SCR while referring to the STC. Each of the decoded packs is externally output from the decoder at the timing indicated by the PTS. By outputting each pack at the timing indicated by the PTS included in the pack, the synchronization of the audio, video and sub-picture outputs is guaranteed.

As described above, in the case of using the standard reproduction method, the system stream to be reproduced is multiplexed with audio information, video information and sub-picture information. The system streams are reproduced by resetting the STC, which is a reference clock, of each system stream and externally outputting the audio, video and sub-picture data from the decoder at the timing indicated by the PTS included in each pack. Thus, the audio data, video data and sub-picture data are reproduced synchronously with one another.

(4.2) Reproduction Method of AOB and P_VOB

Hereinafter, a reproduction method of an AOB and a P_VOB recorded on the optical disk will be described.

Figure 52:
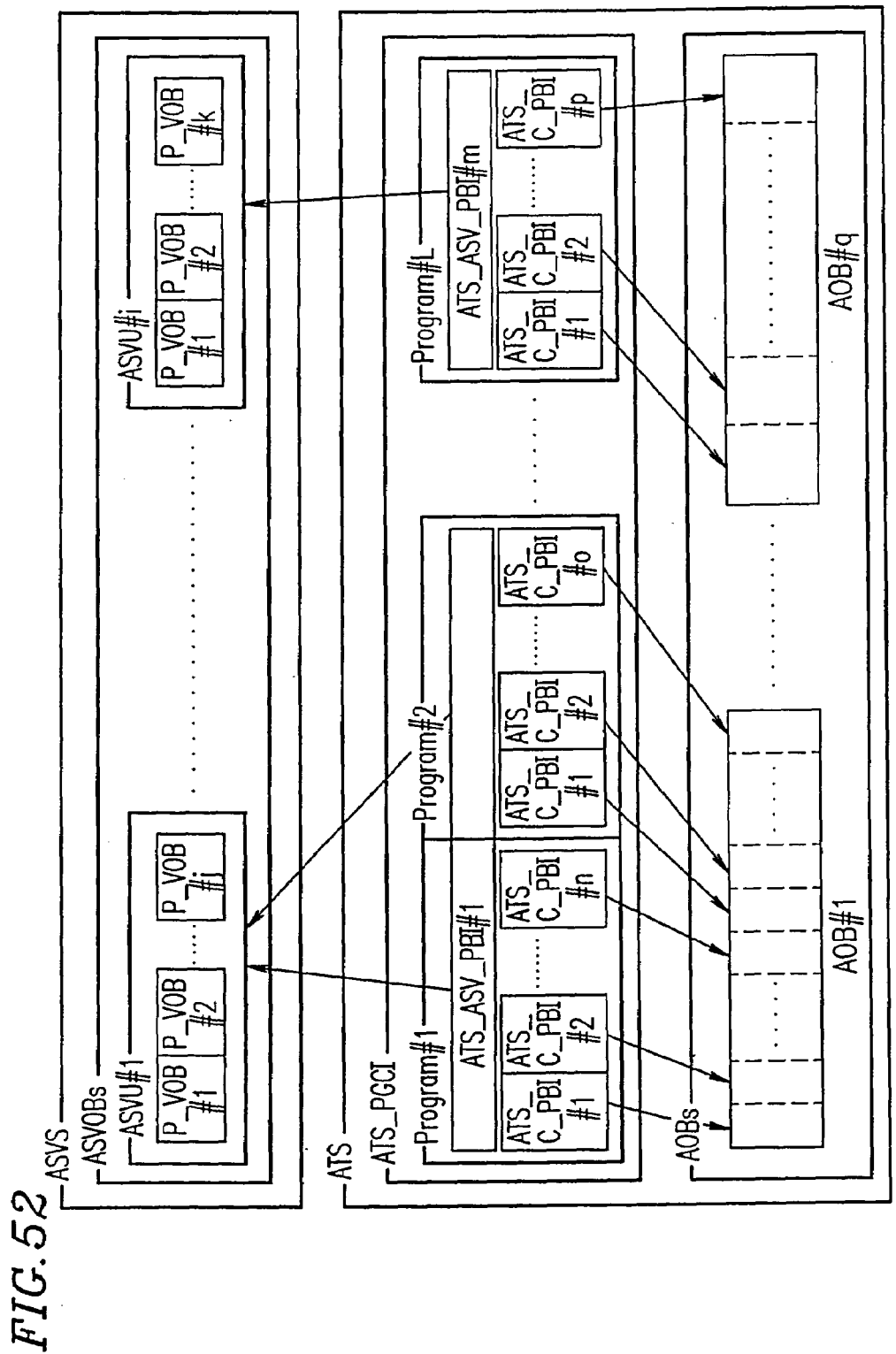
FIG. 52 shows the relationship among P_VOB, ASVU, ATS_PGCI and AOB.

FIG. 52 shows the relationship among the P_VOB, ASVU, Program and AOB.

An ATS can include a plurality of PGC information (ATS_PGCI) units. In the example shown in FIG. 52, the ATS includes one PGC information unit (ATS_PGCI).

Described in the PGC information is one or more audio program information (ATS_PGI) units (e.g., Program #1, Program #2, . . . Program #L). The audio program information is an audio data access unit.

The audio program information includes one or more audio cell reproduction information (ATS_C_PBI) units. The audio cell reproduction information unit is a minimum management unit. The audio cell reproduction information points to the position in the audio data stored in the AOB. Thus, the audio data to be reproduced in relation to the audio cell reproduction information is determined.

Also described in the PGC information is one or more ATS audio still video reproduction information (ATS_ASV_PBI) units. The ATS audio still video reproduction information defines the mode in which the still picture is reproduced on a program-by-program basis. A plurality of audio program information units can share one ATS audio still video reproduction information unit. In the example shown in FIG. 52, Program #1 and Program #2 share ATS_ASV_PBI#1.

The audio still video reproduction information can be shared when a plurality of audio program information units point to a common entry in the ATS audio still video reproduction information table (ATS_ASV_PBIT).

Figure 69:
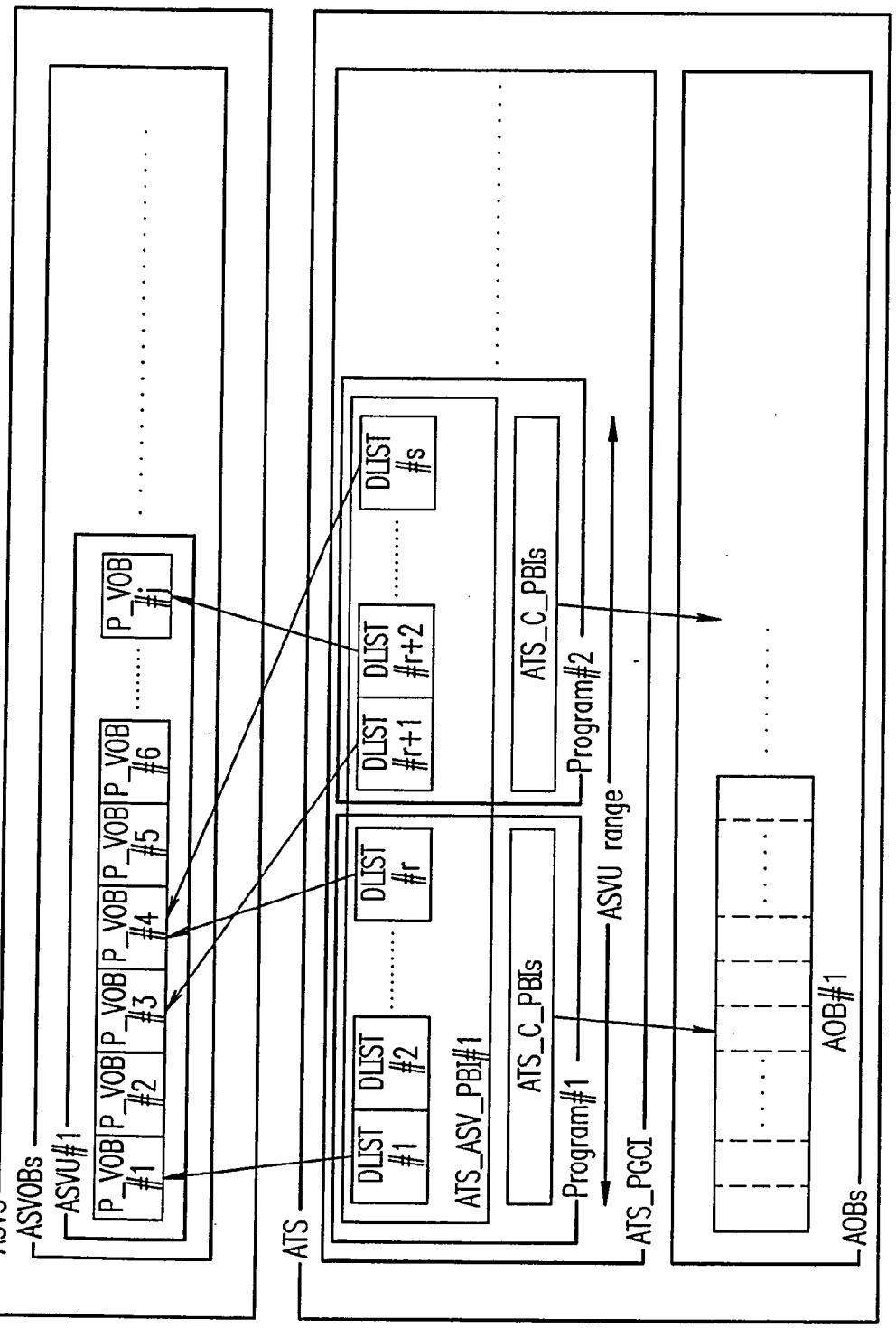
FIG. 69 illustrates the relationship between DLIST and P_VOB.

FIG. 69 shows the relationship between the DLIST and P_VOB.

The ATS_ASV_PBI includes a plurality of display lists (DLIST), and each DLIST points to the still picture data (P_VOB) to be displayed. Usually, the still picture data (P_VOB) is reproduced in accordance with the order of the DLIST. The ATS_ASV_PBI can be designated by the unit of the program of the ATS_PGCI. The same ATS_ASV_PBI can be designated by continuous programs. The P_VOB can be designated by the ASVU, which is a reading unit. The same ASVU is designated by the programs designating the same ATS_ASV_PBI.

In other words, continuous programs can be designated so as to use the same ATS_ASV_PBI with respect to the same ASVU. This is referred to as the ASVU range.

During the reproduction of the programs in the same ASVU range, the same ASVU is used. Accordingly, the still picture is not read and thus the reproduction of audio data is not interrupted. The DLIST of the ATS_ASV_PBI can designate an arbitrary P_VOB which is included in the same ASVU. Accordingly, the same P_VOB can be designated a plurality of times. The P_VOB in the ASVU need not be designated in the DLIST.

Accordingly, different still pictures can be reproduced while using the same ASVU among different programs, although the ATS_ASV_PBI needs to be changed.

The audio program information designates the ASVU recorded in the ASVS in order to designate a plurality of still pictures (P_VOB) to be displayed simultaneously with the reproduction of the AOB.

The ASVU defines the unit by which the reproduction apparatus buffers the still picture data. In other words, the still picture data in the designated ASVU is read before one audio program information unit is reproduced. Accordingly, the reproduction apparatus need not read the still picture data from the optical disk while reproducing a music program.

When reproducing the next music program information, the reproduction apparatus determines whether the plurality of pieces of still picture data indicated by the required ASVU exists in the main memory area or not. In the case where the plurality of pieces of still picture data of ASVU used in the previous audio program information exist in the main memory area, the reproduction apparatus need not read the still picture data from the optical disk.

The disk title creators can allow the reproduction apparatus to switch from one audio program information unit to the next audio program information unit rapidly by causing one ASVU to be shared by the two audio program information units. The reproduction apparatus can perform rapid switching from one audio program unit into the next audio program unit when the successive audio program units share the ASVU.

Each ATS_ASV_PBI manages the display order of the still pictures to be displayed by the display list (DLIST). In the display list (DLIST), the still picture to be displayed is designated by the ASV number. The ASV number is used for specifying the still picture included in the ASVU.

Thus, the PGC information allows the still picture to be designated for each audio program information unit. Alternatively, the same still picture can be displayed for a plurality of audio program information units. Even when the audio program information is changed, the display can be changed without muting the audio data.

Figure 53:
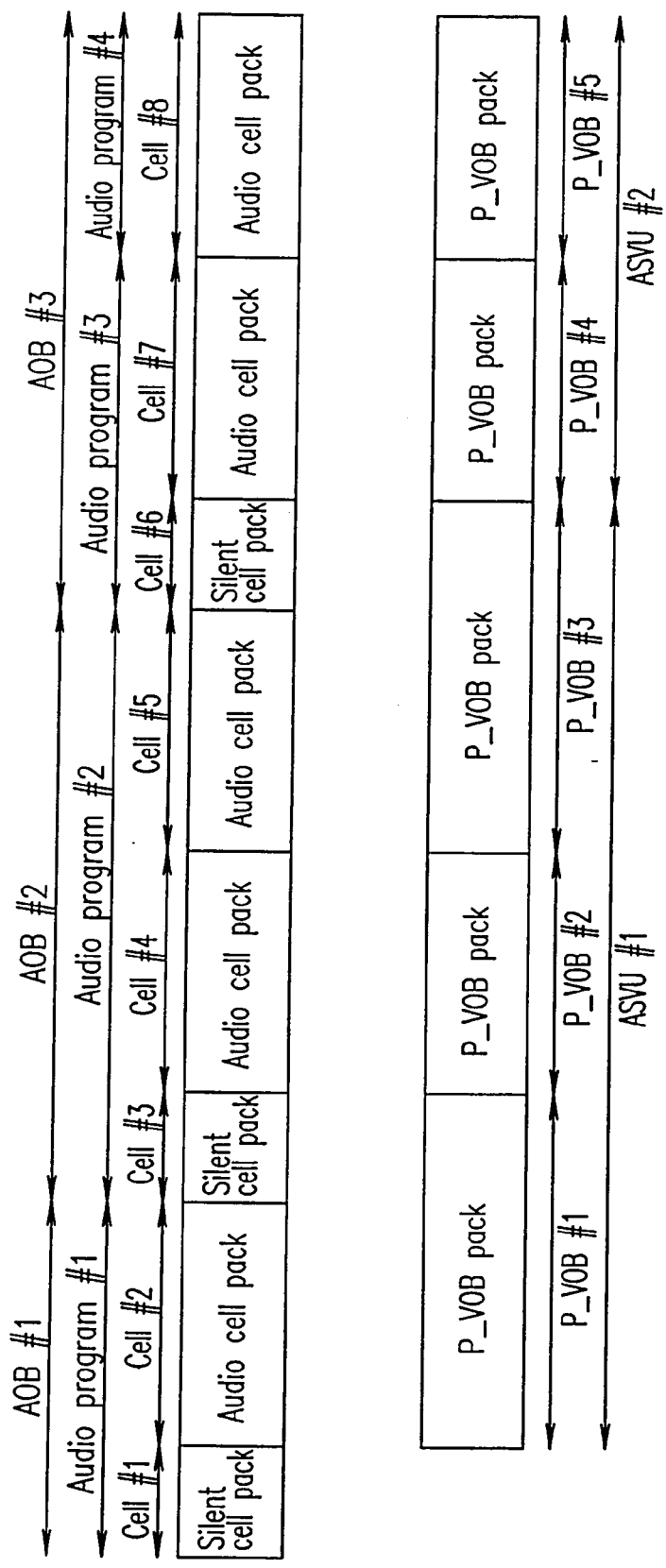
FIG. 53 shows an example of PGC information.

FIG. 53 shows an exemplary PGC forming a title. In this example, the PGC includes four audio programs. Audio program #1 corresponds to AOB #1, audio program #2 corresponds to AOB #2, audio programs #3 and #4 correspond to AOB #3. On the recording medium, the AOBs are recorded in the order of AOB#1, AOB#2 and AOB#3. Audio programs #1, #2 and #4 each has a silent cell, and audio programs #2 has two music cells.

Audio programs #1 and #2 represent ASVU#1, and audio programs #3 and #4 represent ASVU#2. P_VOB #1 is displayed in the cell #2, P_VOB #2 is displayed in the cell #4, P_VOB #3 is displayed in the cell #5, P_VOB #4 is displayed in the cell #7, and P_VOB #5 is displayed in the cell #8.

In the case where all the audio cells each have a reproduction time period of 60 seconds (5,400,000 in PTS) and all the still picture cells each have a reproduction time period of 1 second (90,000 in PTS), audio program information can be described as shown in FIG. 54. Still picture program information can be described as shown in FIG. 55.

Under the conditions that the audio data is 48 kHz, 16 bit sampling with 2 channels, the number of the silent packs is 96 and the number of the audio cell packs is 5760 as shown in FIG. 56. Where the number of still picture packs is 50, the ASV search pointer is as shown in FIG. 57. The ASVU general information is as shown in FIG. 58.

In this example, the address information on the ASV search pointer is a relative address with respect to the recording position of the first P_VOB, but can be in any other form which specifies the position of the P_VOB on the optical disk. In the case where, for example, the ASVU generation information includes address information acting as the reference, the address information of the ASV search pointer can be the relative address with respect to the position indicated by the address information in the ASVU general information.

When the audio still video display mode is "SlideShow" as in the case of programs #1 and #2 shown in FIG. 54, the still picture reproduction is reproduced in synchronization with the audio data. Since the ASVU number of the programs #1 and #2 is "1", ASVU #1 is read to the buffer before the reproduction of the programs. Then, as shown in FIG. 55, the still picture information #1 is referred to from the address information of the ATS_ASV_PBI to start the display of still pictures in display lists #1, #2 and #3 in the ATS audio still video reproduction information #1 at the time indicated by the "audio program number" and "display timing" of the display lists. The display timing is synchronous with the reproduction time period of the audio information to be reproduced with the still pictures.

More specifically, the still picture in the display list #1 of the ATS audio still video reproduction information #1 is displayed when the PTS becomes 90,000 while the AOB #1 is being reproduced. The still picture in the display list #2 of the ATS audio still video reproduction information #1 is displayed when the PTS becomes 90,000 while the AOB #2 is being reproduced. The still picture in the display list #3 of the ATS audio still video reproduction information #1 is displayed when the PTS becomes 5,580,000 while the AOB #2 is being reproduced.

As described above, when the audio still video display mode is "SlideShow", the still picture is displayed at prescribed timing synchronously with the reproduction of the audio data. The display timing cannot be changed by the interaction from the user (e.g., selection of a specific button by the mouse).

Figure 59A:
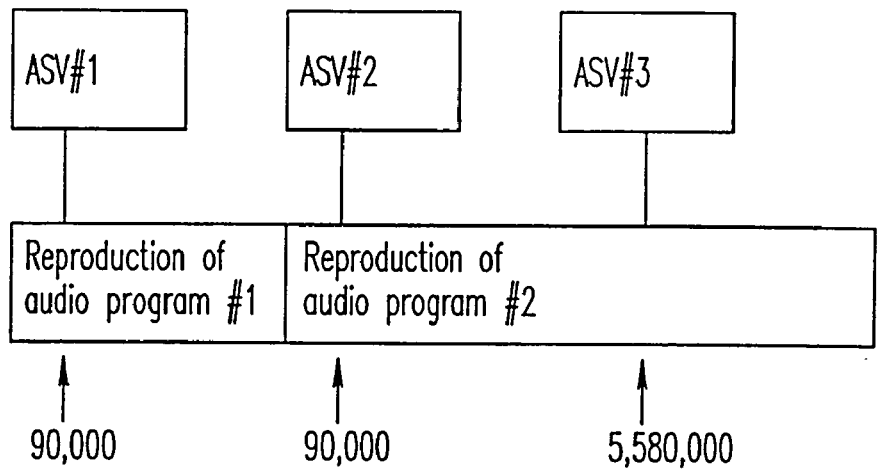
FIG. 59A shows the relationship between the audio reproduction timing and the still picture display timing in the "SlideShow" mode.

FIG. 59A shows the relationship between the reproduction timing of the audio data and the display timing of the still picture when the audio still video display mode is "SlideShow".

By contrast, when the audio still video display mode is "Browsable" as in the case of programs #3 and #4 shown in FIG. 54, the still picture is reproduced asynchronously from the audio data. Since the ASVU number of the programs #3 and #4 is "2", the ASVU #2 is read to the buffer before the reproduction of the programs. Then, still picture information #2 is referred to from the address information of the ATS_ASV_PBI. The display timing of the still pictures in display lists #1 and #2 in the ATS audio still video reproduction information #2 can be changed by the interaction from the user (e.g., input of a command by the user).

In the case where no interaction from the user is generated within the period indicated by the "display timing" of the display list, the time period indicated by the "display timing" is considered as the display continuation time period. When the display continuation time period has passed, the display of the next still picture is started.

It is possible to designate with the audio still video display mode whether the still pictures are sequentially displayed in accordance with the display list, the still pictures randomly selected while permitting overlap are reproduced (random reproduction), or the still pictures randomly selected while prohibiting overlap are reproduced (shuffle reproduction).

Practically, when the reproduction starts with program #3, ASVU #2 is loaded to the buffer since the ASVU number of program #3 is "2". Then, the DLIST indicated by the ATS audio still video reproduction information #2 is referred to from the address information of the ATS_ASV_PBI. Since the audio program number of display list #1 is "3", P_VOB #4 corresponding to the ASV number of the display list #1 is displayed. When a key corresponding to the Next_DLIST provided on the remote controller is pressed, the still picture of DLIST #2, i.e., P_VOB #5 indicated by the ASV number of DLIST #2 is displayed.

The still pictures in the DLISTs are displayed in accordance with the "display effect" (i.e., the start section display effect and termination section display effect, see FIG. 55). When no user operation is performed within the time of 5,490,000 indicated by the display timing of display list #1, i.e., about 1 minute (matching to the reproduction time period of program #3), the still picture of the next DLIST, i.e., P_VOB #5 is displayed in accordance with the "display effect" and the "transition time". The audio data of program #4 is reproduced in relation with the display of P_VOB #5.

In the case where the reproduction time period of program #3 is shorter than the time period indicated by the display timing of P_VOB #4, the display of P_VOB #4 is terminated and the display of P_VOB #5 is started while program #3 is being reproduced. In the case where the display time period indicated by the display timing of P_VOB #4 is longer than the reproduction time period of program #3, the display of P_VOB #5 is started after the reproduction of program #4 is started.

When the reproduction is started with program #4, ASVU #2 is read as in the case of starting with program #3 to display the P_VOB in the first DLIST having the audio program number of "4". Thereafter, the display of the still pictures can be changed in accordance with the user operations or command. The audio program number of the DLIST is effective only for determining the P_VOB to be displayed first only when the ASVU is changed. When the reproduction is continued, a user operation or command has priority over the audio program number. When the P_VOB is displayed while the time period indicated by the display timing, the P_VOB indicated by the next DLIST is displayed.

When the value indicated by the display timing refers to "infinity", the corresponding P_VOB is continuously displayed until the user operation or execution of a command is performed. As the value indicating the infinity, the maximum value (e.g., all the bit values are "1") can be used but other values are also usable. When the audio still video display mode is "Browsable", the display time period of the P_VOB can always be infinite.

Figure 59B:
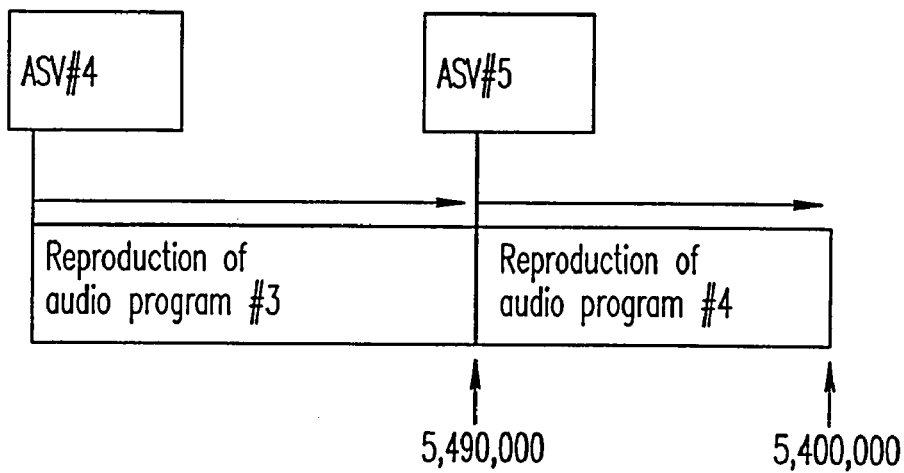
FIG. 59B shows the relationship between the audio reproduction timing and the still picture display timing in the "Browsable" mode.

FIG. 59B shows the relationship between the reproduction timing of the audio data and the display timing of the still picture when the audio still video display mode is "Browsable".

Figure 60:
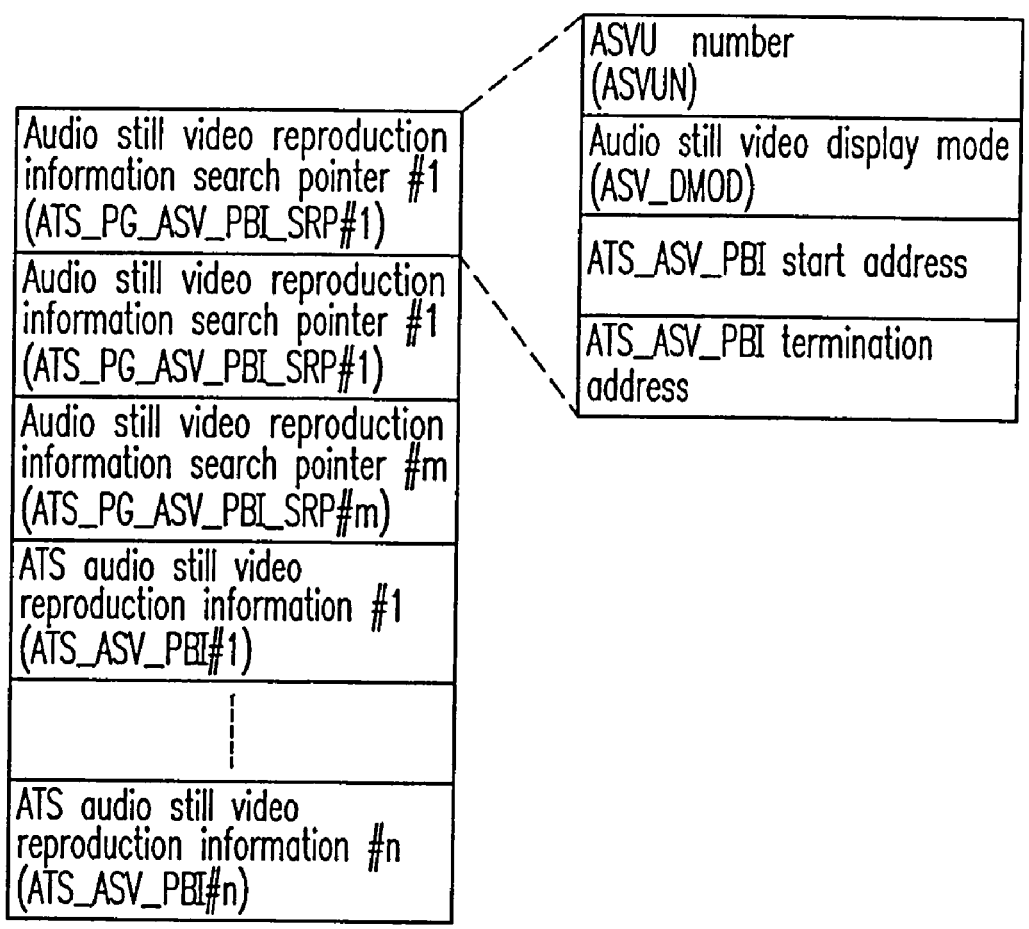
FIG. 60 illustrates an audio still video display mode.

In this example, information required for each audio programs is recorded in the audio program information (ATS_PGI). When the information is found to correspond to each audio program, the information can be recorded in any area. For example, as shown in FIG. 60, the ASVU number, audio still video display mode, ATS_ASV_PBI start address, and ATS_ASV_PBI termination address are recorded in the audio still video reproduction information search pointer (ATS_PG_ASV_PBI_SRP).

As described above, the AOB and P_VOB are reproduced simultaneously by decoders unlike in the case of the VOB.

Hereinafter, the reproduction method of the VOB and the reproduction method of the AOB and P_VOB will be compared.

The two reproduction methods are identical with each other in that video information is output along with the audio information. It should be noted that in the case of the P_VOB, the video information is still picture information including an I picture.

One difference between the two reproduction methods is the recording position of the data. In the case of the VOB, audio information and video information are multiplexed together and recorded on the optical disk as one system stream, whereas the AOB and the P_VOB are recorded in different areas of the optical disk as different system streams.

Another difference between the two reproduction methods is the synchronization method of audio data and still picture data. VOBs are reproduced by a decoder one by one as described above. In more detail, the STC, which is a reference clock, is reset by the SCR in the "pack header", and the STC is referred to output both audio information and still picture information at the timing of the PTS in the "packet header" in each pack. By contrast, AOBs and P_VOBs are reproduced by decoders simultaneously. As described in more detail below, a plurality of prescribed P_VOBs to be reproduced synchronously with the AOB are read from the disk and input to the decoder before the AOBs. Unlike the VOBs, the P_VOBs input to the decoder are not displayed immediately but are held in the decoder. Regarding each P_VOB, it is considered that the STC is reset with the SCR of the leading pack in accordance with the MPEG decoding model and the P_VOB is decoded in accordance with the PTS in the packet, so that data after the plurality of prescribed P_VOBs to be reproduced synchronously with the AOB is accumulated. Actually, the data regarding the P_VOB before being decoded is accumulated in an appropriate buffer. When the P_VOBs are completely input into the decoder, the AOB is read from the optical disk and input to the decoder. When the AOB is input to the decoder, the STC, which is a reference clock, is reset by the SCR in the leading pack, and the AOB is output at the timing of the PTS in each pack header referring to the STC as in the case of the VOB.

Information on the actual output timing of the P_VOBs is recorded in another area of the optical disk (i.e., DLIST as a part of the PGC information). The information on the output timing is separately supplied to the decoder. Each P_VOB in the decoder is not output synchronously with the STC but at the display timing recorded in the DLIST. In other words, in reproducing the AOB, the PTS which is included in the AOB is used to determine the display timing of the AOB; and in reproducing the P_VOB, the information which is separately recorded from the P_VOB is used to determine the display timing of the P_VOB.

The audio zone region and the DVD as a multimedia optical disk have been described. Next, a reproduction apparatus in this example for reproducing a media having the above-described structure will be described.

The basic structure of the reproduction apparatus in this example is the same as those described in the first and second examples. As in the second example, a key for separately controlling audio data and video data is provided in a remote controller for operating the DVD player or is provided on a front panel of the DVD player. With such a key, the video data can be skipped forward and backward or rewound to the start of the video data while continuously reproducing the audio data.

Figure 61:
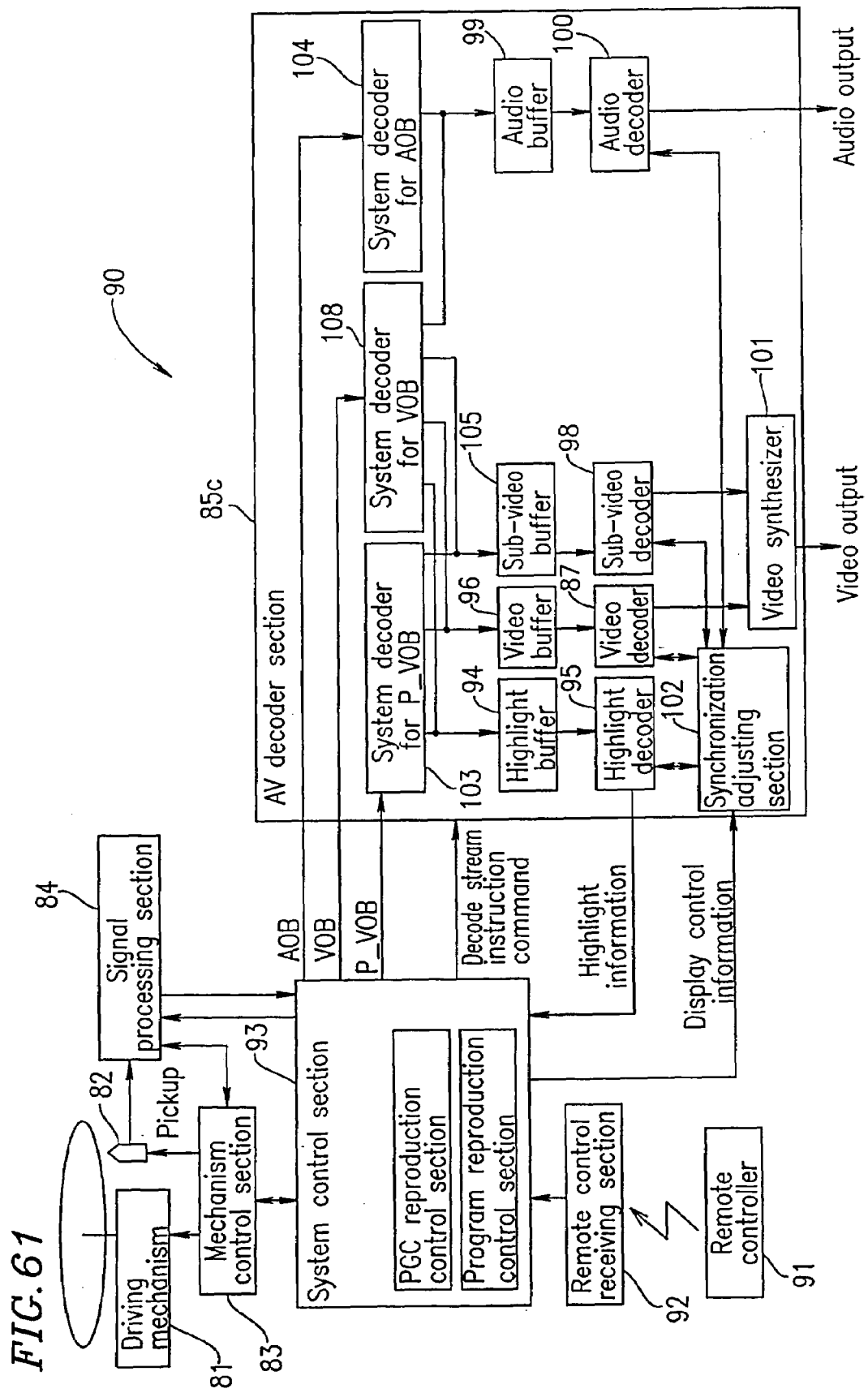
FIG. 61 is a block diagram illustrating an internal structure of a DVD player as a reproduction apparatus.

FIG. 61 is a block diagram illustrating an internal structure of a DVD player 90 in the third example. The DVD player 90 is different from the DVD player 70 shown in FIG. 8 in the structure of the AV decoder section, which will be described below.

In the third example, usable streams include an AOB as audio data, and a P_VOB as video data, and a VOB for menu or the like obtained by multiplexing audio and video data. An AV decoder section 85c includes a P_VOB system decoder 103, an AOB system decoder 104, and a VOB system decoder 108. The AV decoder section 85c has a structure to operate the system decoders 103, 104 and 108 synchronously with and asynchronously from one another.

The P_VOB system decoder 103 receives a P_VOB stream and distinguishes a stream ID and sub-stream ID in a header of each packet included in the stream, thereby classifying the data into a video packet, a PCI (highlight) packet, and a sub-picture packet.

The AOB system decoder 104 receives an AOB stream and classifies the data on a packet header-by-packet header basis.

The VOB system decoder 108 receives a VOB stream and distinguishes a stream ID and sub-stream ID in a header of each packet included in the stream, thereby classifying the data into an audio packet, a video packet, a PCI (highlight) packet, and a sub-picture packet.

The AV decoder section 85c still includes a highlight buffer 94 for temporarily storing highlight information of a PCI packet from the P_VOB system decoder 103 and the VOB system decoder 108, a video buffer 96 for temporarily storing a video packet from the P_VOB system decoder 103 and the VOB system decoder 108, a sub-picture buffer 105 for temporarily storing a sub-picture packet from the P_VOB system decoder 103 and the VOB system decoder 108, an audio buffer 99 for temporarily storing an audio packet from the AOB system decoder 104 and the VOB system decoder 108, a highlight decoder 95 for decoding the highlight data from the highlight buffer 94 and outputting the decoded highlight data to the system control section 93, a video decoder 87 for decoding the video data from the video buffer 96, a sub-picture decoder 98 for decoding the sub-picture data from the sub-picture buffer 105, an audio decoder 100 for decoding the audio data from the audio buffer 99 and outputting the decoded audio data as an audio output, a video synthesizer 101 for synthesizing the decoding results of the video decoder 87 and the sub-picture decoder 98 into one piece of video data, and a synchronization adjusting section 102 for managing the synchronization of the highlight decoder 95, the video decoder 87, the sub-picture decoder 98 and the audio decoder 100.

The reproduction apparatus having the above-described structure operates in, for example, the following manner.

The operation up to the reading of the stream is the same as described in the first and second examples and will not be described below.

FIGS. 62 through 66 are schematic flowcharts illustrating an operation for reproducing the PGC information.

For starting the reproduction, the system control section 93 determines whether or not the DVD player 90 is in a video-oriented reproduction mode, by a reproduction mode determination section. When it is determined that the DVD player 90 is in the video-oriented reproduction mode, the system control section 93 reads the video manager based on the information which is read from the volume file management region. The system control section 93 refers to the PGC management information table for the video manager menu to calculate the recording address of the PGC for the volume menu. The resultant PGC is reproduced and retained inside. When the PGC for the volume menu is retained inside, the system control section 93 refers to the retained PGC information to calculate the video object (VOB) to be reproduced and the recording address of the VOB on the optical disk. When the VOB to be reproduced is determined, the system control section 93 outputs a control signal to the mechanism control section 83 and the signal processing section 84 so as to retrieve the determined VOB from the optical disk for reproduction. When the system stream forming the VOB is input to the AV decoder section 85c, an instruction indicating "reproduce VOB" as a decode stream instruction is given to the AV decoder section 85c.

The VOB input to the AV decoder section 85c is divided into streams forming the VOB, i.e., an audio pack, video pack, sub-picture pack, and NV pack by the VOB system decoder 108, and the streams are respectively input to the audio buffer 99, the video buffer 96, the sub-picture buffer 105, and the highlight buffer 94. The highlight buffer 95 buffers only the highlight information in the PCI packet in the NV pack. Data input to each buffer is input to the audio decoder 100, the video decoder 87, the sub-picture decoder 98 or the highlight decoder 95 to be decoded. Audio data for menu is output from the audio decoder 100. The outputs from the video decoder 87 and the sub-picture decoder 98 are synthesized by the video synthesizer 101 and output as video data. The output from the highlight decoder 95 is read to the system control section 93 and the button information or the like of each menu is stored in the memory in the system control section 93.

Figure 40:
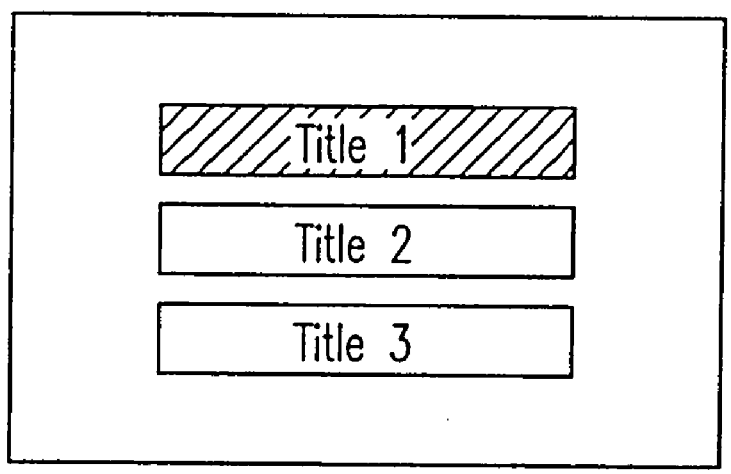
FIG. 40 shows a video menu for allowing the user to select a title.

Thus, a video menu from which the user can select the title to be reproduced (i.e., audio program) is displayed (see FIG. 40).

The user sees the menu and selects and confirms the title that he/she is interested in by designating the item number in the menu using the remote controller. Then, the system control section 93 receives the designation of the item number in the menu from the remote controller and refers to the button information of the highlight information of the PCI pack included in the VOB of the video menu which is being reproduced, the VOB being stored in the memory, to execute a control command corresponding to the designated number. The control command is PlayProgram #n or the like, and the title number to be reproduced is designated by "n".

As an execution operation by the PlayProgram command, the system control section 93 refers to the title search pointer table, which is a part of the audio manager, to determine the audio title set (ATS) to which the designated title belongs to and the title number in the ATS. When the ATS is confirmed, the system control section 93 outputs a control signal to the mechanism control section 83 and the signal processing section 84 so as to reproduce the ATS management information of the confirmed title set and sequentially retrieves ATS PGC information search pointer, which is a part of the ATS management information, to determine the PGC information including the audio program to be reproduced.

When the PGC information is determined, the system control section 93 outputs a control signal to the mechanism control section 83 and the signal processing section 84 so as to reproduce the determined PGC information from the disk and retain the information in the inside buffer memory for the PGC information.

Figure 62:
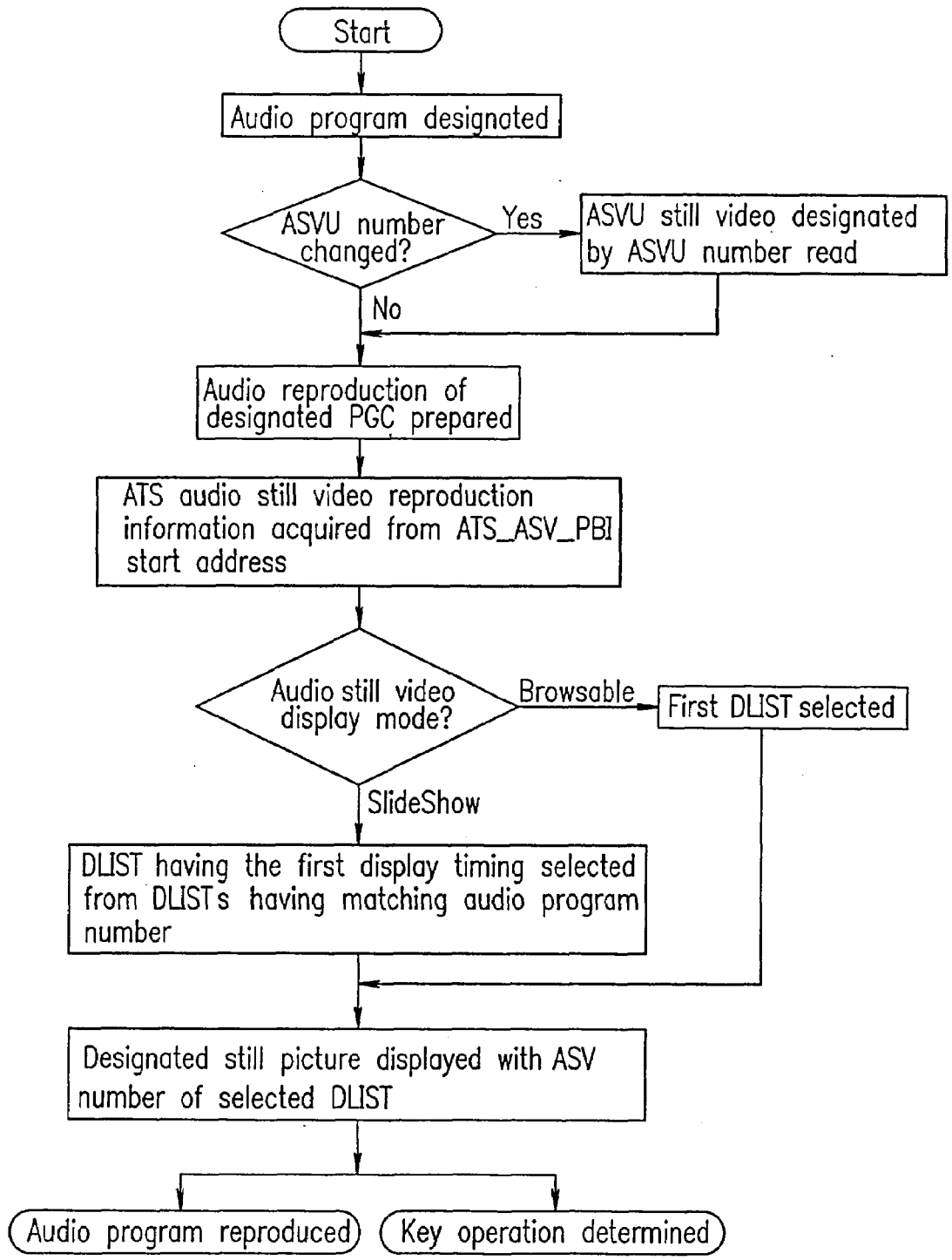
FIG. 62 is a flowchart illustrating a method for reproducing PGC information.

When the PGC information is retained, the system control section 93 reproduces the PGC information in accordance with the flowchart shown in FIG. 62. It is assumed that the audio program to be produced is already determined by the above-described menu command or direction designation using the remote controller. The system control section 93 refers to the retained PGC information to first acquire the ASVU number of the first audio program information and compares the number with the ASVU number previously reproduced. When the ASVU number is changed, the system control section 93 reads all the still picture data, i.e., P_VOBs included in the ASVU based on the ASVU general information corresponding to the ASVU number and inputs the number into the AV decoder section 85c. Simultaneously, an instruction indicating "reproduce P_VOB" is given to the AV decoder section 85c as a decode stream instruction from the system control section 93. The AV decoder section 85c separates the input P_VOBs on a pack-by-pack basis or packet-by-packet basis by the P_VOB system decoder 92 and stores the P_VOBs in corresponding buffer memories.

At this point, the size of the video buffer 96 needs to be larger than the sum of the sizes of the P_VOBs of the ASVU. For any reproduction apparatus, a maximum value of the total data amount of the P_VOBs included in the ASVU is set in order to guarantee the reproduction. The video buffer 96 in any reproduction apparatus needs to have a size accommodating the maximum value. In this example, the maximum value of 2 MByte. Since an I picture is 100 to 200 Kbyte, 10 to 20 I pictures can be reproduced along with the audio information.

When all the P_VOBs forming the ASVU are completely input to the decoder, the highlight decoder 95, the video decoder 87, and the sub-picture decoder 98 do not perform a decoding operation. In order to store all the data regarding the corresponding ASVU into the buffers before the audio data is reproduced, the highlight buffer 94, the video buffer 96, and the sub-picture buffer 105 need to have a greater buffer capacity than the buffer capacity specified by MPEG2 or DVD-Video.

When all the P_VOBs are completely stored in the corresponding buffers, the AV decoder section 85c and the audio decoder 100 are set to be in a decodable state by the audio encoding mode in the ATS PGC information search pointer 832 corresponding to the designated PGC information for preparation of the reproduction of the audio data of the designated PGC. Then, the system control section 93 prepares for the display of the still picture. The system control section 93 determines the ATS audio still video reproduction information from the ATS_ASV_PBI start address of the audio program information.

When the audio still video display mode of the audio program information is Browsable, the first DLIST of the ATS audio still video reproduction information determines the first still picture to be reproduced. When the audio still video display mode is SlideShow, the DLIST having the earliest display timing among a plurality of DLISTs of the ATS audio still video reproduction information in the range of audio programs to be reproduced is selected. When the DLIST is determined, the system control section 93 displays the still picture, i.e., the P_VOB designated by the ASV number of the DLIST. Specifically, the system control section 93 outputs display control information of the still picture information to the synchronization adjusting section 102 in the AV decoder section 85c. The display control information includes a wait period until the I picture of the P_VOB to be updated is designated and the update thereof is displayed. When the display control section is input, the synchronization adjusting section 102 instructs the video decoder 87 to output the designated I picture at the designated timing in accordance with the display control information. Thus, the P_VOB is displayed. Unlike the AOB and VOB, the P_VOB is output at the display timing recorded in a separate area.

When the display of the P_VOB is started, the audio data designated by the audio program is reproduced simultaneously. Simultaneously, the key operation by the user is accepted.

Figure 63:
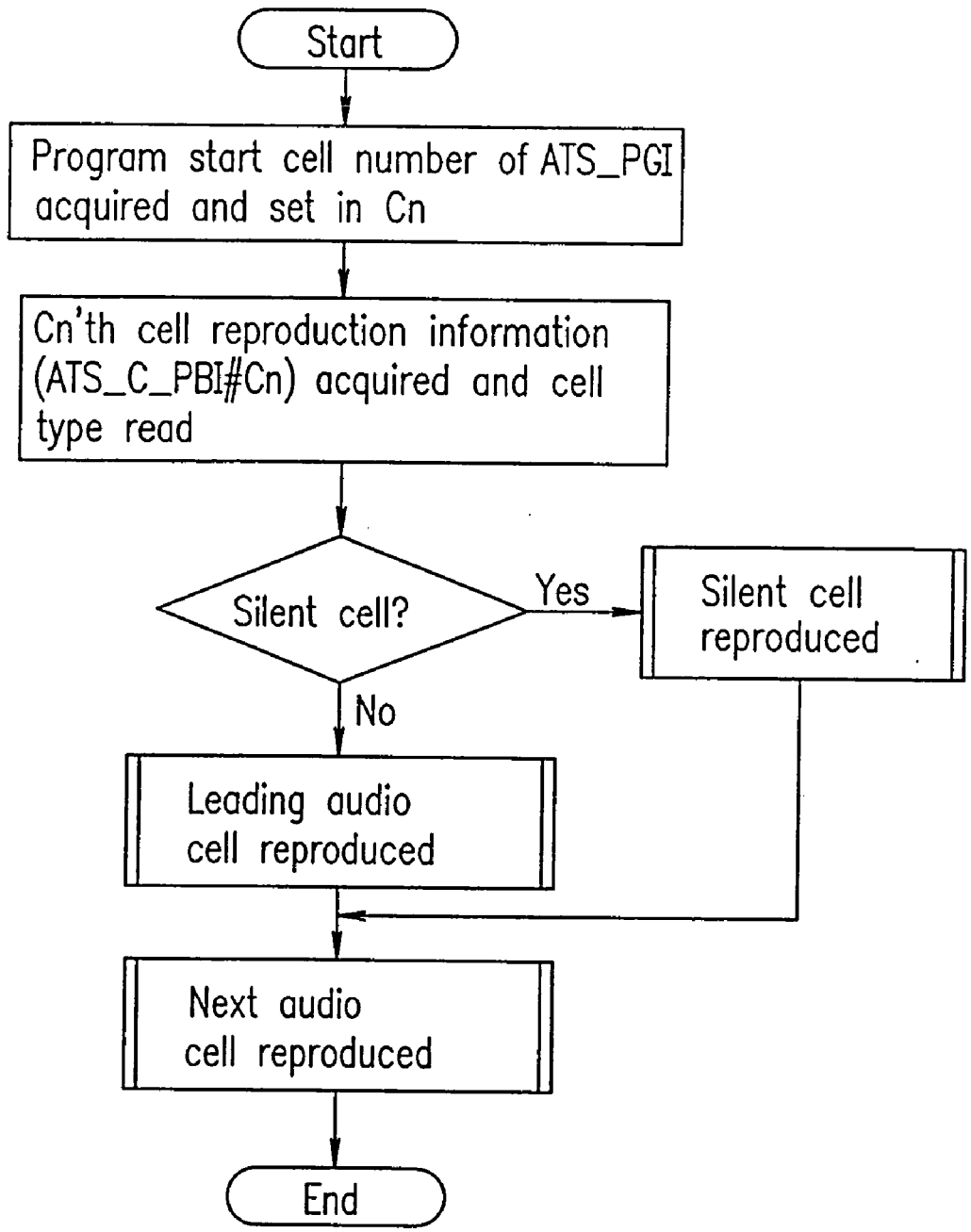
FIG. 63 is a flowchart illustrating a method for reproducing audio program.
Figure 65:
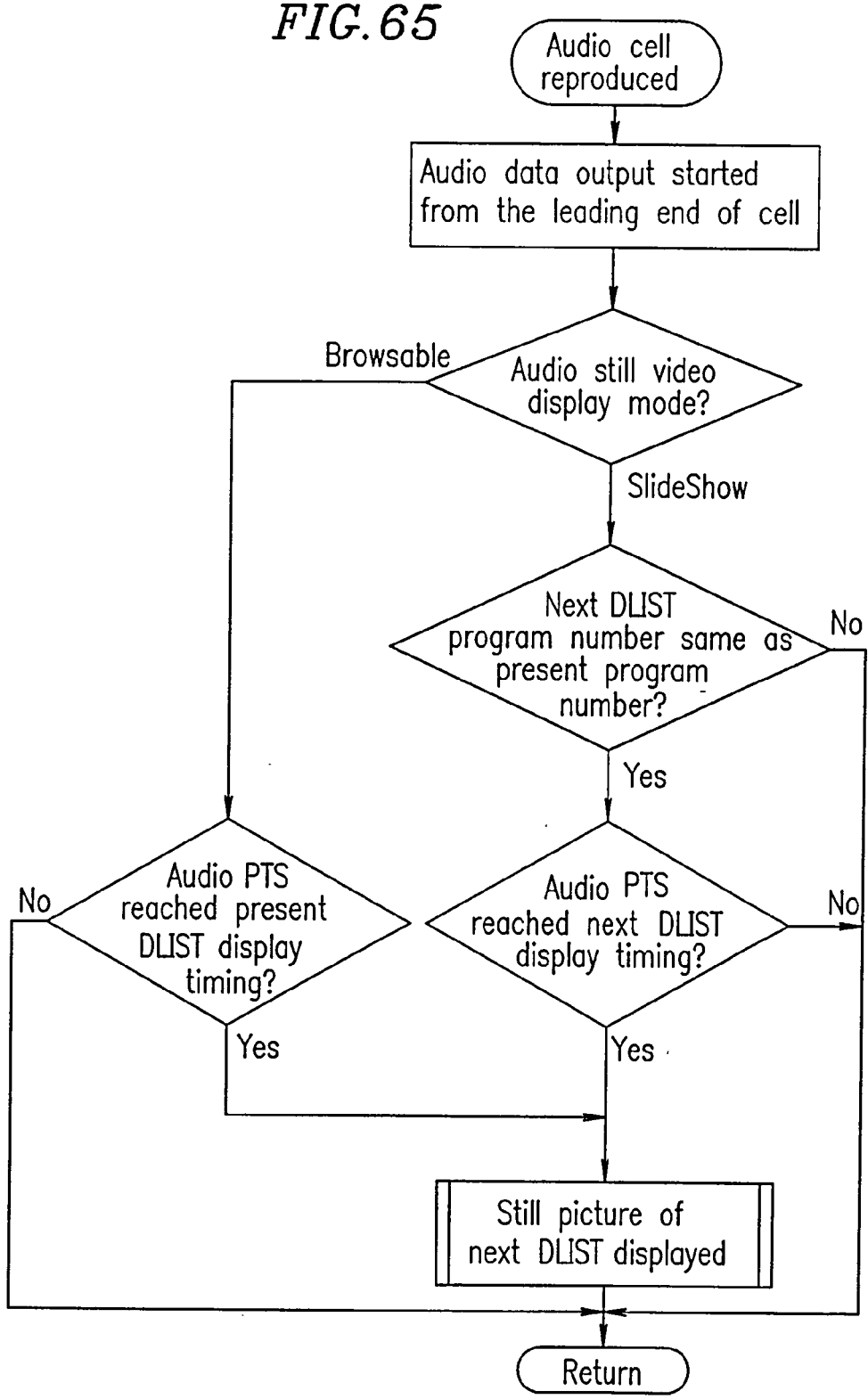
FIG. 65 is a flowchart illustrating a method for reproducing audio data.

The reproduction of the audio data designated by the audio program is performed as shown in FIG. 63. First, the cell number (Cn) to be reproduced is determined by the ATS program information table and the ATS cell reproduction information table. Here, since this is the start of the operation, the cell number is 1. When the cell type of the cell to be reproduced is a silent cell, processing for reproducing a silent cell is performed. This requires only the effective silent period corresponding to the reproduction time period of the silent cell. When the cell is not a silent cell, the cell is an audio cell. Accordingly, the reproduction of the audio cell shown in FIG. 65 is performed. In order to output the audio data from the leading end of the audio cell, the AOB to be reproduced and the recording address thereof are determined based on the audio cell reproduction information, and a control signal is output to the mechanical control section 83 and to a signal processing section 84. Thus, the reproduction of the determined AOB is prepared. The AOB read from the optical disk is input to the AV decoder section 85c. Simultaneously, the system control section 93 gives an instruction indicating "reproduce AOB" as a decode stream instruction to the AV decoder section 85c. The AOB is decoded into an audio stream by the AOB system decoder 104 and input to the audio buffer 99 and then to the audio decoder 100. Thus, the AOB is prepared to be output as audio data. Once the AOB is prepared, the STC, which is a reference clock, of the synchronization adjusting section 102 is reset by the SCR of the leading pack of the AOB, and the audio data in the AOB is output at the timing of the PTS stored in the packet header. When the output of the AOB is started, highlight information and sub-picture information for the leading I picture of the P_VOB and the menu items displayed in the state of overlapping with the leading I picture are decoded and output. Although it is not guaranteed that all the packets of the AOB include a PTS, the audio decoder outputs the audio data while complementing the PTS.

When the audio still video display mode is Browsable while the audio data is being output and the display timing of DLIST corresponding to the P_VOB which is being displayed reaches the PTS of the audio data which is being reproduced, it is determined that the display time period of the still picture has passed and thus the still picture of the next DLIST is reproduced. When the audio still video display mode of the audio program is SlideShow and the audio program number of the next DLIST is not the same as the audio program number of the DLIST which is being reproduced, it is determined that there is no DLIST to be reproduced and thus the still picture displayed is continuously displayed. When the next DLIST is the same as the audio program number of the DLIST which is being reproduced, the still picture of the next DLIST is reproduced when the display timing of the next DLIST reaches the PTS of the audio data which is being reproduced.

Figure 66:
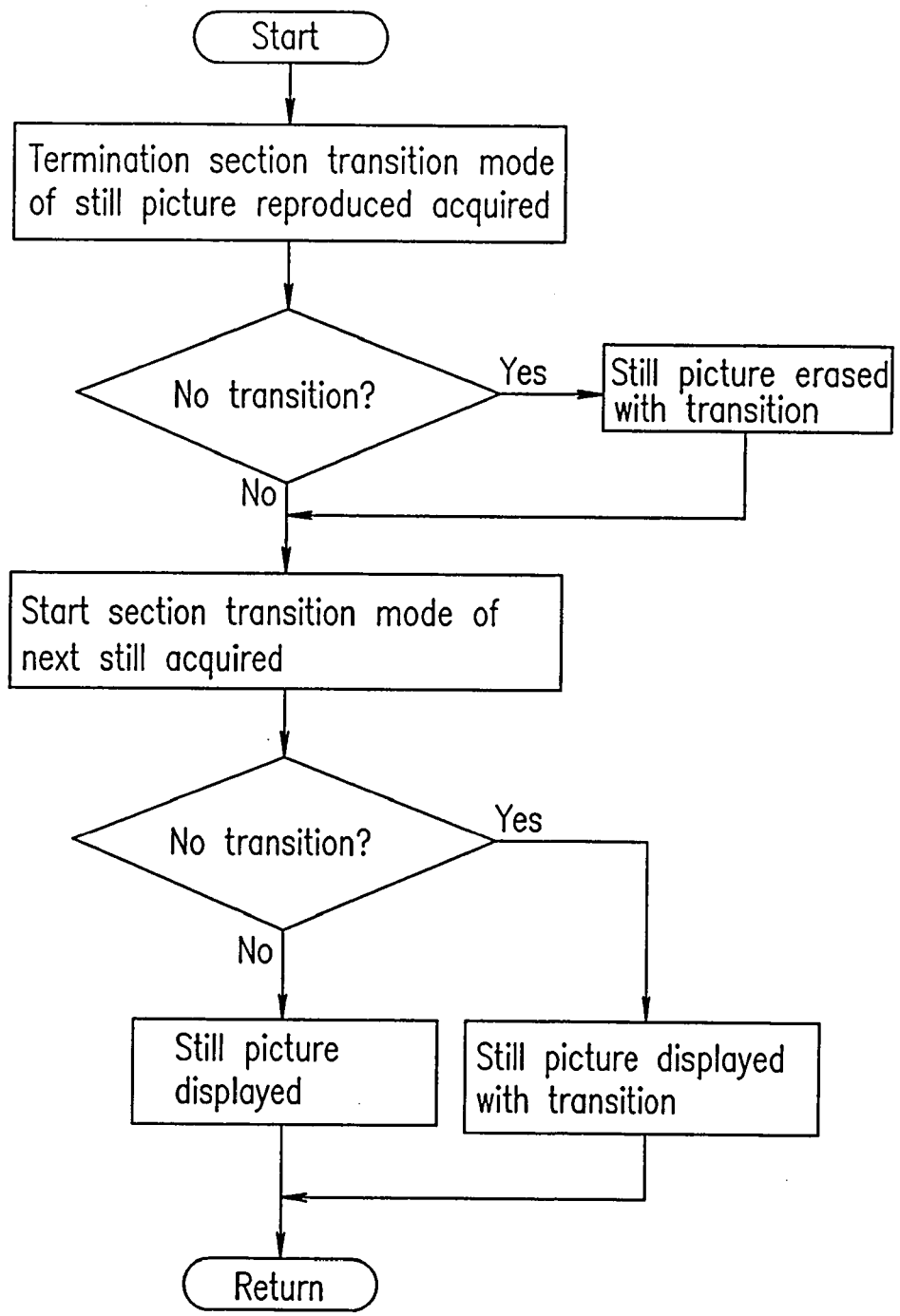
FIG. 66 is a flowchart illustrating a method for reproducing a still picture.

FIG. 66 is a flowchart illustrating the reproduction of the second and later still pictures. First, the termination transition mode of the DLIST of the still picture which is being displayed is acquired. When the termination transition mode is "no transition", the display is terminated. When the termination transition mode is not "no transition", i.e., when the transition effect is designated, the still picture is erased by the designated transition. The designated transition is, for example, fading, by which the color becomes gradually lighter. It should be noted that the transition effect may be ignored or replaced with another effect unless the reproduction apparatus has a capability of performing the designated effect.

When the still picture displayed is erased, the start section transition mode of the DLIST of the next still picture is acquired. When the transition mode is "no transition", the next still picture is immediately displayed. When the transition mode is not "no transition", i.e., when the transition effect is designated, the next still picture is displayed with an effect. Thus, the still pictures are switched. At this point, the highlight information and the sub-picture information already read in the buffer are decoded as well as the video information included in the P_VOB.

Figure 64:
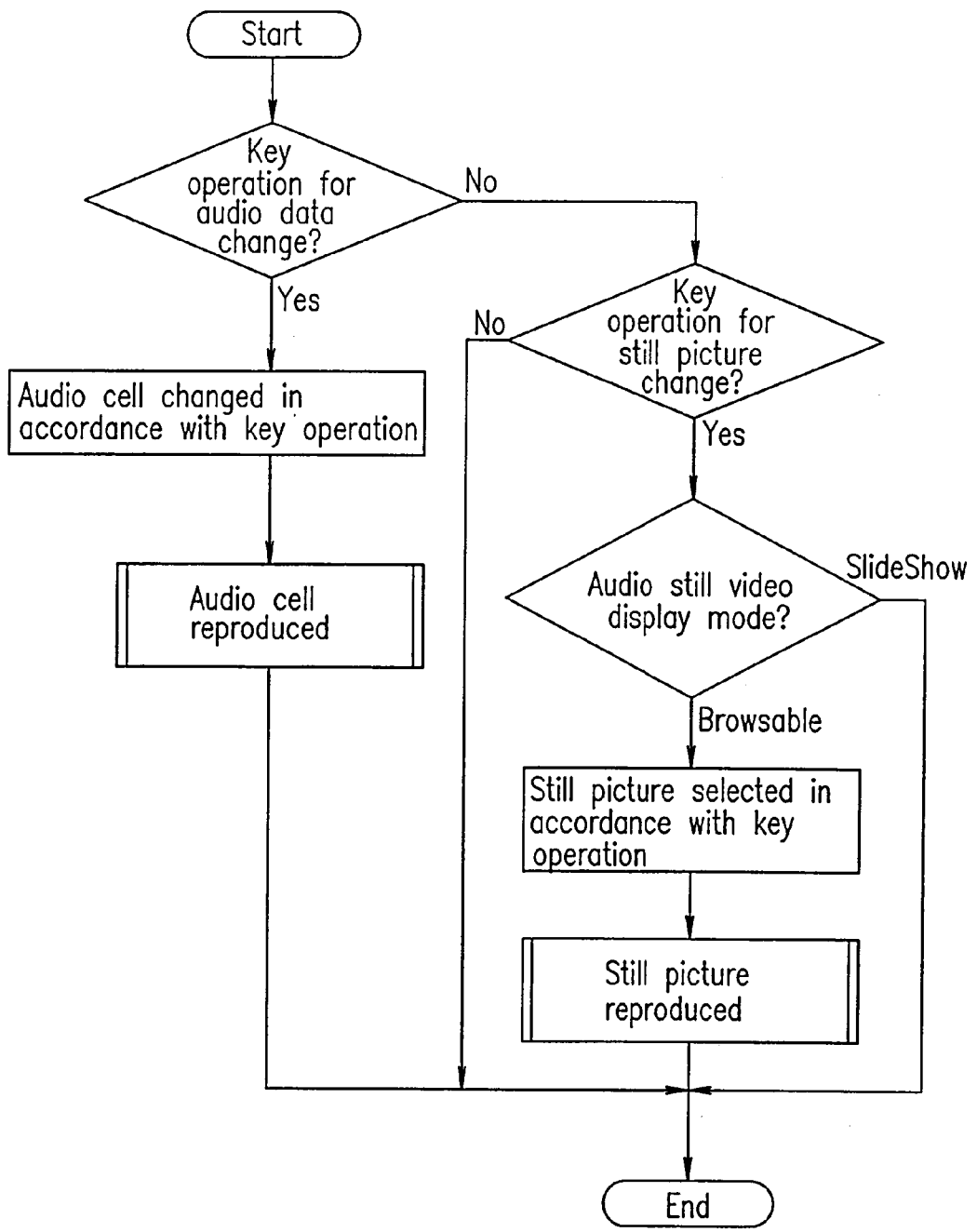
FIG. 64 is a flowchart illustrating a method for determining key operation.

The processing in response to the key operations by the user is performed as shown in FIG. 64. When the key operation accompanies a change of the audio program, i.e., when the key operation is for NextProgram (reproduction of the next audio program), PrevProgram (reproduction of the previous audio program), reproduction of the designated audio program, reproduction of the audio program by a command after the menu is retrieved, or a change of the audio cell, the audio cell of the audio program to be reproduced is changed and processing for reproducing the audio cell is performed (FIG. 65).

When the key operation by the user is for a change of only the still picture, i.e., the key operation is for NextDLIST (display of the next DLIST), PrevDLIST (display of the previous still picture), or display of the designated DLIST, the designated still picture is selected and processing for reproducing the still picture is performed only when the audio still video display mode of the designated still picture is Browsable (FIG. 66).

In response to other key operations, the designated operation is performed without changing the audio output or still picture output. Such operations include display of the reproduction state and switching of the time display mode. In order to reproduce another stream (VOB) such as retrieval of the menu, the audio output and still picture display are terminated and the apparatus is switched to decode the VOB.

Thus, all the titles are reproduced and the operation is stopped. In accordance with specific setting of the DVD player or the DVD, only one title can be reproduced before the operation is stopped, or a menu can be displayed after reproduction of one or more titles is completed.

Hereinafter, the control of the video decoder and video buffer performed by the synchronization adjusting section 102 will be additionally described.

Since data of a still picture is already stored in the buffer memory, the display of the still picture is managed based on the position in the buffer memory at which the still picture of the designated cell of the designated program is recorded or based on the ordinal number (i.e., first, second, etc.) of the still picture with respect to the start. When the management is performed based on the position in the buffer memory, the data is sent to the video decoder 87 from the designated address in the video buffer 96 and displayed by an instruction of the synchronization adjusting section 102. When the management is performed based on the ordinal number of the still picture, the data stored in the video buffer 96 from the leading end thereof is sent to the video decoder 87 and the display is switched when the designated ordinal number is reached. When the still picture is switched, display effects can be added by designating the transition mode. The time to switch the still picture can be designated on a program-by-program basis before and after the display of the still picture. However, in the case where the reproduction apparatus does not have a special effect display function, the still picture can simply be switched with the display effects being ignored.

In a synchronous mode (SlideShow), the audio data is decoded by the audio decoder 100, and the still picture, highlight and sub-picture are reproduced in accordance with the "display timing". The synchronization adjusting section 102 compares the reference time of the system and the "display timing" from the system control section 93 and control the synchronization.

In this case, switching of only the display by the user is prohibited. SlideShow is effectively used, for example, for displaying lyrics along with the music and displaying a still picture in a moving picture. In the asynchronous mode (Browsable), audio data is not synchronized with and reproduced separately from highlight data, sub-picture data and still picture data. The highlight data, sub-picture data and still picture data are synchronized to one another, and the audio data is continuously reproduced in realtime based on the time information of the system. The still picture is switched in the asynchronous mode by the user operation and the command. The user operation basically are, for example, an operation of continuously reproducing audio programs while feeding display list (DLIST) forward, backward or to the leading end; and an operation of feeding both audio programs and display list (DLIST) simultaneously forward, backward or to the leading end. The command has similar functions. In this case, the "display timing" is considered as the display continuation time period of the still picture. When the interaction from the user is not generated during the time period of the "display timing", a still picture is displayed based on the next DLIST.

Browsable is effectively used, for example, for displaying photos in a switching manner while music is reproduced and displaying various types of information including an explanation about the music and information on the people involved in a switching manner.

The synchronous mode and the asynchronous mode are switched over in accordance with the picture program reproduction control. The audio still video display mode of the audio program information can be designated so that some of the audio programs included in the audio title are randomly selected and repeated a designated number of times or such audio programs are repeated a designated number of times prohibiting repetition of the same program (shuffle mode).

The AV decoder section 85c can have other structures.

Figure 67:
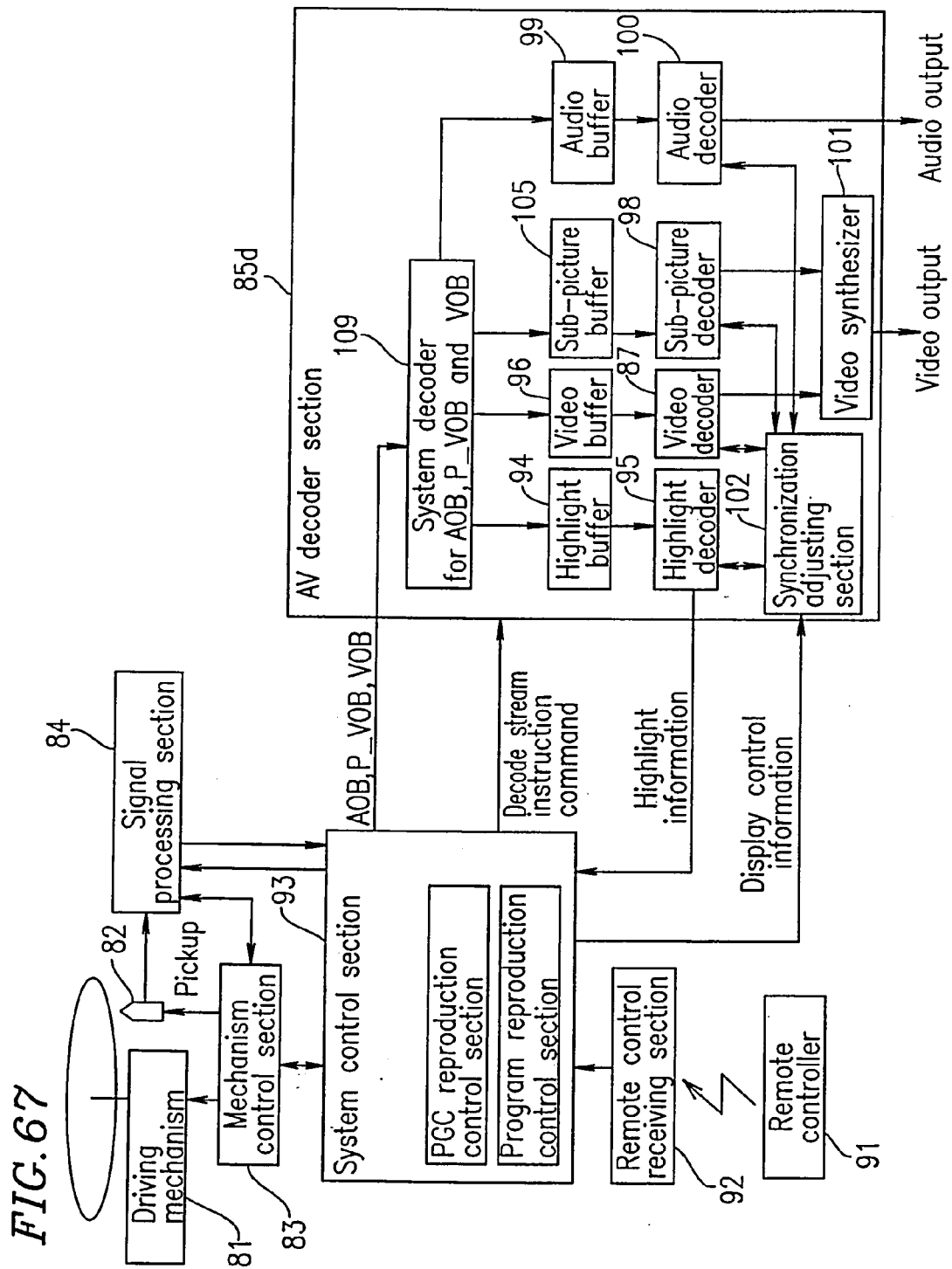
FIG. 67 is a block diagram illustrating an internal structure of another DVD player as a reproduction apparatus.

As shown in FIG. 67, the system decoders for AOB, P_VOB and VOB can be replaced with a single system decoder 109 having the functions of these decoders. Since the AOB is input at different timing from the P_VOB and VOB, a system decoder which is substantially the same as that specified by DVD-Video is usable except that the buffer memory capacities of the highlight buffer 94, the video buffer 96 and the sub-picture buffer 105 are increased and that a management mechanism for a still picture is added to control of the video buffer 96. An AV decoder section 85*d* shown in FIG. 67 operates in substantially the same manner as the AV decoder section 85*c* shown in FIG. 61.

Figure 68:
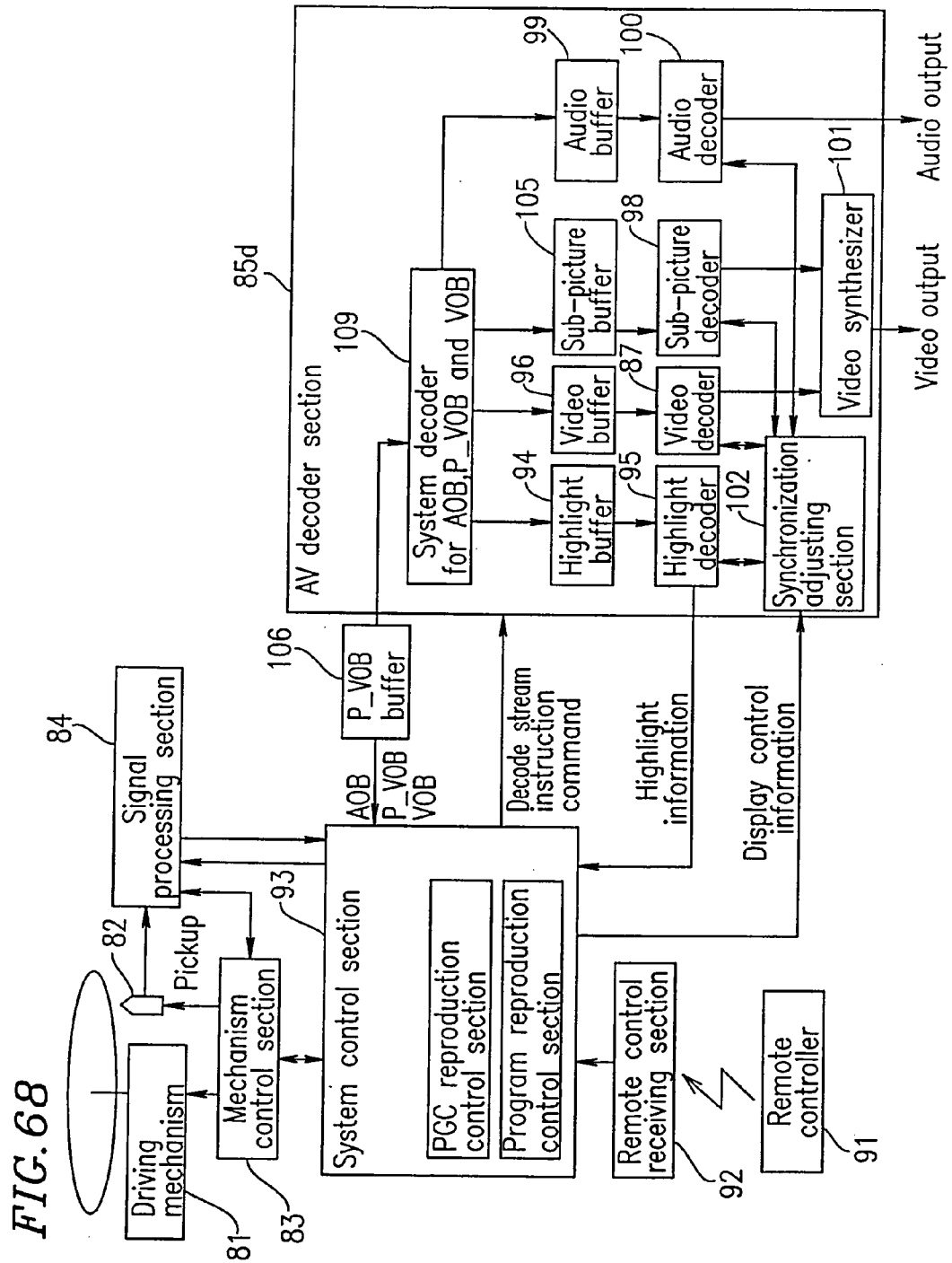
FIG. 68 is a block diagram illustrating an internal structure of still another DVD player as a reproduction apparatus.

As shown in FIG. 68, the P_VOB buffer 106 for P_VOB can be provided immediately before the AV decoder section 85*d*. The same type of AV decoder section as used by DVD-Video is usable. All the P_VOB data to be read before the reproduction of the audio data is stored in the P_VOB buffer 106. The P_VOB buffer 106 dynamically multiplexes the P_VOBs corresponding to the reproduction order with the audio stream and sends the resultant data to the AV decoder section 85*d*. Accordingly, the system decoder 109 for AOB and P_VOB in the AV decoder section 85*d* is required to have a processing speed which is slightly higher than the speed specified by the DVD-Video standards. Streams need to be supplied to the AV decoder section 85*d* so that the audio buffer 99 does not underflow.

In the third example, as described above, program reproduction information including the start time and reproduction time period of each piece of audio data based on the reproduction start time of the leading audio data in the MPEG2 stream is recorded in the management region as a part of the reproduction control information. Accordingly, an optical disk for realizing reproduction of high quality digital audio data along with the video data in a restricted range of bit rates is provided. Moreover, a certain interval between audio reproductions can be maintained even in an inexpensive reproduction apparatus including no video data reproduction function. This allows title creators to create data easily.

Since a plurality of still pictures, sub-picture and menu can be displayed synchronously with or asynchronously from high quality audio data, a wider variety of displays become available.

According to the present invention, reproduction order information defining the order of the video streams to be reproduced synchronously with an audio sequence is recorded on a recording medium. By changing the contents of the reproduction order information, the contents of the video streams reproduced synchronously with the audio sequence can easily be changed. This provides the title creators with the freedom of creating a variety of video streams for one audio sequence, and provides the user with the freedom of selecting a desired video stream among a plurality of video streams offered for one audio sequence.

According to the present invention, video reproduction mode information is recorded on the recording medium. Whether it is possible or not to change the order of the video stream to be reproduced in synchronization with the audio sequence based on interaction from a user is adjusted by the video reproduction mode information. The video reproduction mode information enables the switching of the reproduction timing/reproduction time period of the video stream to be reproduced synchronously with the audio sequence. Thus, the two different types of video reproduction modes, i.e., "SlideShow" and "Browsable" can be offered to the user.

According to the present invention, prior to the reproduction of the audio sequence, a video stream to be reproduced synchronously with the audio sequence is buffered in the buffer provided in the reproduction apparatus. By guaranteeing the range of the recording medium to read to the buffer, reproduction by any reproduction apparatus is guaranteed. As a result, title creators can easily assume the situation in which titles are reproduced, which facilitates the production of the titles. Consequently, the high quality titles can be supplied at lower cost.

According to the present invention, a non-MPEG stream can be decoded by an MPEG2 decoder. Thus, the reproduction apparatus can be provided at lower cost.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed:

1. A method of recording information on an information recording medium, comprising:

storing a plurality of audio sequences and management information for managing reproduction of each of the plurality of audio sequences in an audio zone region on the information recording medium, wherein each of the plurality of audio sequences includes at least one audio object, the management information includes reproduction order information indicating reproduction order of the at least one audio object included in each of the plurality of audio sequences, each of the at least one audio object includes at least one pack, each of the at least one pack including audio data and first timing information indicating an output timing of the audio data, the storing step further includes storing at least one picture video object in the audio zone region, each of the at least one picture video object containing still picture data, the management information further includes:

still picture reproduction information indicating at least one picture video object which is to be reproduced in connection with the reproduction of a corresponding one of the plurality of audio sequences, and second timing information adjustable to the first timing information and indicating an output timing of the at least one picture video object indicated by the still picture reproduction information.

2. A method according to claim 1, wherein the management information further includes:

display mode information indicating one of a first mode in which the at least one picture video object is reproduced in synchronization with the reproduction of the corresponding audio sequence and a second mode in which the at least one picture video object is reproduced asynchronously from the reproduction of the corresponding audio sequence, whereby the second timing information in connection with the second mode is altered with respect to the second timing information in connection with the first mode.

3. A method according to claim 2, wherein:

when the display mode information indicates the first mode, the second timing information indicates a timing when the display of the picture video object is updated, and when the display mode information indicates the second mode, the second timing information indicates a time period when the display of the picture video object is continued.

4. A method according to claim 1, wherein the management information further includes:

display mode information indicating a display timing mode and a display order mode, wherein the display timing mode is one of a first display timing mode in which the at least one picture video object is reproduced in synchronization with the reproduction of the corresponding audio sequence and a second display timing mode in which the at least one picture video object is reproduced asynchronously from the reproduction of the corresponding audio sequence, and the display order mode is one of a first display order mode in which the at least one picture video object is reproduced sequentially, and a second display order mode in which the at least one picture video object is reproduced randomly while permitting overlap and a third display order mode in which the at least one picture video object is reproduced randomly while prohibiting overlap.

5. A method according to claim 1, wherein the management information further includes:

display mode information indicating a display timing mode and a display order mode, wherein the display timing mode is one of a first display timing mode in which the at least one picture video object is reproduced in synchronization with the reproduction of the corresponding audio sequence and a second display timing mode in which the at least one picture video object is reproduced asynchronously from the reproduction of the corresponding audio sequence, and the display order mode is one of a first display order mode in which the at least one picture video object is reproduced sequentially and a second display order mode in which the at least one picture video object is reproduced randomly.

* * * * *

UNITED STATES PATENT AND TRADEMARK OFFICE
CERTIFICATE OF CORRECTION

PATENT NO. : 7,167,638 B2 Page 1 of 1
APPLICATION NO. : 11/428472
DATED : January 23, 2007
INVENTOR(S) : Yoshihiro Mori and Masayuki Kozuka It is certified that error appears in the above-identified patent and that said Letters Patent is hereby corrected as shown below:

Title Page, item (54) (Title) and Col. 1, Line 1, "DATA STORAGE MEDIUM" should read -- DATA STORAGE MEDIUM, --.

Signed and Sealed this

Third Day of July, 2007

JON W. DUDAS
*Director of the United States Patent and Trademark Office*